US009349057B2

(12) United States Patent
Tsuchiya et al.

(10) Patent No.: US 9,349,057 B2
(45) Date of Patent: May 24, 2016

(54) THREE-DIMENSIONAL OBJECT DETECTION DEVICE

(75) Inventors: Chikao Tsuchiya, Cambridge, MA (US); Yasuhisa Hayakawa, Yokohama (JP); Shinya Tanaka, Zama (JP); Osamu Fukata, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 109 days.

(21) Appl. No.: 14/235,132

(22) PCT Filed: Jul. 27, 2012

(86) PCT No.: PCT/JP2012/069091
§ 371 (c)(1),
(2), (4) Date: Jan. 27, 2014

(87) PCT Pub. No.: WO2013/038818
PCT Pub. Date: Mar. 21, 2013

(65) Prior Publication Data
US 2014/0168440 A1    Jun. 19, 2014

(30) Foreign Application Priority Data

Sep. 12, 2011    (JP) .................................. 2011-198007

(51) Int. Cl.
*H04N 7/18*        (2006.01)
*G06K 9/00*        (2006.01)
(Continued)

(52) U.S. Cl.
CPC .............. *G06K 9/00798* (2013.01); *B60R 1/00* (2013.01); *G06K 9/00805* (2013.01);
(Continued)

(58) Field of Classification Search
CPC ........ G06K 9/00798; G06K 9/46; B60R 1/10; G04N 7/18; H04N 7/18

USPC ........................................... 348/148; 382/103
See application file for complete search history.

(56) References Cited

U.S. PATENT DOCUMENTS 7,317,474 B2 *   1/2008   Takeda .................... H04N 7/181
                                                      348/119
7,365,653 B2 *   4/2008   Yang ..................... G06T 3/4038
                                                      340/435
(Continued)

FOREIGN PATENT DOCUMENTS

JP    2006-315482 A   11/2006
JP    2008-158958 A    7/2008
(Continued)

OTHER PUBLICATIONS

An English translation of the Decision on Grant for the corresponding Russian Application No. 2014114574, issued on Dec. 8, 2014.

*Primary Examiner* — Helen Shibru
(74) *Attorney, Agent, or Firm* — Global IP Counselors, LLP

(57) ABSTRACT

A three-dimensional object detection device basically includes a three-dimensional object detection unit, a natural object assessment unit and a control unit. The three-dimensional object detection unit detects three-dimensional objects based on image information of a rear of a vehicle from a camera. The natural object assessment unit assesses that a detected three-dimensional object is a natural object, such as a plant or snow, based on an irregularity evaluation value calculated based on a first pixel number of first pixels representing a first predetermined differential in the differential image containing the detected three-dimensional object and a second pixel number of second pixels corresponding to the three-dimensional object and representing a second predetermined differential greater than the first predetermined differential.

26 Claims, 30 Drawing Sheets

(51) Int. Cl.
   *B60R 1/00*      (2006.01)
   *G06T 7/00*      (2006.01)
   *G08G 1/16*      (2006.01)

(52) U.S. Cl.
   CPC ............ *G06T 7/0083* (2013.01); *G08G 1/165* (2013.01); *G08G 1/166* (2013.01); *G08G 1/167* (2013.01); *H04N 7/18* (2013.01); *B60R 2300/806* (2013.01); *B60R 2300/8066* (2013.01); *B60R 2300/8093* (2013.01); *G06T 2207/10016* (2013.01); *G06T 2207/20148* (2013.01); *G06T 2207/20224* (2013.01); *G06T 2207/30261* (2013.01)

(56) References Cited

U.S. PATENT DOCUMENTS

| | | | | |
|---|---|---|---|---|
| 7,379,813 | B2 * | 5/2008 | Kubota | G08G 1/0962 701/300 |
| 8,675,041 | B2 * | 3/2014 | Kuboyama | B60R 1/00 348/148 |
| 8,994,520 | B2 * | 3/2015 | Stahlin | B60K 35/00 340/436 |
| 9,100,554 | B2 * | 8/2015 | Barth | H04N 7/181 |
| 9,129,528 | B2 * | 9/2015 | Lavoie | G08G 1/0962 |
| 9,141,870 | B2 * | 9/2015 | Fukata | G06K 9/00791 |
| 9,286,800 | B2 * | 3/2016 | Gordon | G08G 1/09 |
| 9,290,204 | B2 * | 3/2016 | Lavoie | B62D 13/06 |
| 2004/0260469 | A1 * | 12/2004 | Mizusawa | B60R 1/00 701/300 |
| 2007/0085901 | A1 | 4/2007 | Yang et al. | |
| 2009/0268027 | A1 | 10/2009 | Yang | |
| 2010/0220190 | A1 | 9/2010 | Hiroshi | |
| 2013/0322688 | A1 * | 12/2013 | Tsuchiya | G08G 1/167 382/103 |
| 2014/0146176 | A1 * | 5/2014 | Hayakawa | G08G 1/166 348/148 |
| 2015/0016681 | A1 * | 1/2015 | Fukata | G08G 1/165 382/103 |
| 2015/0054920 | A1 * | 2/2015 | Fukata | G06K 9/00791 348/46 |
| 2015/0186733 | A1 * | 7/2015 | Hayakawa | G08G 1/166 382/103 |
| 2015/0195496 | A1 * | 7/2015 | Hayakawa | B60R 1/00 348/118 |
| 2015/0323785 | A1 * | 11/2015 | Fukata | G08G 1/166 348/148 |

FOREIGN PATENT DOCUMENTS

| | | |
|---|---|---|
| JP | 2008-219063 A | 9/2008 |
| JP | 2009-265783 A | 11/2009 |
| RU | 2352480 C1 | 4/2009 |
| RU | 97092 U1 | 8/2010 |

* cited by examiner

THREE-DIMENSIONAL OBJECT DETECTION DEVICE

CROSS-REFERENCE TO RELATED APPLICATIONS

This application is a U.S. National stage application of International Application No. PCT/JP2012/069091, filed Jul. 27, 2012, which claims priority under to Japanese Patent Application No. 2011-198007 filed in Japan on Sep. 12, 2011. The entire disclosure of the aforementioned application is hereby incorporated herein by reference.

BACKGROUND

1. Field of the Invention

The present invention relates to a three-dimensional object detection device.

2. Background Information

There have been detection devices which comprise a camera for imaging the side of a vehicle and which detect three-dimensional objects such as shrubberies outside of the road by matching a pattern stored in advance with an image taken by the camera (see Japanese Laid-Open Patent Publication No. 2006-315482).

SUMMARY

However, according to the conventional technology, a variety of patterns of various shrubberies and snow must be created and stored in order to detect natural three-dimensional objects such as plants and other shrubberies and snow with patches of mud mixed in, for example, and these numerous patterns must be matched with the captured images when being assessed, which is problematic in causing a large processing load. Another problem is that it is difficult to accurately assess objects by pattern matching because the shapes of natural objects such as shrubberies on the shoulder or the outside of the road are unlikely to be constant.

A problem to be solved by the present invention is to provide a three-dimensional object detection device having improved precision of assessing natural three-dimensional objects such as natural objects including plants and snow on the road shoulder or outside of the road, and having high precision of detecting manmade three-dimensional objects (unnatural objects) such as other vehicles which are the purpose of detection. Another problem is to provide a three-dimensional object detection device capable of preventing images of natural objects including plants and snow on the road shoulder or outside of the road from being mistakenly detected as images of other vehicles traveling in adjacent traffic lanes adjacent to the traffic lane traveled by the vehicle, and capable of detecting other vehicles traveling in adjacent traffic lanes with high precision.

The present invention overcomes the problems described above as follows: an irregularity evaluation value is calculated based on differential waveform information or edge information of the captured image, and when the calculated irregularity evaluation value is equal to or greater than a predetermined irregularity evaluation threshold set in advance and irregularity of a natural object is observed, the detected three-dimensional object is assessed to be the image of a natural object including plants and snow located along the road traveled by the vehicle.

According to the present invention, when the irregularity evaluation value calculated from the differential waveform information or edge information calculated from the captured image is equal to or greater than the predetermined irregularity evaluation threshold, the image information can be detected as including images of natural objects including plants and snow which are irregular. This detection result can be used to prevent the images of natural objects including plants and snow located along the road traveled by the vehicle from being mistakenly detected as other vehicles traveling in adjacent traffic lanes adjacent to the lane traveled by the vehicle. As a result, it is possible to provide a three-dimensional object detection device which has high precision in detecting other vehicles traveling in adjacent traffic lanes adjacent to the lane traveled by the vehicle.

BRIEF DESCRIPTION OF THE DRAWINGS

Referring now to the attached drawings which form a part of this original disclosure.

DETAILED DESCRIPTION OF THE EMBODIMENTS

Figure 1:
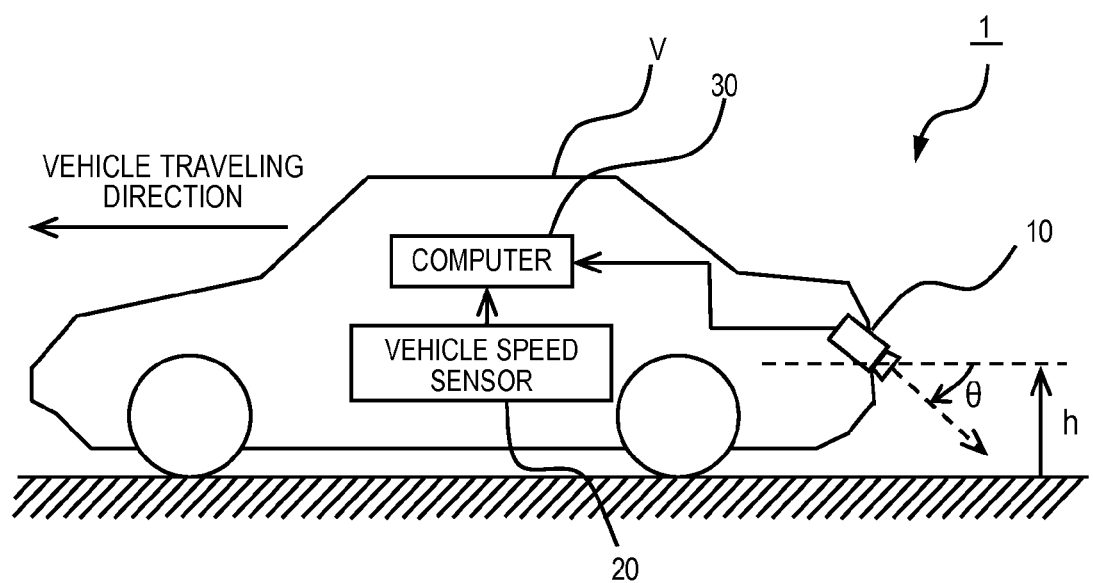
FIG. 1 is a schematic diagram of a vehicle according to an embodiment in which the three-dimensional object detection device of the present invention is applied.

The three-dimensional object detection device 1 of the first embodiment shall now be described. FIG. 1 is a schematic diagram of a vehicle according to an embodiment in which the three-dimensional object detection device 1 of the present invention is applied, wherein the three-dimensional object detection device 1 of the present example is a device for detecting other vehicles as obstacles if the driver of the vehicle V should pay attention to the other vehicle while driving, e.g., there is a possibility of contact when the vehicle V is changing traffic lanes. The three-dimensional object detection device 1 of the present example particularly detects other vehicles traveling in adjacent traffic lanes adjacent to the lane traveled by the vehicle (referred to simply as adjacent traffic lanes below). The three-dimensional object detection device 1 of the present example can also calculate the travel distance and travel speed of the detected other vehicles. Therefore, the example described below is an example in which the three-dimensional object detection device 1 is installed in a vehicle V, and other vehicles traveling in adjacent traffic lanes adjacent to the lane traveled by the vehicle V are detected from among three-dimensional objects detected in the vehicle periphery. As shown in FIG. 1, the three-dimensional object detection device 1 of the present example comprises a camera 10, a vehicle speed sensor 20 and a computer 30.

The camera 10 is attached to the vehicle at a location at a height h in the rear of the vehicle V, so that an optical axis is at an angle θ downward from horizontal, as shown in FIG. 1. From this position, the camera 10 captures images of the predetermined areas in the environment surrounding the vehicle V. In the present embodiment, there is one camera 10 provided in order to detect three-dimensional objects to the rear of the vehicle, but another camera for acquiring images of the vehicle periphery, for example, can also be provided for other applications. The vehicle speed sensor 20 detects the traveling speed of the vehicle V, and the vehicle speed is calculated from the vehicle wheel speed detected by a vehicle wheel speed sensor for sensing the rotating speed of the vehicle wheels, for example. The computer 30 detects three-dimensional objects to the rear of the vehicle, and in the present embodiment calculates the travel distance and travel speed of these three-dimensional objects.

Figure 2:
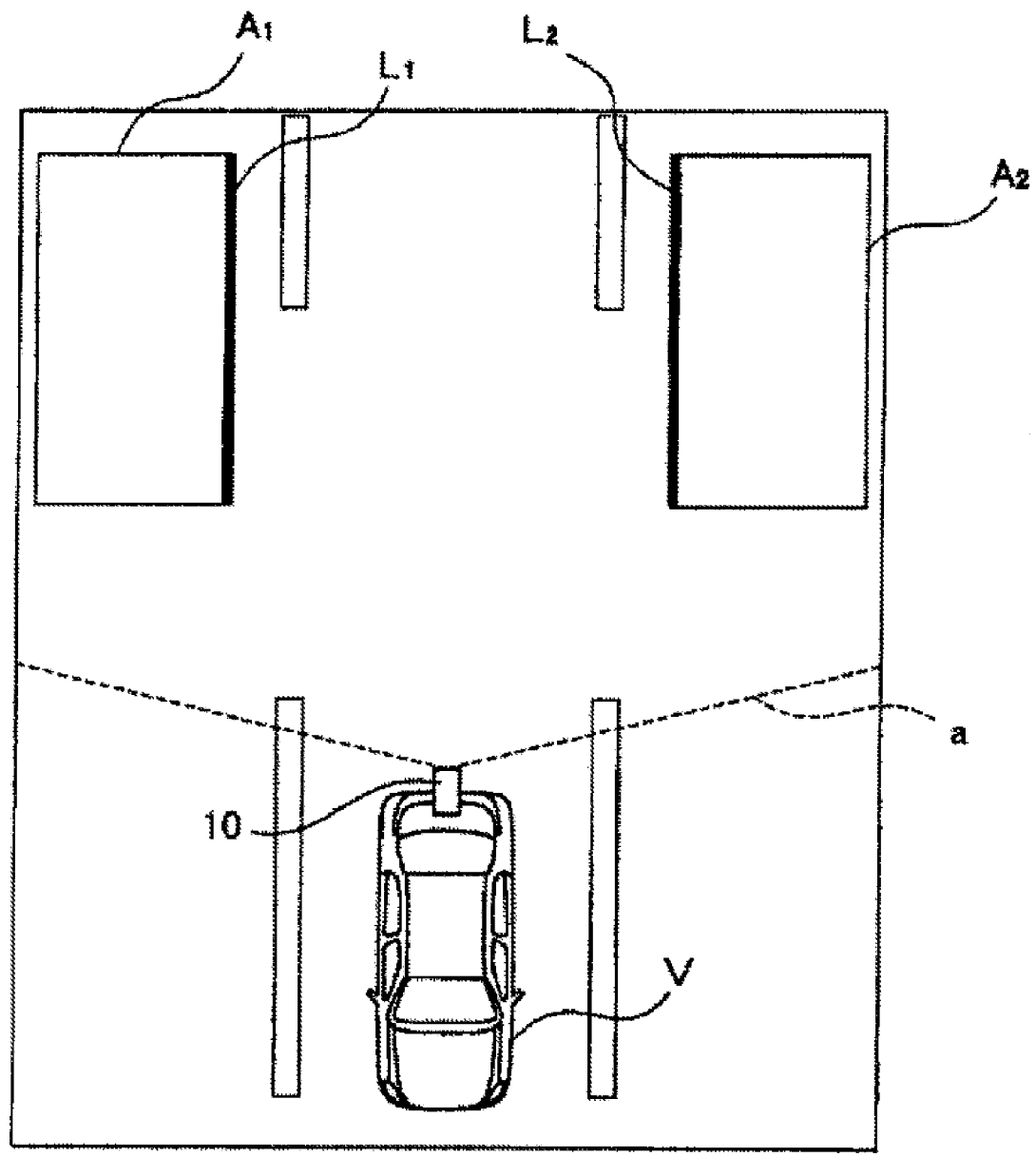
FIG. 2 is a plan view showing the traveling state of the vehicle in FIG. 1 (three-dimensional object detection from differential waveform information)

FIG. 2 is a plan view showing the traveling state of the vehicle V of FIG. 1. As shown in this drawing, the camera 10 images the rear of the vehicle at a predetermined angle of view a. At this time, the angle of view a of the camera 10 is set to an angle of view such that the left and right traffic lanes can be imaged in addition to the traffic lane on which the vehicle V is traveling. The area that can be imaged, which is behind the vehicle V, includes detection objective areas A1, A2 on the adjacent traffic lanes adjacent to the left and right of the lane traveled by the vehicle V.

Figure 3:
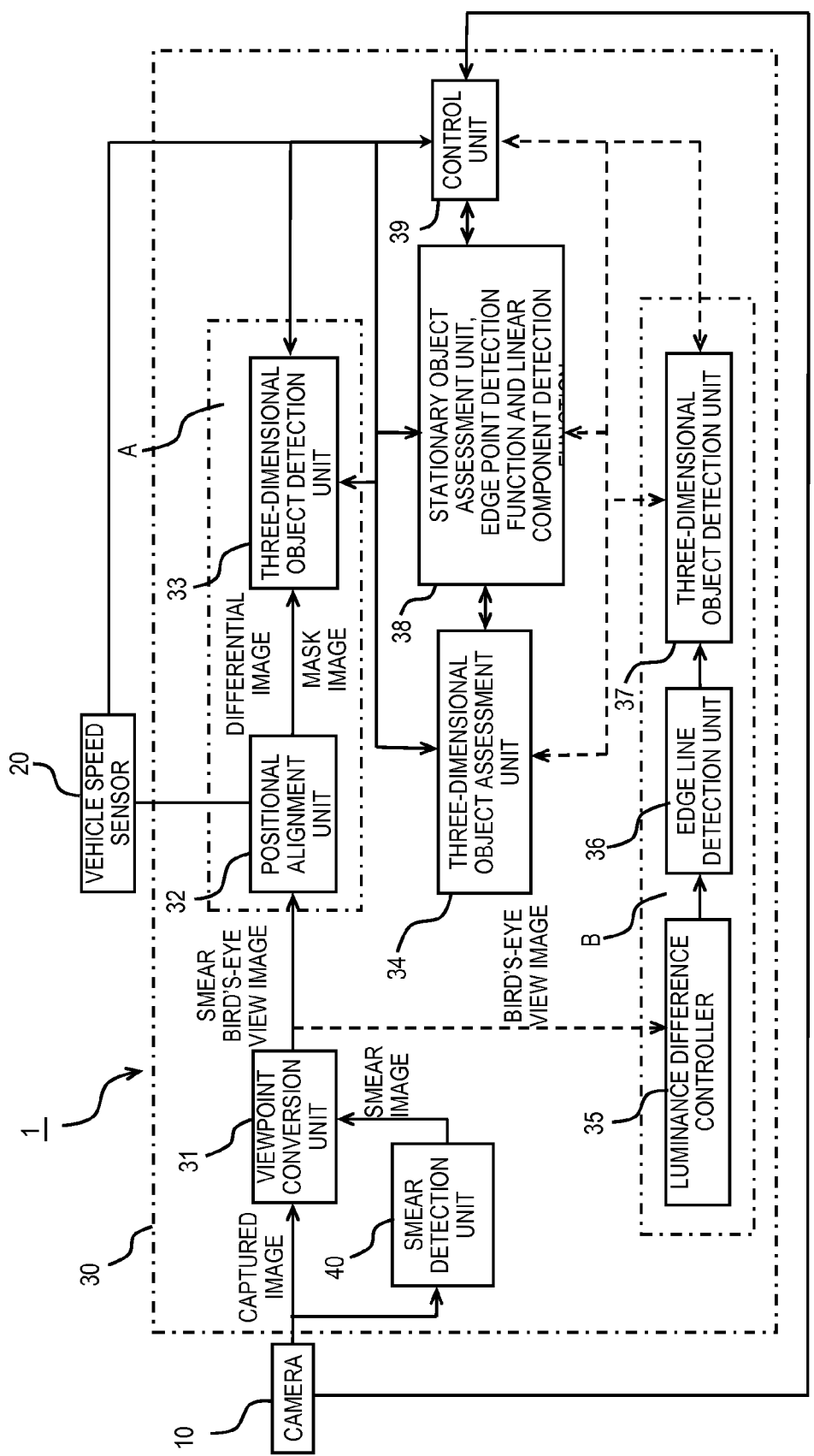
FIG. 3 is a block diagram showing the details of the controller of FIG. 1.

FIG. 3 is a block diagram showing the details of the computer 30 of FIG. 1. In FIG. 3, the camera 10 and the vehicle speed sensor 20 are also shown in order to give a clear depiction of the relationship of connection.

The computer 30 comprises a viewpoint conversion unit 31, a positional alignment unit 32, a three-dimensional object detection unit 33, a detection area setting unit 34, and a smear detection unit 40, as shown in FIG. 3. The computer 30 of the present embodiment has a configuration pertaining to a three-dimensional object detection block that uses differential waveform information. The computer 30 of the present embodiment can also have a configuration pertaining to a three-dimensional object detection block that uses edge information. In this case, the block configuration A configured from the positional alignment unit 32 and the three-dimensional object detection unit 33, and the block configuration B configured from a luminance difference controller 35, an edge line detection unit 36, and a three-dimensional object detection unit 37 enclosed in dashed lines, can be reversed in the configuration shown in FIG. 3. As shall be apparent, it is also possible to include both the block configuration A and the block configuration B, to perform three-dimensional object detection using differential waveform information, and to also perform three-dimensional object detection using edge information. When the block configuration A and the block configuration B are included, it is possible to activate either one of the block configuration A or the block configuration B in accordance with environmental factors such as brightness, for example. These configurations are described below.

Three-Dimensional Object Detection by from Differential Waveform Information

The three-dimensional object detection device 1 of the present embodiment detects three-dimensional objects located in the detection area A1 in the right adjacent traffic lane to the rear of the vehicle or the detection area A2 in the left adjacent traffic lane to the rear of the vehicle, based on image information obtained by the monocular camera 10 for imaging the area behind the vehicle. The detection area setting unit 34 sets the detection areas A1, A2 to the left and right, respectively, in the rear of the vehicle V, which are within the captured image information. The positions of these detection areas A1, A2 are not particularly limited, and can be set as appropriate according to the process conditions.

Next, the viewpoint conversion unit is described. The viewpoint conversion unit 31 inputs captured image data of the predetermined area obtained by the imaging of the camera 10, and converts the viewpoint of the inputted captured image data into bird's-eye view image data which is seen as viewed from bird's-eye. This bird's-eye view is what would be seen from the viewpoint of an imaginary camera looking vertically downward, for example, from the air above. This viewpoint conversion can be performed as is disclosed in Japanese Laid-Open Patent Publication No. 2008-219063, for example. The reason for converting the captured image data to bird's-eye view image data is because it is possible to distinguish between planar objects and three-dimensional objects, based on the principle that vertical edges unique to three-dimensional objects are converted to groups of straight lines passing through specific fixed points by the viewpoint conversion to bird's-eye view image data. The results of the image conversion process by the viewpoint conversion unit 31 are also used in three-dimensional object detection from edge information, described hereinafter.

Figure 4:
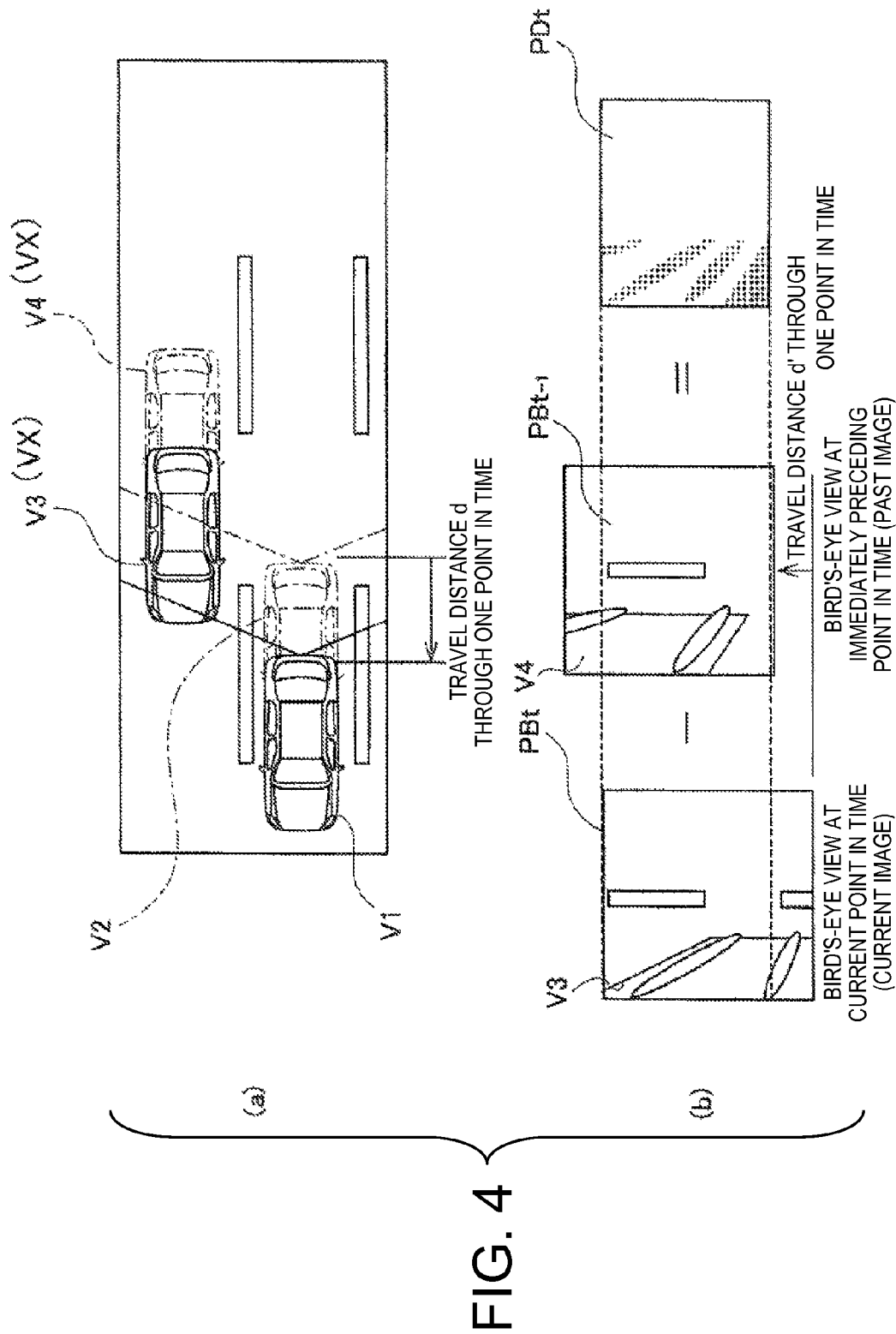
FIG. 4 illustrates an outline of the process of the positional alignment unit of FIG. 3, wherein (a) is a plan view showing the movement state of the vehicle and (b) is an image showing an outline of positional alignment.

The positional alignment unit 32 sequentially inputs the bird's-eye image data obtained by the viewpoint conversion of the viewpoint conversion unit 31, and aligns the position of inputted bird's-eye image data of a different time. FIG. 4 illustrates an outline of the process of the positional alignment unit 32, wherein (a) is a plan view showing the movement state of the vehicle and (b) is an image showing an outline of positional alignment.

As shown in FIG. 4(*a*), the vehicle V of the current time is positioned at V1, and the vehicle V at immediately preceding point in time is positioned at V2. Another vehicle VX is traveling parallel to the vehicle V in a position to the rear of the vehicle V, the other vehicle VX of the current time is positioned at V3, and the other vehicle VX of immediately preceding point in time is positioned at V4. Furthermore, the vehicle V moves a distance d in one point in time. The term "immediately preceding point in time" may refer to a time in the past from the current time by a time duration established in advance (e.g. one control cycle), or it may refer to a time in the past by any desired time duration.

In such a state, the bird's-eye view image PBt at the current time is shown in FIG. 4(*b*). In the bird's-eye view image PBt, the white lines painted on the road are rectangular and are in a state of being seen from above comparatively accurately. However, the position of the other vehicle VX in the position V3 is beginning to fall into the image. Similarly, in the bird's-eye view image PBt−1 at immediately preceding point in time, the white lines painted on the road are rectangular and are in a state of being seen from above comparatively accurately, but the other vehicle VX in the position V4 is beginning to fall into the image. As previously discussed, this is because the vertical edges of three-dimensional objects (in addition to vertical edges by strict definition, this also includes edges rising in solid space from the road surface) appear as groups of straight lines along the falling direction due to the process of viewpoint conversion to bird's-eye view image data, while planar images on the road surface do not contain vertical edges and there is therefore no such falling in even if the viewpoint is converted.

The positional alignment unit 32 implements the positional alignment of the bird's-eye view images PBt, PBt−1 described above in terms of data. At this time, the positional alignment unit 32 offsets the bird's-eye view image PBt−1 at the immediately preceding point in time, and causes the position to coincide with the bird's-eye view image PBt−1 at the current time. The left image and center image in FIG. 4(*b*) show a state offset by a travel distance d'. The offset amount d' is a movement amount in the bird's-eye view image data corresponding to the actual travel distance d of the vehicle shown in FIG. 4(*a*), and is determined based on a signal from the vehicle speed sensor 20 and on the time duration from the immediately preceding point in time to the current time.

After the positional alignment, the positional alignment unit 32 finds the differential between the bird's-eye view images PBt, PBt−1, and generates data of a differential image PDt. The pixel value of the differential image PDt may be the absolute value of the difference in pixel values between the bird's-eye view images PBt, PBt−1, or, in order to correspond with changes in the illuminated environment, it may be "1" when the absolute value exceeds a predetermined value p and "0" when the absolute value does not exceed the predetermined value. The right image in FIG. 4(*b*) is the differential image PDt.

Returning to FIG. 3, the three-dimensional object detection unit 33 detects three-dimensional objects based on the data of the differential image PDt shown in FIG. 4(*b*). At this time, the three-dimensional object detection unit 33 also calculates the travel distance of three-dimensional objects in real space. When a three-dimensional object is detected and the travel distance is calculated, the three-dimensional object detection unit 33 first generates a differential waveform. The travel distance per unit time of the three-dimensional object is used to calculate the travel speed of the three-dimensional object. The travel speed of the three-dimensional object can then be used to assess whether or not the three-dimensional object is a vehicle.

When generating a differential waveform, the three-dimensional object detection unit 33 of the present embodiment sets a detection area in the differential image PDt. The three-dimensional object detection device 1 of the present example detects other vehicles traveling in traffic lanes adjacent to the lane traveled by the vehicle V as detection objectives if the driver of the vehicle V should pay attention to the other vehicle, and particularly if there is a possibility of contact when the vehicle V is changing traffic lanes. Therefore, in the present example of detecting three-dimensional objects based on image information, two detection areas in the image obtained by the camera 10 are set to the right and left of the vehicle V. Specifically, in the present embodiment, rectangular detection areas A1, A2 are set in areas to the left and right and to the rear of the vehicle V, as shown in FIG. 2. Other vehicles detected in these detection areas A1, A2 are detected as obstacles traveling in the adjacent traffic lanes adjacent to the lane traveled by the vehicle V. These detection areas A1, A2 may be set from relative positions in relation to the vehicle V, or they may be set using the positions of the white lines as a reference. When they are set using the positions of the white lines as a reference, the three-dimensional object detection device 1 may use existing white line recognition techniques or the like, for example.

The three-dimensional object detection unit 33 recognizes the borders of the set detection areas A1, A2 that are near the vehicle V (the borders extending along the travel direction) as ground lines L1, L2 (FIG. 2). In general, a ground line is a line where a three-dimensional object is in contact with the ground surface, but in the present embodiment, the ground lines are set in the manner described above and not as lines of contact with the ground surface. From experience, the difference between ground lines according to the present embodiment and ground lines found from the original positions of other vehicles VX is not too great in these cases, and in practice there are no problems.

Figure 5:
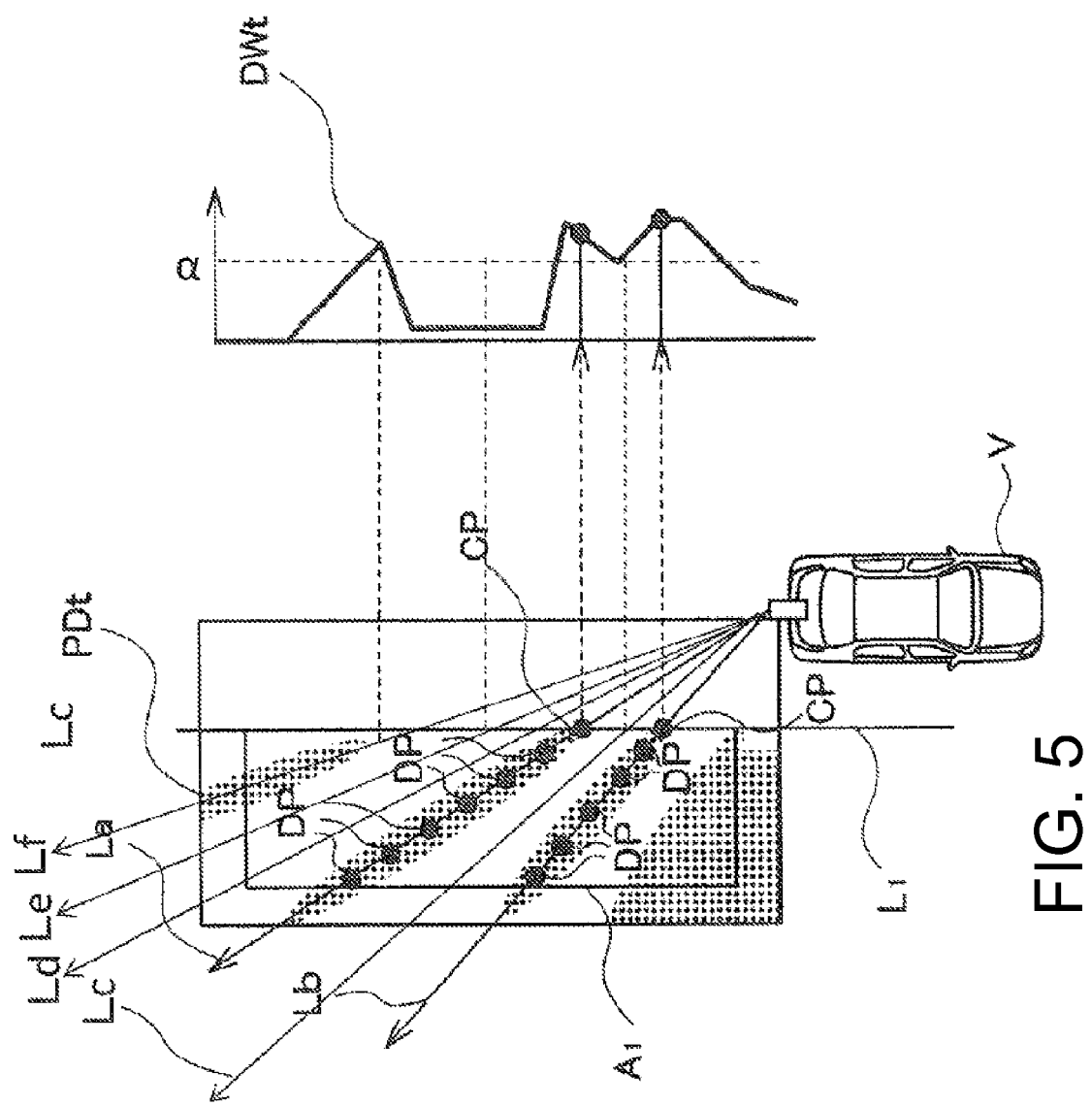
FIG. 5 is a schematic drawing showing the manner in which differential waveforms are generated by the three-dimensional object detection unit of FIG. 3.

FIG. 5 is a schematic drawing showing the manner in which differential waveforms are generated by the three-dimensional object detection unit 33 shown in FIG. 3. The three-dimensional object detection unit 33 generates a differential waveform DWt from the portions that are equivalent to the detection areas A1, A2 in the differential image PDt (the right image of FIG. 4(b)) calculated by the positional alignment unit 32. At this time, the three-dimensional object detection unit 33 generates a differential waveform DWt along the falling direction of the three-dimensional object by viewpoint conversion. In the example shown in FIG. 5, the description uses only the detection area A2 for the sake of convenience.

To give a specific description, the three-dimensional object detection unit 33 defines a line La along the direction in which the three-dimensional object falls in the data of the differential waveform DWt. The three-dimensional object detection unit 33 then counts the number of differential pixels DP representing predetermined differentials along the line La. The differential pixels DP representing predetermined differentials herein are pixels exceeding a predetermined threshold when the pixel value of the differential waveform DWt is the absolute value of the difference between the pixel values of the bird's-eye images PBt, PBt−1, and the differential pixels DP are pixels representing "1" when the pixel value of the differential waveform DWt is expressed as "0" "1."

After counting the number of differential pixels DP, the three-dimensional object detection unit 33 finds an intersection point CP of the line La and a ground line L1. The three-dimensional object detection unit 33 correlates the intersection point CP and the counted number, determines the horizontal axis position, i.e., a position of the up-down axis in the right of FIG. 5 based on the position of the intersection point CP, determines the vertical axis position, i.e. a position on the left-right axis in the right of FIG. 5 from the counted number, and plots the positions as counted numbers at the intersection points CP.

The three-dimensional object detection unit 33 continues to similarly define lines Lb, Lc . . . along the direction in which the three-dimensional object falls, count the number of differential pixels DP, determine the horizontal axis position based on the position of the intersection points CP, and determine the vertical axis position from the counted number (the number of differential pixels DP). The three-dimensional object detection unit 33 generates a differential waveform DWt as shown in the right of FIG. 5 by sequentially repeating the above process and creating a frequency distribution.

As shown in the left of FIG. 5, the lines La and Lb in the falling direction of the three-dimensional object overlap the detection area A1 in different distances. Therefore, assuming the detection area A1 is filled with differential pixels DP, the line La has more differential pixels DP than the line Lb. Therefore, when determining the vertical axis position from the counted number of differential pixels DP, the three-dimensional object detection unit 33 normalizes the vertical axis position based on the distance whereby the lines La, Lb in the falling direction of the three-dimensional object and the detection area A1 overlap. To give a specific example, there are six differential pixels DP on the line La in the left of FIG. 5, and there are five differential pixels DP on the line Lb. Therefore, when determining the vertical axis position from the counted number in FIG. 5, the three-dimensional object detection unit 33 normalizes the vertical axis position by a method such as dividing the counted number by the overlap distance. The values of the differential waveform DWt that correspond to the lines La, Lb in the falling direction of the three-dimensional object are thereby substantially equal, as shown in the differential waveform DWt.

After the differential waveform DWt is generated, the three-dimensional object detection unit 33 calculates the travel distance by making a contrast with the differential waveform DWt−1 of immediately preceding point in time. Specifically, the three-dimensional object detection unit 33 calculates the travel distance from the change in time between the differential waveforms DWt, DWt−1.

Figure 6:
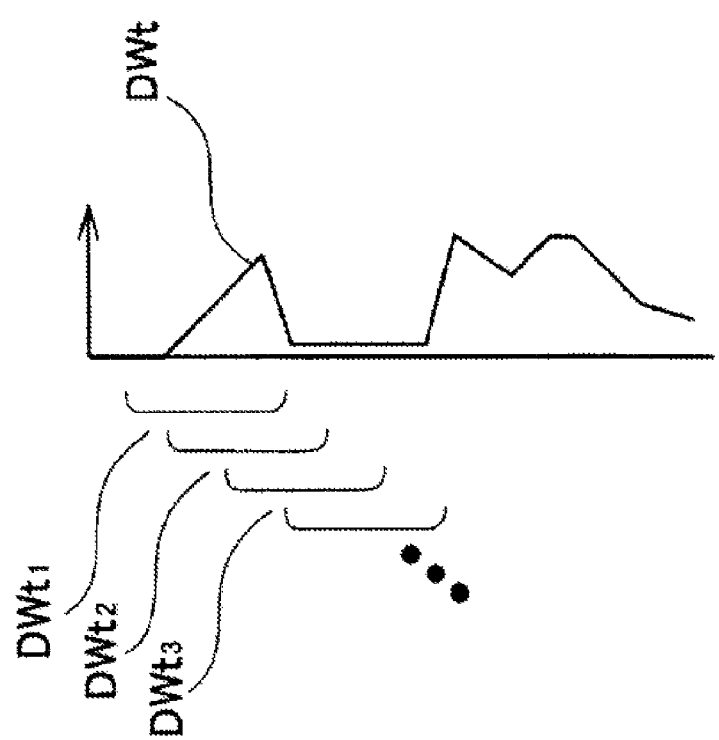
FIG. 6 is a diagram showing the small areas divided by the three-dimensional object detection unit of FIG. 3.

To give a more detailed description, the three-dimensional object detection unit 33 divides the differential waveform DWt into a plurality of small areas DWt1 to DWtn (n being any integer of 2 or greater) as shown in FIG. 6. FIG. 6 is a diagram showing the small areas DWt1 to DWtn divided by the three-dimensional object detection unit 33. The small areas DWt1 to DWtn are divided so as to overlap each other as shown in FIG. 6, for example. The small area DWt1 and the small area DWt2 overlap, and the small area DWt2⌐ and the small area DWt3 overlap, for example.

Next, the three-dimensional object detection unit 33 finds the offset amount (the travel distance of the differential waveform along the horizontal axis (up-down in FIG. 6)) for each of the small areas DWt1 to DWtn. The offset amount herein is found from the difference between the differential waveform DWt−1 at immediately preceding point in time and the differential waveform DWt at the current time (the distance along the horizontal axis). Having moved the differential waveform DWt−1 at immediately preceding point in time along the horizontal axis for each of the small areas DWt1 to DWtn at this time, the three-dimensional object detection unit 33 determines the position (along the horizontal axis) where errors with the differential waveform DWt at the current time will be minimal, and finds the horizontal-axis movement amount between the original position of the differential waveform DWt−1 and the position were errors are minimal as the offset amount. The three-dimensional object detection unit 33 then counts and makes a histogram of the offset amounts found for each of the small areas DWt1 to DWtn.

Figure 7:
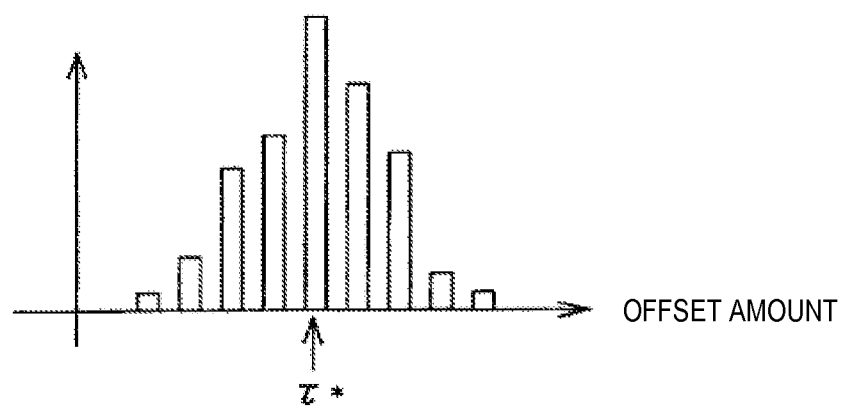
FIG. 7 is a diagram showing an example of a histogram obtained by the three-dimensional object detection unit of FIG. 3.

FIG. 7 is a diagram showing an example of a histogram obtained by the three-dimensional object detection unit 33. Some variation arises in the offset amounts which are the movement amounts that yield minimal errors between the small areas DWt1 to DWtn and the differential waveform DWt−1 at immediately preceding point in time, as shown in FIG. 7. Therefore, the three-dimensional object detection unit 33 makes a histogram of the offset amounts including this variation, and calculates the travel distance from the histogram. At this time, the three-dimensional object detection unit 33 calculates the travel distance of the three-dimensional object from maximal values of the histogram. Specifically, the three-dimensional object detection unit 33 in the example shown in FIG. 7 calculates the offset amount that yields maximum values of the histogram as a travel distance τ*. This travel distance τ* is the relative travel distance of the other vehicle VX in relation to the vehicle V. Therefore, when calculating the absolute travel distance, the three-dimensional object detection unit 33 calculates the absolute travel distance based on the resulting travel distance τ* and a signal from the vehicle speed sensor 20.

Figure 8:
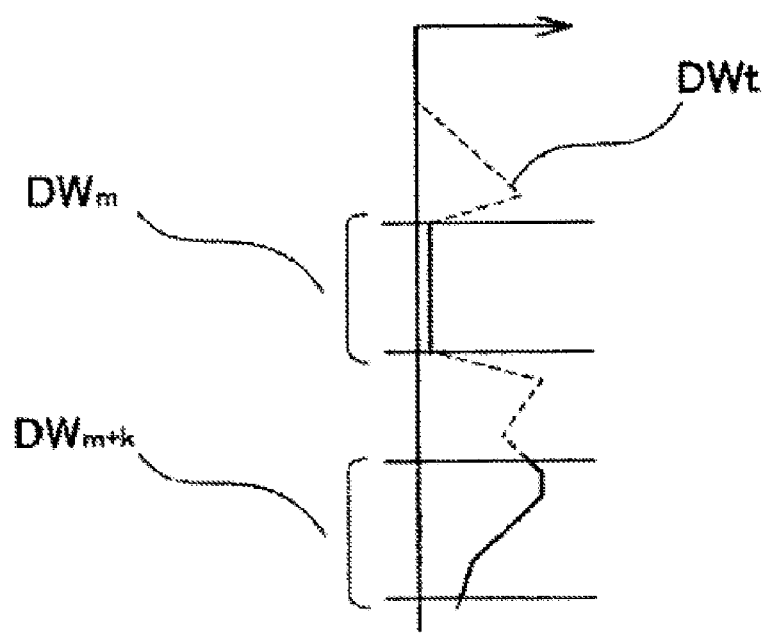
FIG. 8 is a diagram showing the weighting by the three-dimensional object detection unit of FIG. 3.

When making a histogram, the three-dimensional object detection unit 33 may weight each of the plurality of small areas DWt1 to DWtn, and may count and make a histogram of the offset amounts found for each small areas DWt1 to DWtn in accordance with the weightings. FIG. 8 is a diagram showing the weighting by the three-dimensional object detection unit 33.

The small area DWm (m being an integer of 1 or more and n−1 or less) is flat as shown in FIG. 8. Specifically, the small area DWm is where there is the smallest difference between the maximum value and minimum value of the pixel number count representing a predetermined differential. The three-dimensional object detection unit 33 reduces the weighting for this small area DWm. This is because the flat small area DWm has no features and there is a high likelihood of great error in calculating the offset amount.

The small area DWm+k (k being an integer of n−m or less) has much undulation. Specifically, the small area DWm has a large difference between the maximum value and minimum value of the pixel number count representing a predetermined differential. The three-dimensional object detection unit 33 increases the weighting of this small area DWm. This is because the greatly undulating small area DWm+k has unique features and a high possibility that the offset amount will be calculated accurately. Weighting in this manner makes it possible to improve the precision of calculating the travel distance.

The differential waveform DWt is divided into a plurality of small areas DWt1 to DWtn in the above embodiment in order to improve the precision of calculating travel distance, but it does not need to be divided into small areas DWt1 to DWtn in cases that do not require much precision of calculating travel distance. In such cases, the three-dimensional object detection unit 33 calculates travel distance from the offset amount of the differential waveform DWt when error between the differential waveform DWt and the differential waveform DWt−1 is minimal. Specifically, the method of finding the offset amount between the differential waveform DWt−1 at immediately preceding point in time and the differential waveform DWt at the current time is not limited to the specifics described above.

Returning to FIG. 3, the computer 30 comprises a smear detection unit 40. The smear detection unit 40 detects areas where smears are produced from the captured image data obtained by the imaging of the camera 10. A smear is an occurrence of whiteout in a CCD image sensor or the like, and the smear detection unit 40 may therefore be omitted when the camera 10 employed uses a CMOS image sensor or the like which is free of such smears.

Figure 9:
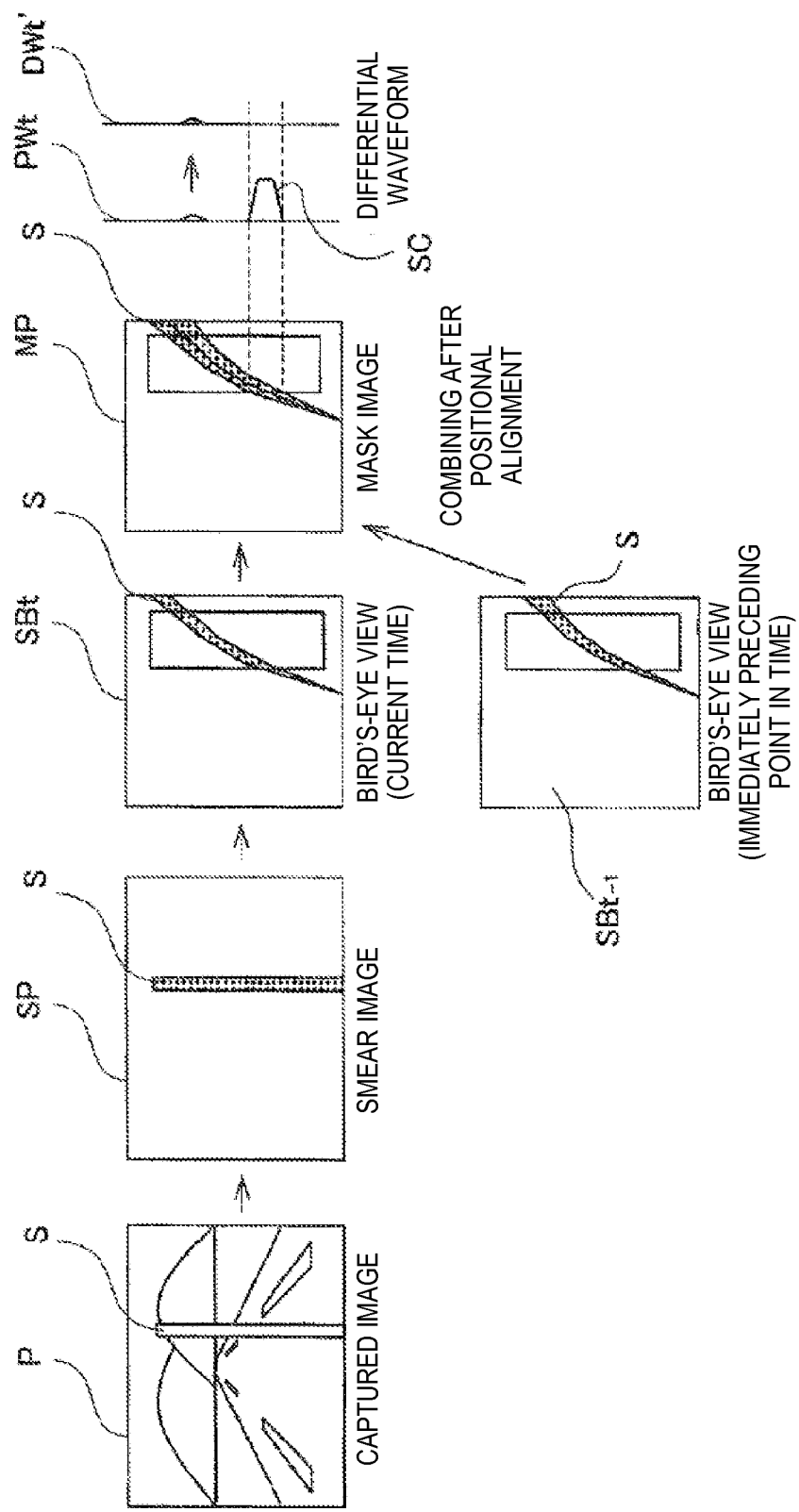
FIG. 9 illustrates the process by the smear detection unit of FIG. 3 and the differential waveform calculation process thereof.

FIG. 9 is an image drawing for describing the process by the smear detection unit 40 and the differential waveform DWt calculation process thereof. First, data of a captured image P containing a smear S is inputted to the smear detection unit 40. At this time, the smear detection unit 40 detects the smear S from the captured image P. There are various methods of detecting the smear S, but in the case of a common charge-coupled device (CCD) camera, for example, the smear S only occurs downward in the image starting from the light source. Therefore, a search is made in the present embodiment for an area that has a luminance value of a predetermined value or greater from the bottom of the image upward and that is continuous in the longitudinal direction, and this areas are specified as a smear S occurrence area.

The smear detection unit 40 creates data of a smear image SP in which the pixel value of smear S occurrence locations is "1" and all other locations have a value of "0." After creating the data, the smear detection unit 40 transmits the data of the smear image SP to the viewpoint conversion unit 31. The viewpoint conversion unit 31 to which the data of the smear image SP is inputted then converts the viewpoint of this data to a bird's-eye view. The viewpoint conversion unit 31 thereby creates data of a smear bird's-eye view image SBt. After creating this data, the viewpoint conversion unit 31 transmits the data of the smear bird's-eye view image SBt to the positional alignment unit 32. The viewpoint conversion unit 31 transmits the data of the smear bird's-eye view image SBt−1 of immediately preceding point in time to the positional alignment unit 32.

The positional alignment unit 32 aligns the positions of the smear bird's-eye view images SBt, SBt−1 in the data. The specific positional alignment is the same as when the positions of the bird's-eye view images PBt, PBt−1 are aligned in the data. After the positional alignment, the positional alignment unit 32 finds the logical sum of the smear S occurrence areas of the smear bird's-eye view images SBt, SBt−1. The positional alignment unit 32 thereby creates data of a mask image MP. After creating this data, the positional alignment unit 32 transmits the data of the mask image MP to the three-dimensional object detection unit 33.

The three-dimensional object detection unit 33 sets the frequency distribution counted number to zero for the location in the mask image MP equivalent to the smear S occurrence area. Specifically, when a differential waveform DWt such as the one shown in FIG. 9 is generated, the three-dimensional object detection unit 33 sets the counted number SC resulting from the smear S to zero and generates a corrected differential waveform DWt'.

The three-dimensional object detection unit 33 in the present embodiment finds the travel speed of the vehicle V (the camera 10), and from the travel speed finds offset amounts for stationary objects. After finding the offset amounts of stationary objects, the three-dimensional object detection unit 33 calculates the travel distance of the three-dimensional object while disregarding the offset amounts that correspond to stationary objects among the maximum values of the histogram.

Figure 10:
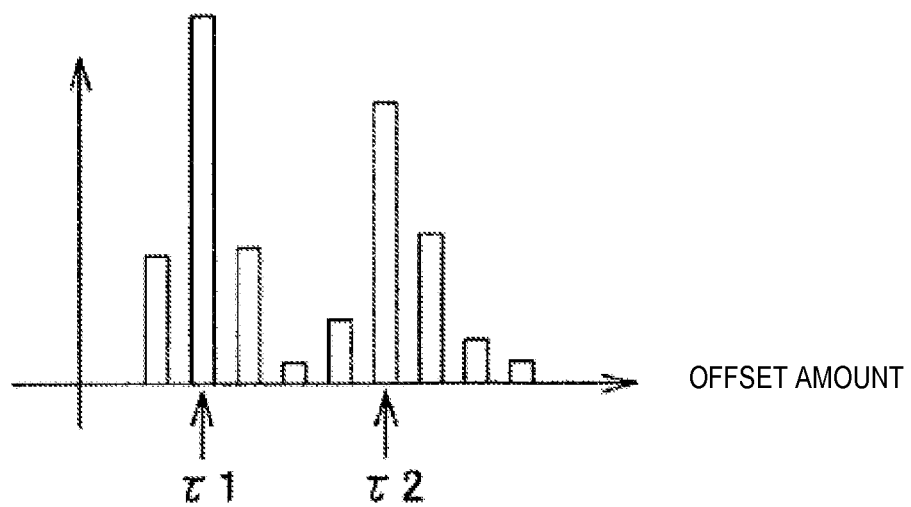
FIG. 10 is a diagram showing another example of a histogram obtained by the three-dimensional object detection unit of FIG. 3.

FIG. 10 is a diagram showing another example of a histogram obtained by the three-dimensional object detection unit 33. When another stationary object besides the other vehicle VX enters the angle of view of the camera 10, two maximal values τ1, τ2 appear in the resulting histogram. In this case, either one of the two maximal values τ1, τ2 is the offset amount of the stationary object. Therefore, the three-dimensional object detection unit 33 finds the offset amount for the stationary object from the travel speed, disregards the maximal value that corresponds to the offset amount, and uses the other remaining maximal value to calculate the travel distance of the three-dimensional object.

Even with disregarding the offset amount corresponding to the stationary object, there could be a plurality of other vehicles VX within the angle of view of the camera 10 in cases of a plurality of maximal values. However, it is extremely rare for there to be a plurality of other vehicles VX within the detection areas A1, A2. Therefore, the three-dimensional object detection unit 33 halts the calculation of the travel distance.

Figure 11:
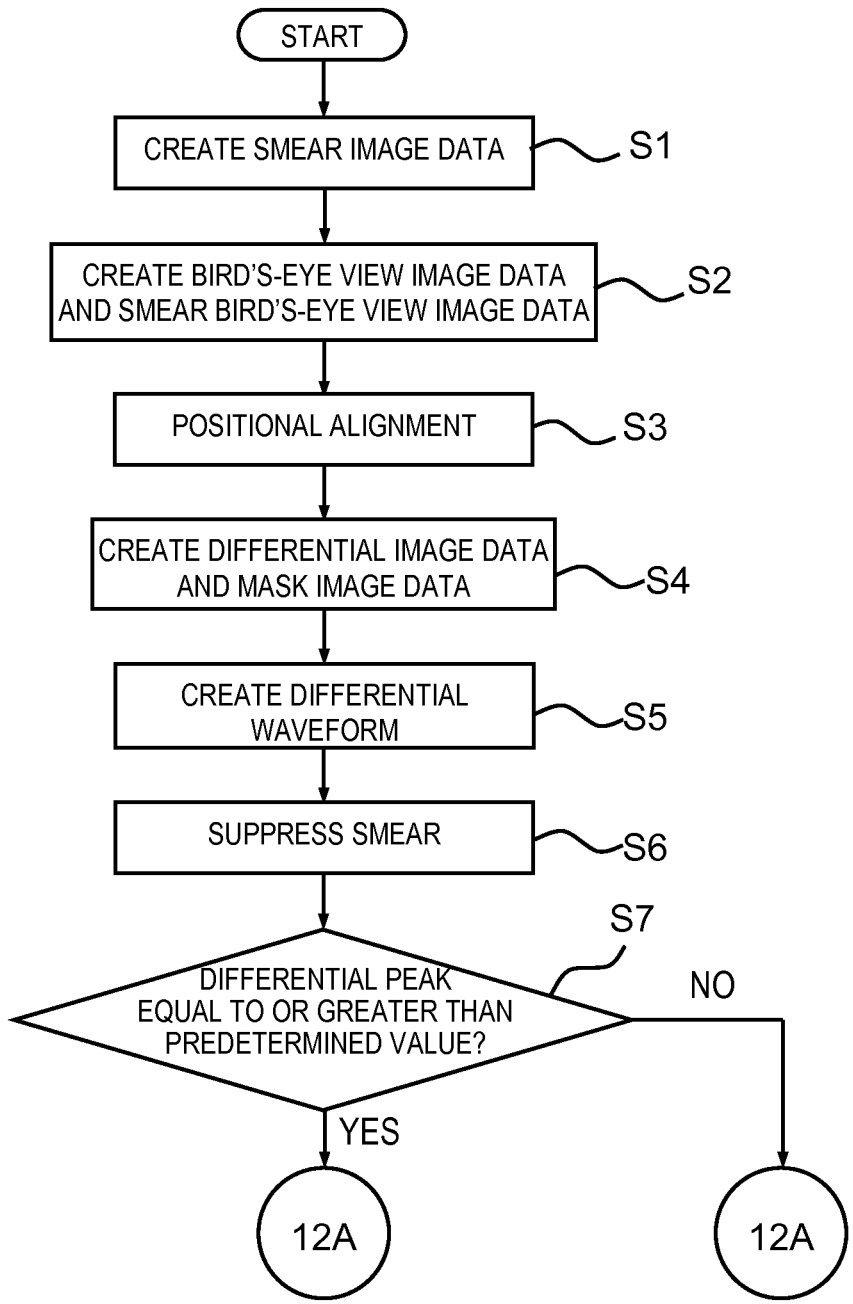
FIG. 11 is a flowchart (the first part) showing the three-dimensional object detection method which uses differential waveform information and which is executed by the viewpoint conversion unit, the positional alignment unit, the smear detection unit, and the three-dimensional object detection unit of FIG. 3.
Figure 12:
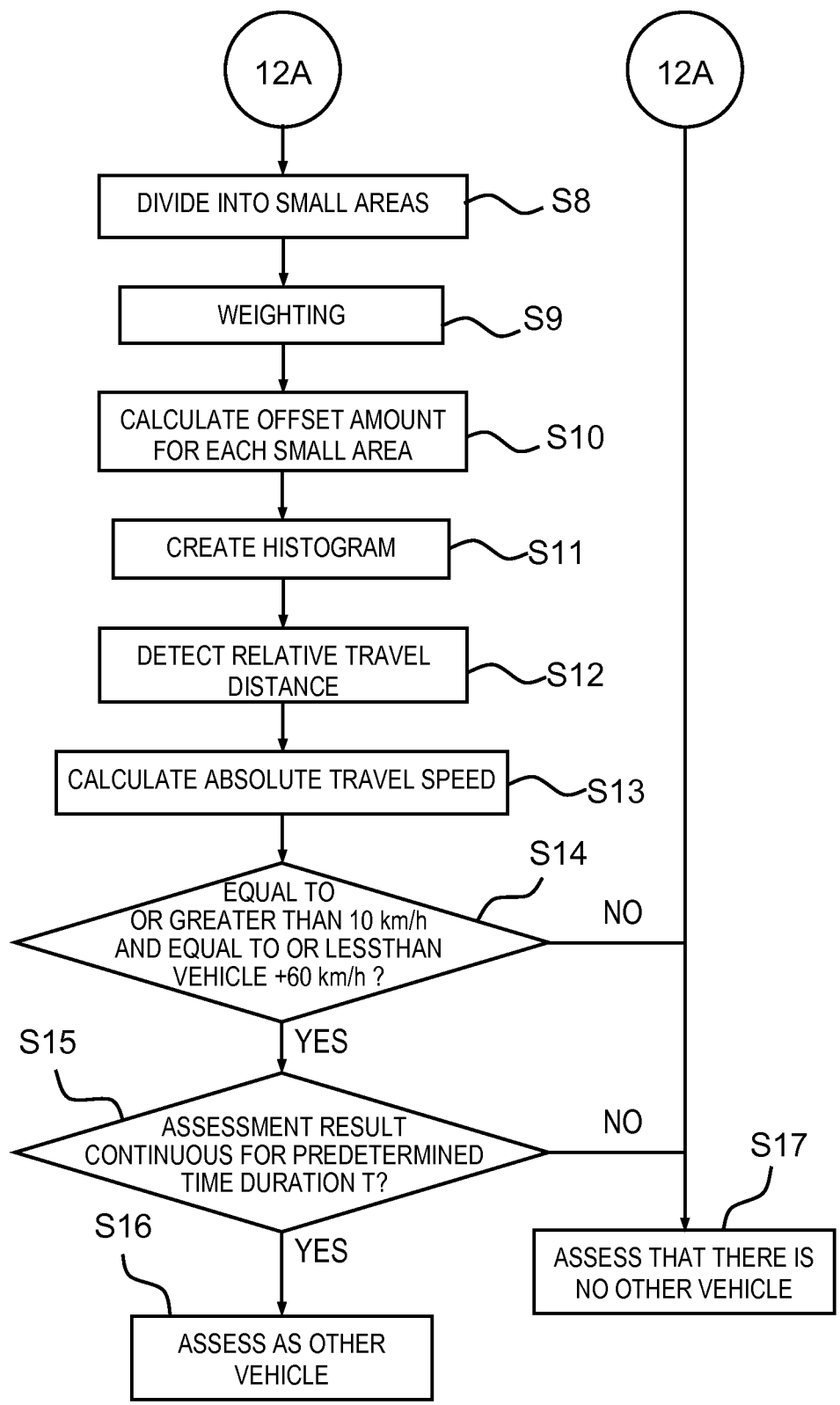
FIG. 12 is a flowchart (the second part) showing the three-dimensional object detection method which uses differential waveform information and which is executed by the viewpoint conversion unit, the positional alignment unit, the smear detection unit, and the three-dimensional object detection unit of FIG. 3.

Next, the procedure of detecting three-dimensional objects from differential waveform information is described. FIGS. 11 and 12 are flowcharts showing the three-dimensional object detection procedure of the present embodiment. First, in step S0, the computer 30 sets the detection areas based on a predetermined rule as shown in FIG. 11. The method of setting the detection areas is described in detail hereinafter. The computer 30 then inputs data of the captured image P from the camera 10, and creates a smear image SP by means of the smear detection unit 40 (S1). Next, the viewpoint conversion unit 31 creates a bird's-eye view image PBt from the data of the captured image P from the camera 10, and creates data of a smear bird's-eye view image SBt from the data of the smear image SP (S2).

The three-dimensional object detection unit 33 then positionally aligns the data of the bird's-eye view image PBt and the data of the bird's-eye view image PBt−1 of immediately preceding point in time, and also positionally aligns the data of the smear bird's-eye view image SBt and the smear bird's-eye view image SBt−1 of immediately preceding point in time (S3). After this positional alignment, the three-dimensional object detection unit 33 creates data of a differential image PDt and creates data of a mask image MP (S4). The three-dimensional object detection unit 33 then creates a differential waveform DWt from the data of the differential image PDt and the data of the differential image PDt−1 of immediately preceding point in time (S5). After creating the differential waveform DWt, the three-dimensional object detection unit 33 sets zero as the counted number that corresponds to the smear S occurrence area within the differential waveform DWt, and suppresses the effect from the smear S (S6).

The three-dimensional object detection unit 33 then assesses whether or not the peak of the differential waveform DWt is equal to or greater than a first threshold α (S7). When the peak of the differential waveform DWt is not equal to or greater than the first threshold α, and specifically when there is virtually no differential, it is assumed there is no three-dimensional object in the captured image P. Therefore, upon assessing that the peak of the differential waveform DWt is not equal to or greater than the first threshold α (S7: NO), the three-dimensional object detection unit 33 assesses that there is no three-dimensional object and that there is no other vehicle as an obstacle (FIG. 12: S16). The process shown in FIGS. 11 and 12 is then ended.

Upon assessing that the peak of the differential waveform DWt is equal to or greater than the first threshold α (S7: YES), the three-dimensional object detection unit 33 assesses that there is a three-dimensional object and divides the differential waveform DWt into a plurality of small areas DWt1 to DWtn (S8). The three-dimensional object detection unit 33 then weights each of the small areas DWt1 to DWtn (S9). The three-dimensional object detection unit 33 thereafter calculates an offset amount for each of the small areas DWt1 to DWtn (S10) and creates a histogram taking the weightings into account (S11).

Based on the histogram, the three-dimensional object detection unit 33 then calculates a relative travel distance (S12), which is the travel distance of the three-dimensional object relative to the vehicle V. The three-dimensional object detection unit 33 then calculates the absolute travel distance of the three-dimensional object from the relative travel distance (S13). At this time, the three-dimensional object detection unit 33 temporally differentiates the relative travel distance to calculate the relative travel speed, and calculates the absolute travel speed taking into account the vehicle speed detected by the vehicle speed sensor 20.

The three-dimensional object detection unit 33 then assesses whether or not the absolute travel speed of the three-dimensional object is equal to or greater than 10 km/h, and whether or not the relative travel speed of the three-dimensional object relative to the vehicle V is equal to or less than +60 km/h (S14). When either of these conditions is met (S14: YES), the three-dimensional object detection unit 33 assesses that the three-dimensional object is another vehicle VX (S15). The process shown in FIGS. 11 and 12 is then ended. When neither of these conditions are met (S14: NO), the three-dimensional object detection unit 33 assesses that there is no other vehicle (S16). The process shown in FIGS. 11 and 12 is then ended.

Areas behind and to the rear of the vehicle V are designated as detection areas A1, A2 in the present embodiment, and emphasis is placed on detecting other vehicles VX traveling in adjacent traffic lanes adjacent to the lane traveled by the vehicle where attention should be paid while the vehicle V is traveling. Emphasis is placed particularly on whether or not there is a possibility of contact when the vehicle V is changing traffic lanes. This is because when the vehicle V is changing traffic lanes, an assessment is made of whether or not there is a possibility of contact with another vehicle VX traveling in an adjacent traffic lane adjacent to the lane traveled by the vehicle. Therefore, the process in step S14 is executed. Specifically, assuming the system of the present embodiment is activated on high-speed roads, when the speed of a three-dimensional object is less than 10 km/h, it will rarely be a problem if another vehicle VX is present because it will be positioned far behind the vehicle V when the vehicle V is changing traffic lanes. Similarly, when the relative travel speed of the three-dimensional object relative to the vehicle V exceeds +60 km/h (i.e. when the three-dimensional object is moving at a speed more than 60 km/h greater than the speed of the vehicle V), it will rarely be a problem during a traffic lane change because the object will be moving ahead of the vehicle V. Therefore, in step S14 it is equivalent to assessing if there is another VX that will be a problem during a traffic lane change.

The assessment in step S14 of whether or not the absolute travel speed of the three-dimensional object is equal to or greater than 10 km/h, and whether or not the relative travel speed of the three-dimensional object relative to the vehicle V is +60 km/h or less, has the following effect. There could be cases, for example, in which an error in mounting the camera 10 causes the absolute travel speed of a stationary object to be detected at several km/h. Consequently, the possibility of assessing that the stationary object is another vehicle VX can be reduced by assessing if the speed is 10 km/h or greater. Another possibility is that noise could cause the relative speed of the three-dimensional object relative to the vehicle V to be detected at a speed exceeding +60 km/h. Consequently, the possibility of erroneous detection due to noise can be reduced by assessing if the relative speed is +60 km/h or less.

Furthermore, another option instead of the process of S14 is to assess that the absolute travel speed is not negative, or not 0 km/h. Because emphasis is placed on whether or not there is a possibility of contact when the vehicle V is changing traffic lanes in the present embodiment, a warning may be sounded to the driver of the vehicle or a warning-equivalent display may be performed by a predetermined display device when another vehicle VX is detected in step S15.

Thus, according to the procedure of detecting three-dimensional objects from differential waveform information in the present example, a differential waveform DWt is created by counting and creating a frequency distribution of the number of pixels which represent predetermined differentials in the data of the differential image PDt, along the falling direction of the three-dimensional object by viewpoint conversion. A pixel representing a predetermined differential in the data of the differential image PDt is a pixel that has changed between images of different times; in other words, a pixel in a location where a three-dimensional object has entered. Therefore, a differential waveform DWt is created in a location where a three-dimensional object has entered by counting and creating a frequency distribution of the number of pixels along the falling direction of the three-dimensional object. A differential waveform DWt is created from information of the height direction in relation to the three-dimensional object in particular because the number of pixels is counted along the falling direction of the three-dimensional object. The travel distance of the three-dimensional object is then calculated from the change over time of the differential waveform DWt containing the height direction information. Therefore, the detected location before the time change and the detected location after the time change are more likely to be the same location in the three-dimensional object because they are specified including the height direction information, the travel distance can be calculated from the change over time in the same location, and the precision of calculating travel distance can be improved, in comparison with cases such as when only the movement of one point is focused on.

The counted number of the frequency distribution is set to zero for locations in the differential waveform DWt that are equivalent to smear S occurrence areas. Waveform regions in the differential waveform DWt that are created by the smear S can thereby be removed, and erroneous detection of the smear S as a three-dimensional object can be prevented.

The travel distance of the three-dimensional object is calculated from the offset amount of the differential waveform DWt when the error in a differential waveform DWt created at a different time is minimal. Therefore, the travel distance can be calculated from the offset amount of primary information, which is the waveform, and the calculation cost when calculating the travel distance can be suppressed.

A differential waveform DWt created at a different time is also divided into a plurality of small areas DWt1 to DWtn. Thus, a plurality of waveforms can be obtained, which represent the various locations of the three-dimensional object, by dividing the differential waveform into a plurality of small areas DWt1 to DWtn. The travel distance of the three-dimensional object is calculated by finding the offset amount where the respective waveform errors are minimal is found for each of the small areas DWt1 to DWtn, and counting and creating a histogram of the offset amounts found for each of the small areas DWt1 to DWtn. Therefore, an offset amount is found for each of the locations of the three-dimensional object, the travel distance is found from the plurality of offset amounts, and the precision of calculating the travel distance can be improved.

Each of the plurality of small areas DWt1 to DWtn is weighted, and the offset amounts found for each of the small areas DWt1 to DWtn are counted to create a histogram in accordance with the weightings. Therefore, the travel distance can be calculated more appropriately by increasing the weightings of characteristic areas and reducing the weightings of uncharacteristic areas. Therefore, the precision of calculating the travel distance can be further improved.

In the small areas DWt1 to DWtn of the differential waveform DWt, the greater the difference between the maximum and minimum values of the count of number of pixels representing predetermined differentials, the greater the weighting. Therefore, the greater the undulation in an area with a greater difference between the maximum and minimum values, the greater the weighting, and the lesser the weighting in flat areas with less undulation. Areas with greater undulation have offset amounts that are more accurately found in terms of shape than flat areas, and the precision of calculating travel distance can therefore be improved by increasing the weightings of areas having a greater difference between the maximum and minimum values.

The travel distance of the three-dimensional object is also calculated from the maximal values of the histogram obtained by counting the offset amounts found for each of the small areas DWt1 to DWtn. Therefore, a more highly accurate travel distance can be calculated from the maximal values even when there is variation among the offset amounts.

Because the offset amounts for stationary objects are found and these offset amounts are disregarded, it is possible to prevent stationary objects from causing decreases in the precision of calculating the travel distance of a three-dimensional object. When the offset amount corresponding to a stationary object is disregarded and there are multiple maximal values, the calculation of the travel distance of the three-dimensional object is halted. It is therefore possible to prevent situations in which an erroneous travel distance is calculated, such as one with multiple maximal values.

In the above embodiment, the speed of the vehicle V is assessed based on a signal from the vehicle speed sensor 20, but is not limited as such; the vehicle speed may be estimated from a plurality of images of different times. In this case, the vehicle speed sensor is unnecessary, and the configuration can be simplified.

In the above embodiment, a captured current image and an image of immediately preceding point in time are converted to bird's-eye views, the converted bird's-eye views are positionally aligned to create a differential image PDt, and the created differential image PDt is evaluated along the falling direction (the falling direction of the three-dimensional object when the captured image is converted to a bird's-eye view) to create a differential waveform DWt, but the present invention is not limited as such. For example, the image of immediately preceding point in time alone may be converted to a bird's-eye view, the view may be converted back to the equivalent of a captured image after the converted bird's-eye view has been positionally aligned, a differential image may be created from this image and an image of the current time, and a differential waveform DWt may be created by evaluating the created differential image along a direction equivalent to the falling direction (i.e., a direction equivalent to the falling direction converted to a direction in the captured image). Specifically, if the image of the current time and the image of immediately preceding point in time can be positionally aligned, a differential image PDt can be generated from the differential of the positionally aligned images, and the differential image PDt can be evaluated along the falling direction of the three-dimensional object when the image has been converted to a bird's-eye view; it is not absolutely necessary to create a clear bird's-eye view.

Detecting Three-Dimensional Object from Edge Information

Figure 13:
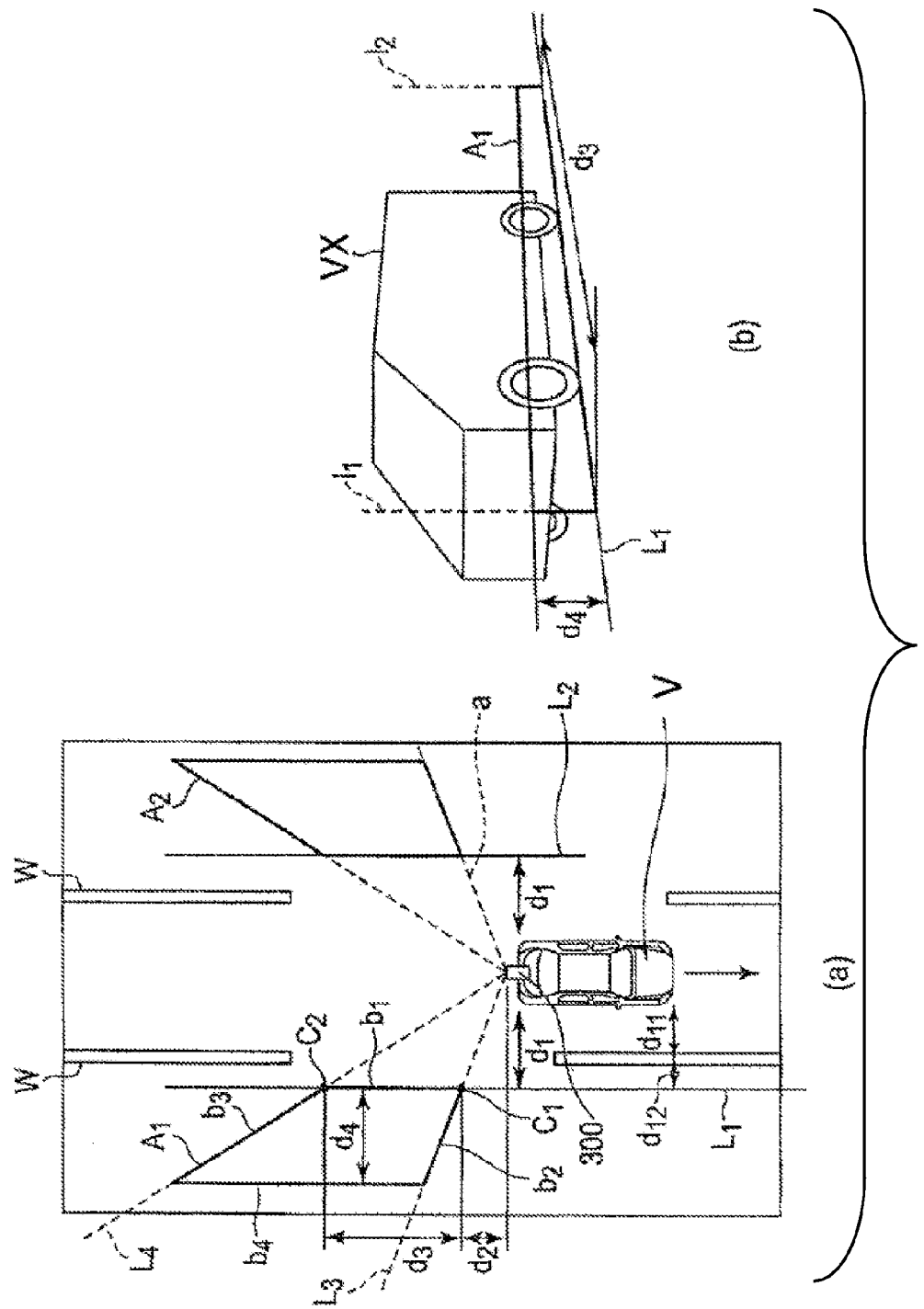
FIG. 13 illustrates the traveling state of the vehicle of FIG. 1 (three-dimensional object detection from edge information), wherein (a) is a plan view showing the positional relationship of detection areas and the like and (b) is a perspective view showing the positional relationship of the detection areas and the like in real space.

The following is a description of the three-dimensional object detection block B, which can be activated instead of the block A shown in FIG. 3, is configured from the luminance difference controller 35, the edge line detection unit 36, and the three-dimensional object detection unit 37, and which uses edge information. FIG. 13 illustrates features such as the imaging range of the camera 10 in FIG. 3, wherein FIG. 13(a) is a plan view and FIG. 13(b) is a perspective view of real space to the rear of the vehicle V. The camera 10 has a predetermined angle of view a, and the area to the rear of the vehicle included in this predetermined angle of view a is imaged as shown in FIG. 13(a). The angle of view a of the camera 10 is set so that the imaging range of the camera 10 includes adjacent traffic lanes in addition to the lane on which the vehicle V is traveling, similar to the case shown in FIG. 2.

The detection areas A1, A2 of the present example are trapezoidal as seen in a plan view (viewed from bird's-eye), and the positions, sizes, and shapes of the detection areas A1, A2 are determined based on distances d1 to d4. The detection areas A1, A2 of the example shown in this drawing are not limited to trapezoidal shapes, and may have other shapes such as rectangles when viewed from bird's-eye as shown in FIG. 2. The detection area setting unit 34 in the present embodiment can also set the detection areas A1, A2 by means of the previously described method.

The distance d1 is a distance from the vehicle V to the ground lines L1, L2. The ground lines L1, L2 are lines where a three-dimensional object, which is present in a traffic lane adjacent to the traffic lane traveled by the vehicle V, contacts the ground surface. In the present embodiment, one purpose is to detect other vehicles VX and the like (including two-wheeled vehicles and the like) traveling in the left and right traffic lanes adjacent to the traffic lane of the vehicle V, to the rear and sides of the vehicle V. Therefore, the distance d1, which is the distance to the position of the ground line L1 or L2 of another vehicle VX, can be determined in a substantially fixed manner from the distance d11 from the vehicle V to the white line W and the distance d12 from the white line W to a position estimated to be where the other vehicle VX is traveling.

The distance d1 is not limited to being determined in a fixed manner, and may be variable. In this case, the computer 30 recognizes the position of the white line W relative to the vehicle V through a technique for white line recognition or the like, and determines the distance d11 based on the position of the recognized white line W. The distance d1 can thereby be set in a variable manner using the determined distance d11. In the present embodiment below, the distance d1 is determined in a fixed manner because the position where the other vehicle VX is traveling (the distance d12 from the white line W) and the position where the vehicle V is traveling (the distance d11 from the white line W) are decided in an approximate manner.

The distance d2 is a distance extending in the vehicle traveling direction from the rear end part of the vehicle V. The distance d2 is determined so that the detection areas A1, A2 fit into at least the angle of view "a" of the camera 10. Particularly in the present embodiment, the distance d2 is set so as to border the range sectioned by the angle of view "a". The distance d3 is a distance that represents the length of the detection area A1 or A2 in the vehicle traveling direction. This distance d3 is determined based on the size of the three-dimensional object that is the detection objective. Because the detection objective is another vehicle VX or the like in the present embodiment, the distance d3 is set to a length that includes the other vehicle VX.

The distance d4 is a distance representing a height set in real space so as to include the tires of the other vehicle VX or the like, as shown in FIG. 13(b). In a bird's-eye view image, the distance d4 is a length shown in FIG. 13(a). The distance d4 can also be a length that does not include traffic lanes that are even farther adjacent past the left and right adjacent traffic lanes (i.e. two traffic lanes over) in a bird's-eye view image. This is because when traffic lanes that are two lanes over from the vehicle V are included, there is no distinction made as to whether there is another vehicle VX in the traffic lanes adjacent to the left and right of the white lines in the lane where the vehicle V is traveling, or there is another vehicle VX in the traffic lanes two lanes over.

As described above, the distances d1 to d4 are determined, and the positions, sizes, and shapes of the detection areas A1, A2 are thereby determined. To give a specific description, the positions of top borders b1 of the trapezoidal detection areas A1, A2 are determined by the distance d1. The starting positions C1 of the top borders b1 are determined by the distance d2. The ending positions C2 of the top borders b1 are determined by the distance d3. Side borders b2 of the trapezoidal detection areas A1, A2 are determined by straight lines L3 extending from the camera 10 toward the starting positions C1. Similarly, side borders b3 of the trapezoidal detection areas A1, A2 are determined by straight lines L4 extending from the camera 10 toward the ending positions C2. The positions of bottom borders b4 of the trapezoidal detection areas A1, A2 are determined by the distance d4. Thus, the areas enclosed by the borders b1 to b4 constitute the detection areas A1, A2. The detection areas A1, A2 are squares (rectangles) in terms of real space to the rear of the vehicle V, as shown in FIG. 13(b).

Returning to FIG. 3, the viewpoint conversion unit 31 inputs the captured image data of the predetermined areas obtained by the imaging of the camera 10. The viewpoint conversion unit 31 performs a viewpoint conversion process on the inputted captured image data, converting this data to bird's-eye view image data which is seen as viewed from bird's-eye. This bird's-eye view is what would be seen from the viewpoint of an imaginary camera looking vertically downward (or downward at somewhat of an incline), for example, from above. This viewpoint conversion process can be carried out by the technique disclosed in Japanese Laid-open Patent Publication No. 2008-219063, for example.

The luminance difference controller 35 performs a calculation of luminance difference on the bird's-eye view image data that has been viewpoint-converted by the viewpoint conversion unit 31, in order to detect the edges of the three-dimensional object included in the bird's-eye view image. For each of a plurality of positions along a vertical imaginary line extending vertically within real space, the luminance difference controller 35 calculates the luminance difference between two pixels in the vicinity of these positions. The luminance difference controller 35 can calculate the luminance difference by either a method of setting only one vertical imaginary line extending vertically within real space, or a method of setting two vertical imaginary lines.

The specific method of setting two vertical imaginary lines will be described. For the viewpoint-converted bird's-eye view image, the luminance difference controller 35 sets a first vertical imaginary line corresponding to a line segment extending vertically within real space, and a second vertical imaginary line corresponding to a line segment extending vertically within real space, different from the first vertical imaginary line. The luminance difference controller 35 finds luminance differences between points on the first vertical imaginary line and points on the second vertical imaginary line, continuously along the first vertical imaginary line and the second vertical imaginary line. The action of the luminance difference controller 35 is described in detail below.

Figure 14:
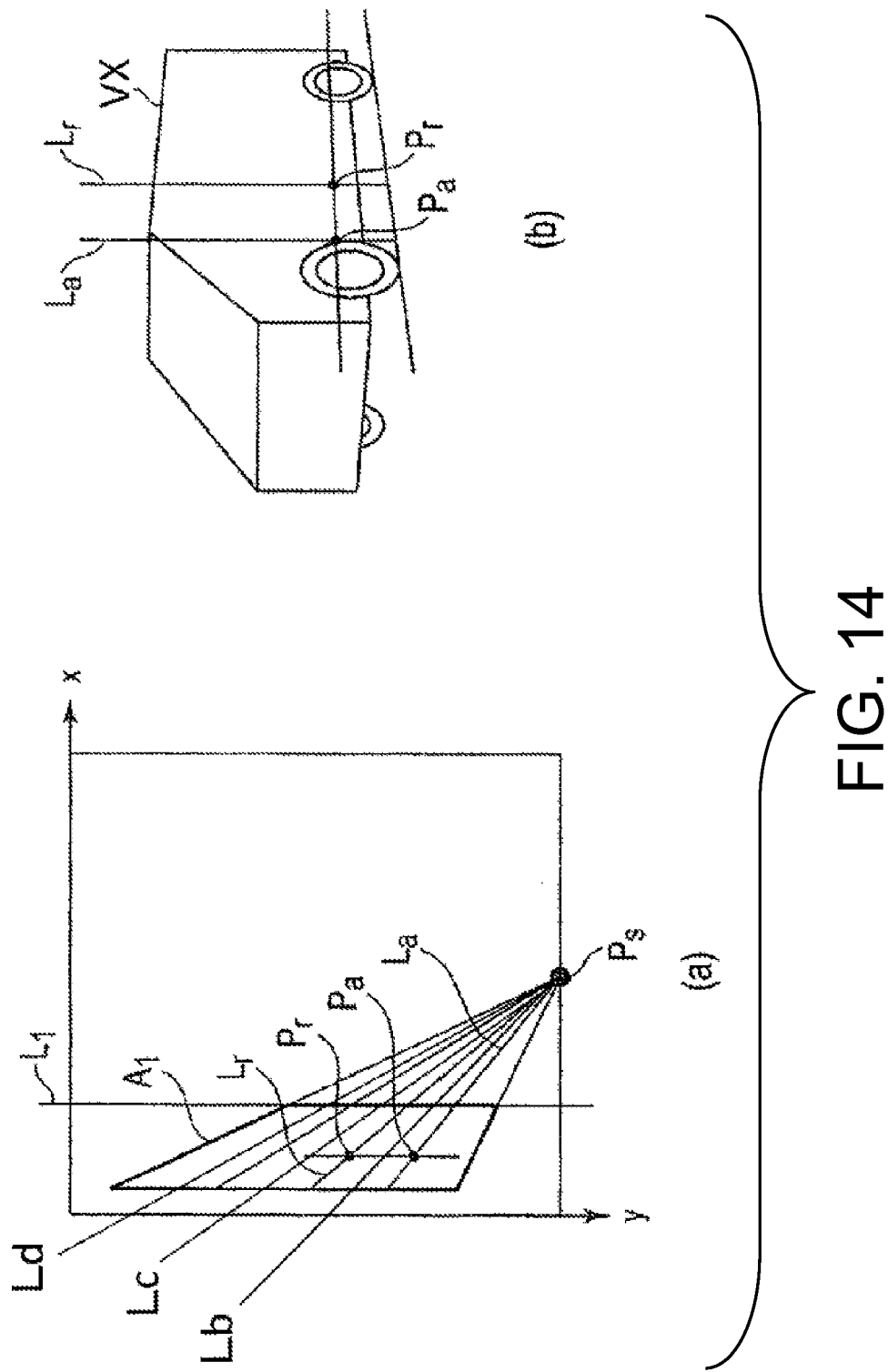
FIG. 14 illustrates the action of the luminance difference controller of FIG. 3, wherein (a) is a diagram showing the positional relationship between the focus lines, reference lines, focus points, and reference points in a bird's-eye view image, and (b) illustrates the positional relationship between the focus lines, reference lines, focus points, and reference points in real space.

The luminance difference controller 35 sets a first vertical imaginary line La (referred to as a focus line La below) which corresponds to a line segment extending vertically within real space, and which passes through the detection area A1, as shown in FIG. 14(a). The luminance difference controller 35 also sets a second vertical imaginary line Lr (referred to below as a reference line Lr) which is different from the focus line La, which corresponds to a line segment extending vertically within real space, and which passes through the detection area A1. The reference line Lr herein is set to a position separated from the focus line La by a predetermined distance within real space. Lines corresponding to line segments extending vertically within real space are lines which broaden out in a radial formation from the position Ps of the camera 10 in a bird's-eye view image. These lines broadening out in a radial formation are lines running along the falling direction of the three-dimensional object when converted to a bird's-eye view.

The luminance difference controller 35 sets a focus point Pa on the focus line La (a point on the first vertical imaginary line). The luminance difference controller 35 also sets a reference point Pr on the reference line Lr (a point on the second vertical imaginary line). In real space, the focus line La, the focus point Pa, the reference line Lr, and the reference point Pr have the relationship shown in FIG. 14(b). As is clear from FIG. 14(b), the focus line La and the reference line Lr are lines extending vertically within real space, and the focus point Pa and the reference point Pr are points set to substantially the same height within real space. The focus point Pa and the reference point Pr do not need to strictly be the exact same height, and error is allowed to an extent such that the focus point Pa and the reference point Pr can still be regarded as being at the same height.

The luminance difference controller 35 finds the luminance difference between the focus point Pa and the reference point Pr. When there is a large luminance difference between the focus point Pa and the reference point Pr, there is assumed to be an edge between the focus point Pa and the reference point Pr. The edge line detection unit 36 shown in FIG. 3 therefore detects an edge line based on the luminance difference between the focus point Pa and the reference point Pr.

Figure 15:
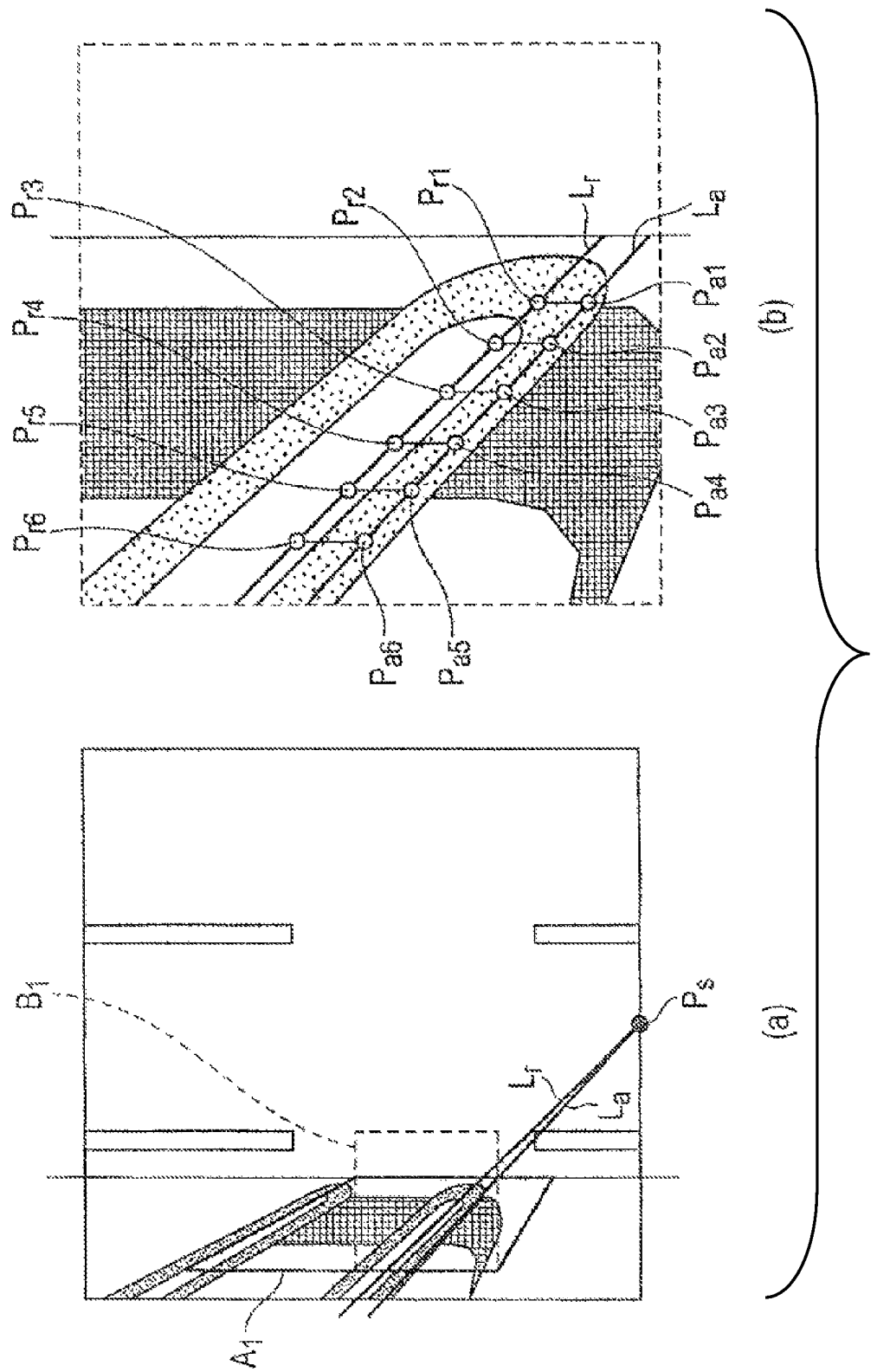
FIG. 15 illustrates the specific action of the luminance difference controller of FIG. 3, wherein (a) illustrates the detection areas in a bird's-eye view image and (b) illustrates the positional relationship between the focus lines, reference lines, focus points, and reference points in a bird's-eye view image.

This point will be described in greater detail. FIG. 15 illustrates the specific action of the luminance difference controller 35, wherein FIG. 15(a) illustrates a bird's-eye view image as seen from bird's-eye, and FIG. 15(b) is an enlarged view of the portion B1 of the bird's-eye view image shown in FIG. 15(a). Only the detection area A1 is used in the description for FIG. 15, but the luminance difference is calculated by the same procedure for the detection area A2.

When another vehicle VX is reflected into the image captured by the camera 10, the other vehicle VX appears in the detection area A1 in the bird's-eye view image as shown in FIG. 15(a). In the bird's-eye view image, the focus line La is set on the rubber portions of the tires of the other vehicle VX so that the enlarged view of the area B1 in FIG. 15(a) is shown in FIG. 15(b). In this state, the luminance difference controller 35 first sets the reference line Lr. The reference line Lr is set along the vertical direction in a position separated from the focus line La by a predetermined distance within real space. Specifically, in the three-dimensional object detection device 1 according to the present embodiment, the reference line Lr is set to a position separated from the focus line La by 10 cm within real space. The reference line Lr is thereby set in the bird's-eye view image on the wheels of the tires of the other vehicle VX, which are separated by 10 cm from the rubber of the tires of the other vehicle VX, for example.

Next, the luminance difference controller 35 sets a plurality of focus points Pa1 to PaN on the focus line La. In FIG. 15(b), six focus points Pa1 to Pa6 (when indicating any arbitrary point below, the point is simply referred to as the focus point Pai) are set for the sake of convenience. Any desired number of focus points Pa may be set on the focus line La. In the description below, N number of focus points Pa are described as being set on the focus line La.

Next, the luminance difference controller 35 sets reference points Pr1 to PrN so as to be at the same height as the focus points Pa1 to PaN within real space. The luminance difference controller 35 then calculates the luminance difference between focus points Pa and reference points Pr that are at the same height as each other. The luminance difference controller 35 thereby calculates the luminance difference of two pixels for each of a plurality of positions (1 to N) along a vertical imaginary line extending vertically within real space. The luminance difference controller 35 calculates the luminance difference between the first focus point Pa1 and the first reference point Pr1, and also calculates the luminance difference between the second focus point Pa2 and the second reference point Pr2, for example. The luminance difference controller 35 thereby continuously finds luminance differences along the focus line La and the reference line Lr. Specifically, the luminance difference controller 35 sequentially finds the luminance differences between the third to Nth focus points Pa3 to PaN and the third to Nth reference points Pr3 to PrN.

The luminance difference controller 35 repeatedly performs the above-described process of setting the reference line Lr, setting the focus points Pa and the reference points Pr, and calculating the luminance difference while shifting the focus line La within the detection area A1. Specifically, the luminance difference controller 35 repeatedly performs the above-described process while changing the positions of the focus line La and the reference line Lr by the same distance along the direction of the ground line L1 within real space. The luminance difference controller 35 sets the line that had been the reference line Lr in the previous process as the focus line La, sets the reference line Lr relative to this focus line La, and proceeds to sequentially find the luminance differences, for example.

Returning to FIG. 3, the edge line detection unit 36 detects an edge line from the continuous luminance differences calculated by the luminance difference controller 35. In the case shown in FIG. 15(b), for example, the luminance difference is small because the first focus point Pa1 and the first reference point Pr1 are positioned on the same tire portion. The second to sixth focus points Pa2 to Pa6 are positioned on the rubber portion of the tire, and the second to sixth reference points Pr2 to Pr6 are positioned on the wheel portion of the tire. Therefore, there will be a great luminance difference between the second to sixth focus points Pa2 to Pa6 and the second to sixth reference points Pr2 to Pr6. Therefore, the edge line detection unit 36 is able to detect that there is an edge line between the second to sixth focus points Pa2 to Pa6 and the second to sixth reference points Pr2 to Pr6 which have a great luminance difference.

Specifically, in detecting an edge line, the edge line detection unit 36 first assigns an attribute to the ith focus point Pai from the luminance difference between ith focus point Pai (coordinates $(xi, yi)$) and the ith reference point Pri (coordinates $(xi', yi')$), according to the following formula 1.

When $I(xi,yi) > I(xi',yi') + t$;

$s(xi,yi) = 1$

When $I(xi,yi) < I(xi',yi') - t$;

$s(xi,yi) = -1$

All other times;

$s(xi,yi) = 0$  Formula 1

In the above formula 1, t represents a threshold, I (xi, yi) represents the luminance value of the ith focus point Pai, and I (xi', yi') represents the luminance value of the ith reference point Pri. According to the above formula 1, when the luminance value of the focus point Pai is higher than a luminance value of the threshold t added to the reference point Pri, the attribute s (xi, yi) of the focus point Pai is '1'. When the luminance value of the focus point Pai is less than a luminance value of the threshold t subtracted from the reference point Pri, the attribute s (xi, yi) of the focus point Pai is '−1'. When the luminance value of the focus point Pai and the luminance value of the reference point Pri have any other relationship, the attribute s (xi, yi) of the focus point Pai is '0'.

Next, the edge line detection unit 36 determines whether or not the focus line La is an edge line from the continuity c (xi, yi) of the attribute s along the focus line La, based on the following formula 2.

When $s(xi,yi)=s(xi+1,yi+1)$ (excluding 0=0);

$c(xi,yi)=1$

All other times;

$c(xi,yi)=0$ Formula 2

When the attribute s (xi, yi) of the focus point Pai and the attribute s (xi+1, yi+1) of the adjacent focus point Pai+1 are the same, the continuity c (xi, yi) is '1'. When the attribute s (xi, yi) of the focus point Pai and the attribute s (xi+1, yi+1) of the adjacent focus point Pai+1 are not the same, the continuity c (xi, yi) is '0'.

The edge line detection unit 36 then finds the sum total of the continuities c of all the focus points Pa on the focus line La. The edge line detection unit 36 normalizes the continuities c by dividing the found sum total of the continuities c by the number N of focus points Pa. When the normalized value exceeds a threshold θ, the edge line detection unit 36 assesses that the focus line La is an edge line. The threshold θ is a value set in advance by experimentation or the like.

Specifically, the edge line detection unit 36 assesses whether or not the focus line La is an edge line based on the following formula 3. The edge line detection unit 36 then assesses whether or not the entire focus line La drawn in the detection area A1 is an edge line.

$\Sigma c(xi,yi)/N > \theta$ Formula 3

Returning to FIG. 3, the three-dimensional object detection unit 37 detects a three-dimensional object based on the amount of edge lines detected by the edge line detection unit 36. As described above, the three-dimensional object detection device 1 according to the present embodiment detects edge lines extending vertically within real space. When numerous vertically extending edge lines are detected, it means that there is a high likelihood of a three-dimensional object being present in the detection areas A1, A2. Therefore, the three-dimensional object detection unit 37 detects three-dimensional objects based on the amount of edge lines detected by the edge line detection unit 36. Furthermore, prior to detecting three-dimensional objects, the three-dimensional object detection unit 37 determines whether or not the edge lines detected by the edge line detection unit 36 are correct. The three-dimensional object detection unit 37 determines whether or not a change in luminance of the edge line along the edge line in the bird's-eye view image is greater than a predetermined threshold. When the change in luminance of the edge line in the bird's-eye view image is greater than the threshold, it is assessed that the edge line has been detected by an erroneous determination. When the change in luminance of the edge line in the bird's-eye view image is not greater than the threshold, the edge line is determined to be correct. This threshold is a value set in advance by experimentation or the like.

Figure 16:
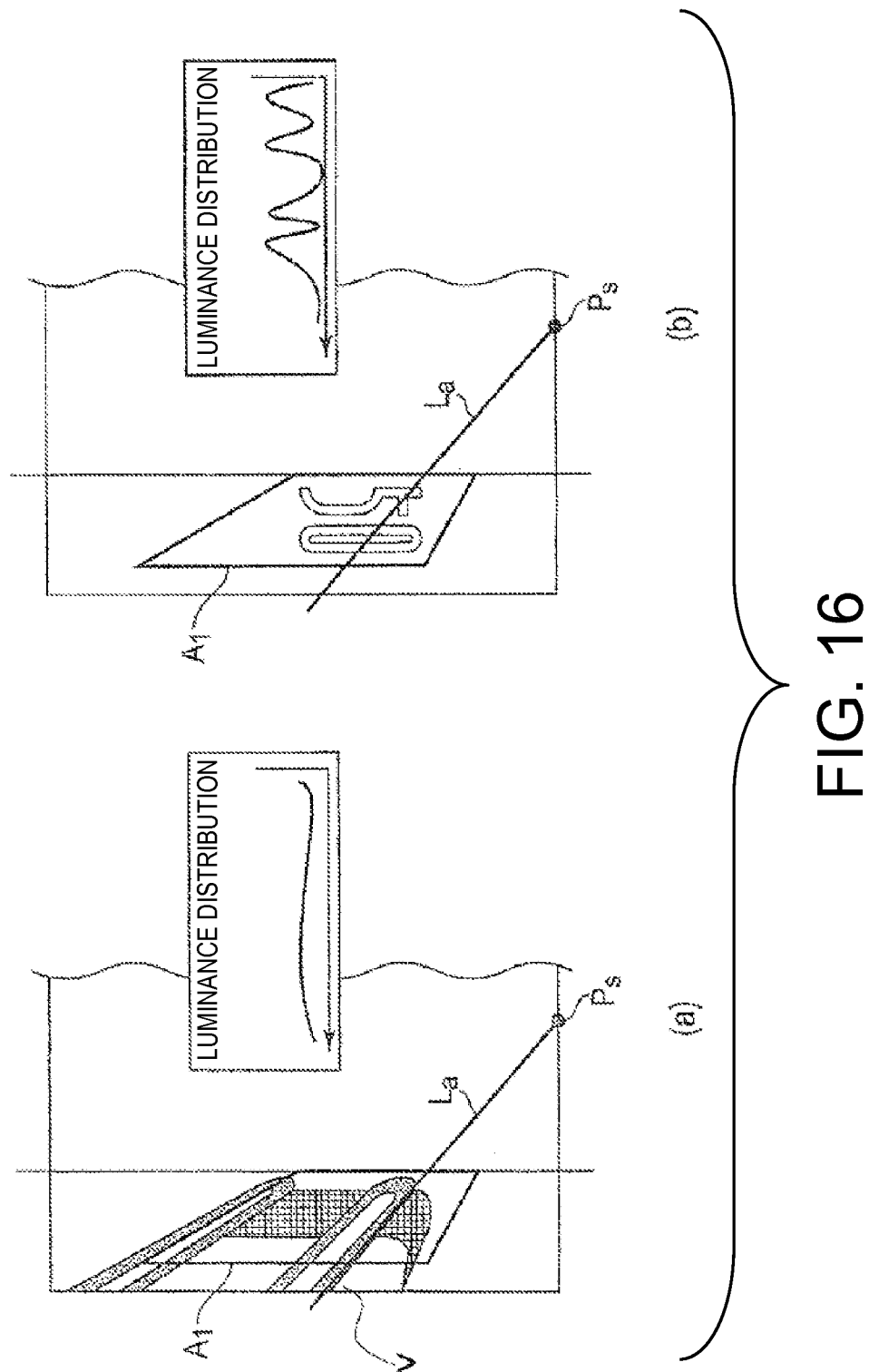
FIG. 16 illustrates an edge line and the luminance distribution on the edge line, wherein (a) illustrates the luminance distribution when there is a three-dimensional object (a vehicle) in the detection area, and (b) illustrates the luminance distribution when there is not a three-dimensional object in the detection area.

FIG. 16 illustrates the luminance distribution of an edge line, wherein FIG. 16(a) shows an edge line and the luminance distribution when there is another vehicle VX as a three-dimensional object in the detection area A1, and FIG. 16(b) shows an edge line and the luminance distribution when there is no three-dimensional object in the detection area A1.

As shown in FIG. 16(a), the focus line La set on the tire rubber portion of the other vehicle VX in a bird's-eye view image has been assessed to be an edge line. In this case, the luminance of the focus line La in the bird's-eye view image changes smoothly. This is due to the fact that the image captured by the camera 10 is viewpoint-converted to a bird's-eye view image, whereby the tires of the other vehicle VX are elongated within the bird's-eye view image. As shown in FIG. 16(b), the focus line La set in the white character portion reading "50" drawn on the road surface in the bird's-eye view image has been erroneously determined to be an edge line. In this case, the change in luminance of the focus line La in the bird's-eye view image undulates greatly. This is because portions of high luminance in the white characters and portions of low luminance on the road surface or the like are mixed together in the edge line.

Based on the differences in luminance distribution in the focus line La such as those described above, the three-dimensional object detection unit 37 determines whether or not an edge line has been detected by erroneous determination. When the change in luminance along the edge line is greater than a predetermined threshold, the three-dimensional object detection unit 37 determines that the edge line has been detected by erroneous determination. The edge line is then not used in three-dimensional object detection. This suppresses instances of things such as the white characters "50" on the road surface or plants on the road shoulder from being determined to be edge lines and the three-dimensional object detection precision from decreasing.

Specifically, the three-dimensional object detection unit 37 calculates the change in luminance of the edge line either formula 4 or 5 below. This change in luminance of the edge line is equivalent to a vertical-direction evaluation value in real space. The formula 4 below evaluates the luminance distribution by the total value of the squares of the differentials between the ith luminance value I (xi, yi) and the adjacent i+1th luminance value I (xi+1, yi+1) on the focus line La. The formula 5 below evaluates the luminance distribution by the total value of the absolute values of the differentials between the ith luminance value I (xi, yi) and the adjacent i+1th luminance value I (xi+1, yi+1) on the focus line La.

Vertical-equivalent-direction evaluation value=$\Sigma[\{I(xi, yi)-I(xi+1,yi+1)\}^2]$ Formula 4

Vertical-equivalent-direction evaluation value=$\Sigma|I(xi, yi)-I(xi+1,yi+1)|$ Formula 5

Formula 5 is not the only option, and another possible option is to binarize an attribute b of the adjacent luminance value using a threshold t2, and to total the binarized attributes b for all focus points Pa.

Vertical-equivalent-direction evaluation value=$\Sigma b(xi, yi)$

When $|I(xi,yi)-I(xi+1,yi+1)| > t2$;

$b(xi,yi)=1$

All other times;

$$b(xi,yi)=0 \quad \text{Formula 6}$$

When the absolute value of the luminance difference between the luminance value of the focus point Pai and the luminance value of the reference point Pri is greater than the threshold t2, the attribute b (xi, yi) of the focus point Pa (xi, yi) is '1'. When the relationship is anything else, the attribute b (xi, yi) of the focus point Pai is '0'. The threshold t2 is set in advance by experimentation or the like in order to determine that the focus line La is not on the same three-dimensional object. The three-dimensional object detection unit 37 then totals the attributes b of all the focus points Pa on the focus line La, finds the vertical-equivalent-direction evaluation value, and determines if the edge line is correct.

Figure 17:
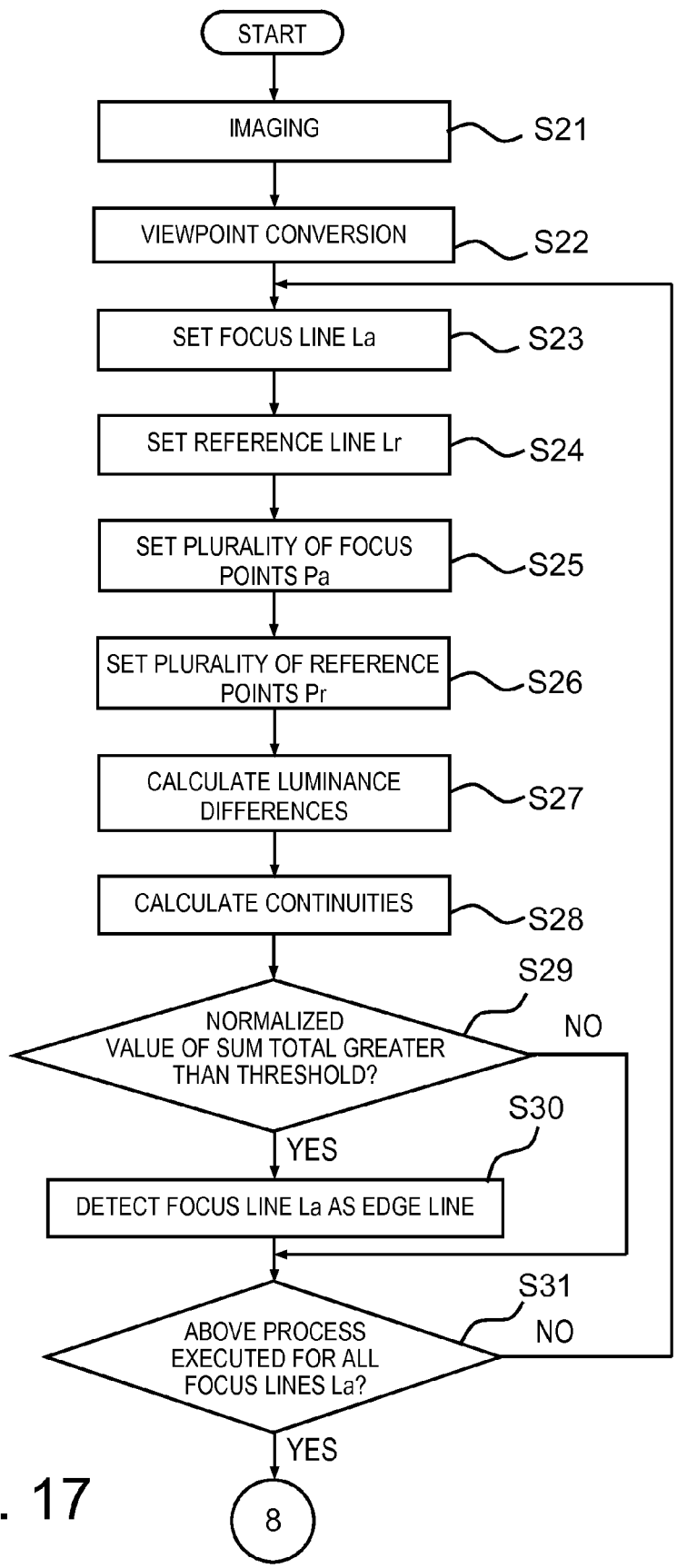
FIG. 17 is a flowchart (the first part) showing the three-dimensional object detection method which uses edge information and which is executed by the viewpoint conversion unit, the luminance difference controller, the edge line detection unit, and the three-dimensional object detection unit of FIG. 3.
Figure 18:
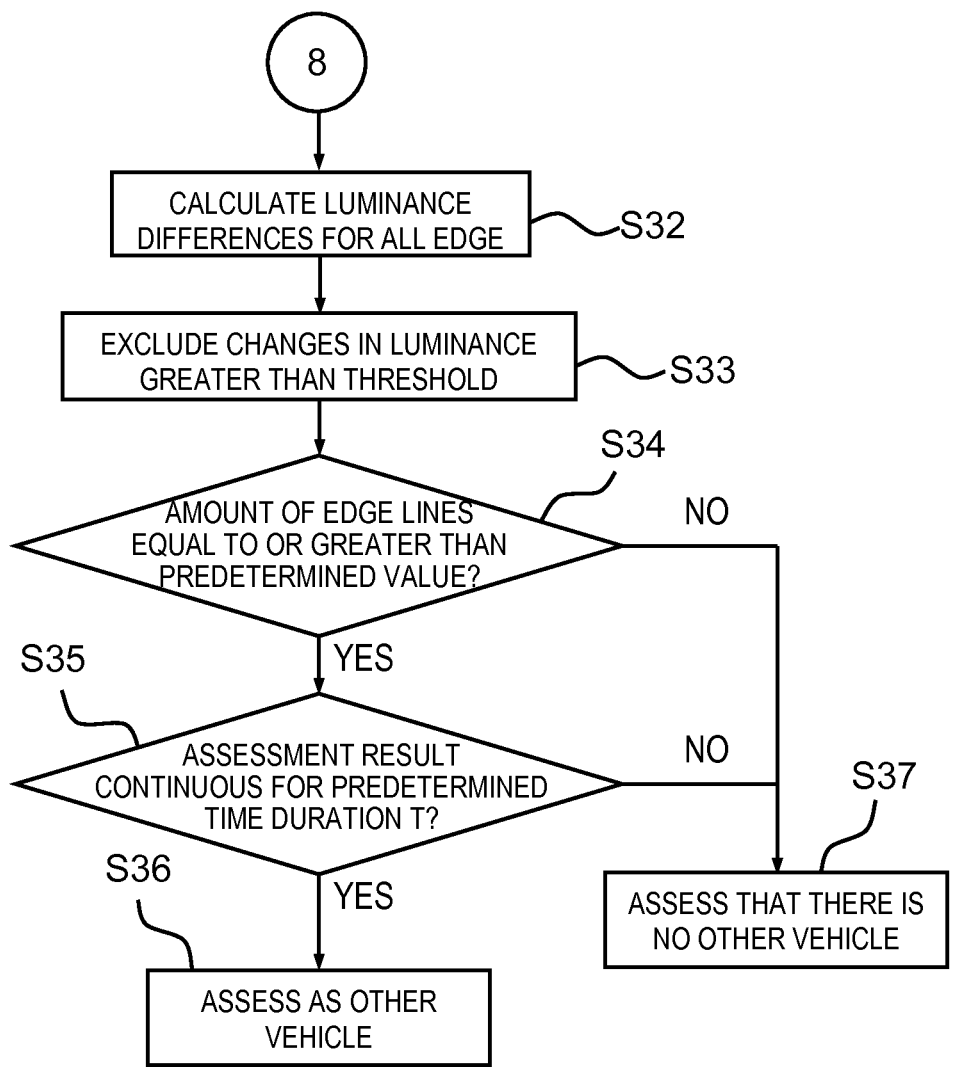
FIG. 18 is a flowchart (the second part) showing the three-dimensional object detection method which uses edge information and which is executed by the viewpoint conversion unit, the luminance difference controller, the edge line detection unit, and the three-dimensional object detection unit of FIG. 3.

Next, the method for detecting three-dimensional objects using edge information according to the present embodiment will be described. FIGS. 17 and 18 are flowcharts showing the details of the three-dimensional object detection method according to the present embodiment. In FIGS. 17 and 18, a process is described in which the detection area A1is the objective for the sake of convenience, but the same process is executed for the detection area A2as well.

First, in step S20, the computer 30 sets the detection area based on a predetermined rule as shown in FIG. 17. This detection area setting method is described in detail hereinafter. In step S21, the camera 10 images a predetermined area specified by the angle of view "a" and the mounted position. In step S22, the viewpoint conversion unit 31 then inputs the captured image data captured by the camera 10 in step S21, and performs a viewpoint conversion to create bird's-eye view image data.

In step S23, the luminance difference controller 35 then sets a focus line La in the detection area A1. At this time, the luminance difference controller 35 sets as the focus line La a line that is equivalent to a line extending vertically within real space. In step S24, the luminance difference controller 35 then sets a reference line Lr in the detection area A1. At this time, the luminance difference controller 35 sets as the reference line Lr a line that is equivalent to a line segment extending vertically within real space, and that is separated a predetermined distance from the focus line La within real space.

In step S25, the luminance difference controller 35 then sets a plurality of focus points Pa on the focus line La. At this time, the luminance difference controller 35 sets a number of focus points Pa that is not enough to cause a problem during the edge detection by the edge line detection unit 36. The luminance difference controller 35 also sets reference points Pr so that the focus points Pa and the reference points Pr are at substantially the same height within real space in step S26. The focus points Pa and the reference points Pr are thereby aligned in a substantially horizontal direction, and vertically extending edge lines are easily detected within real space.

In step S27, the luminance difference controller 35 then calculates the luminance differences between the focus points Pa and the reference points Pr which are at the same height within real space. The edge line detection unit 36 then calculates the attributes "s" of the focus points Pa in accordance with the above formula 1. In step S28, the edge line detection unit 36 then calculates the continuities "c" of the attributes s of the focus points Pa in accordance with the above formula 2. In step S29, the edge line detection unit 36 then determines whether or not the normalized value of the sum total of the continuities "c" is greater than the threshold $\theta$ in accordance with the above formula 3. When the normalized value is assessed to be greater than the threshold $\theta$ (S29: YES), the edge line detection unit 36 detest the focus line La to be an edge line in step S30. The process then transitions to step S31. When the normalized value is assessed to not be greater than the threshold $\theta$ (S29: NO), the edge line detection unit 36 does not detect the focus line La to be an edge line and the process transitions to step S31.

In step S31, the computer 30 assesses whether or not the process of steps S23 to S30 described above has been executed for all focus lines La that can be set in the detection area A1. When it is assessed that the above-described process has not been performed for all focus lines La (S31: NO), the process returns to step S23, a new focus line La is set, and the process up to step S31 is repeated. When it is assessed that the above-described process has been performed for all focus lines La (S31: YES), the process transitions to step S32 of FIG. 18.

In step S32 of FIG. 18, the three-dimensional object detection unit 37 calculates the change in luminance along the edge line for all the edge lines detected in step S30 of FIG. 17. The three-dimensional object detection unit 37 calculates the change in luminance of the edge lines in accordance with any of the above formulas 4, 5, and 6. In step S33, the three-dimensional object detection unit 37 then excludes edge lines for which the change in luminance is greater than the predetermined threshold. Specifically, edge lines having a large change in luminance are determined to not be correct edge lines, and these edge lines are not used in the detection of the three-dimensional object. This is to suppress the detection of things such as characters on the road surface and plants on the road shoulder within the detection area A1 as edge lines, as described above. Therefore, the predetermined threshold is a value which is found in advance by experimentation or the like, and which is set based on the change in luminance occurring due to things such as characters on the road surface and plants on the road shoulder.

In step S34, the three-dimensional object detection unit 37 then assesses whether or not the amount of edge lines is equal to or greater than a second threshold $\beta$. For example, when a four-wheeled vehicle is set as the three-dimensional object that is the detection objective, the second threshold $\beta$ is set in advance by experimentation or the like, based on the number of edge lines of the four-wheeled vehicle that have appeared in the detection area A1. When the amount of edge lines is determined to be equal to or greater than the second threshold $\beta$ (S34: YES), the three-dimensional object detection unit 37 detects that there is a three-dimensional object in the detection area A1 in step S35. When the amount of edge lines is determined to not be equal to or greater than the second threshold $\beta$ (S34: NO), the three-dimensional object detection unit 37 assesses that there is no three-dimensional object in the detection area A1. The process shown in FIGS. 17 and 18 is then ended. The detected three-dimensional object may be assessed to be another vehicle VX traveling in an adjacent traffic lane adjacent to the lane traveled by the vehicle V, or the assessment may be of whether or not the object is another vehicle VX traveling in an adjacent traffic lane, taking in account the relative speed of the detected three-dimensional object in relation to the vehicle V.

As described above, according to the three-dimensional object detection method using edge information of the present embodiment, vertical imaginary lines as vertically extending edge line segments are set within real space relative to the bird's-eye view image in order to detect three-dimensional objects present in the detection areas A1, A2. For each of a plurality of positions along a vertical imaginary line, the luminance difference between two pixels in the vicinity each position is calculated, and whether or not there is a three-dimensional object can be determined based on the continuity of the luminance differences.

Specifically, in the detection areas A1, A2 in a bird's-eye view image, a focus line La is set which corresponds to a vertically extending line segment within real space, and a reference line Lr different from the focus line La is also set. The luminance differences between the focus points Pa on the focus line La and the reference points Pr on the reference line Lr are then continuously found along the focus line La and the reference line Lr. Thus, the luminance difference between the focus line La and the reference line Lr is found by continuously finding the luminance differences between the points. When the luminance difference between the focus line La and the reference line Lr is high, there is a high likelihood that an edge of the three-dimensional object is in the set location of the focus line La. The three-dimensional object can thereby be detected based on the continuous luminance difference. The three-dimensional object detection process is not affected even if the three-dimensional object is elongated according to its height from the road surface due to the conversion to a bird's-eye view image, particularly because luminance is compared between vertical imaginary lines extending vertically within real space. Therefore, according to the method of the present example, the precision of detecting three-dimensional objects can be improved.

In the present example, the luminance difference is found between two points of substantially the same height in vicinity to a vertical imaginary line. Specifically, the luminance difference when there is a vertically extending edge can be clearly detected because the luminance difference is found from focus points Pa on a focus line La and reference points Pr on a reference line Lr that are at substantially the same height within real space.

Figure 19:
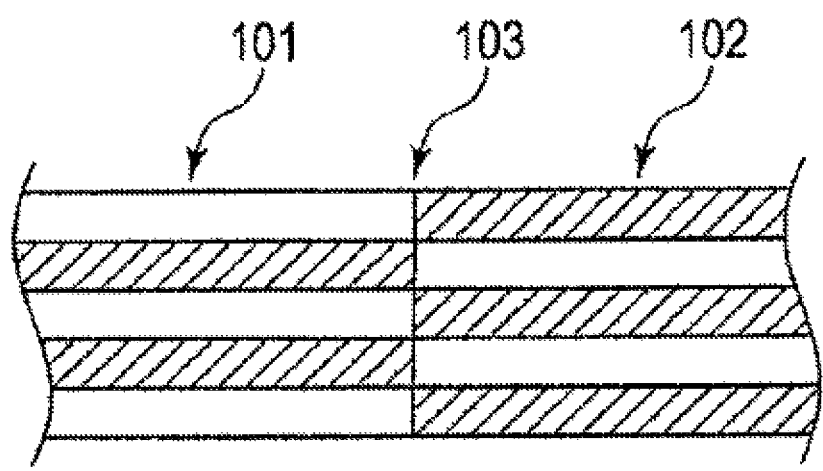
FIG. 19 illustrates an image example for describing the edge detecting action.

Furthermore, in the present example, attributes are assigned to the focus points Pa based on the luminance differences between the focus points Pa on the focus line La and the reference points Pr on the reference line Lr, and whether or not the focus line La is an edge line is assessed based on the continuity c of the attributes along the focus line La. Therefore, a boundary between an area of high luminance and an area of low luminance can be detected as an edge line, and edge detection resembling natural human sensation can be performed. The results of this are described in detail here. FIG. 19 illustrates an image example for describing the process of the edge line detection unit 36. This image example is an image in which a first striped pattern 101 and a second striped pattern 102 are adjacent, the first striped pattern showing a striped pattern in which areas of high luminance and areas of low luminance repeat, and the second striped pattern showing a striped pattern in which areas of low luminance and areas of high luminance repeat. In this image example, the areas of high luminance of the first striped pattern 101 and the areas of low luminance of the second striped pattern 102 are adjacent, and the areas of low luminance of the first striped pattern 101 and the areas of high luminance of the second striped pattern 102 are adjacent. The region 103 positioned in the boundary between the first striped pattern 101 and the second striped pattern 102 tends to not be perceived as an edge, depending on a person's senses.

Because the areas of low luminance and the areas of high luminance are adjacent, the region 103 is recognized as an edge when edges are detected only by luminance difference. However, because the edge line detection unit 36 determines the region 103 to be an edge line only when the attributes of the luminance differences have continuity in addition to there being luminance differences in the region 103, erroneous determinations can be suppressed in which the edge line detection unit 36 recognizes that the region 103 is an edge line despite being unrecognizable as an edge line by human senses, and edge detection resembling human senses can be performed.

Furthermore, in the present example, when the change in luminance of the edge line detected by the edge line detection unit 36 is greater than the predetermined threshold, it is assessed that the edge line has been detected by erroneous determination. When the captured image acquired by the camera 10 is converted to a bird's-eye view image, three-dimensional objects included in the bird's-eye view image tend to appear in the bird's-eye view image in an elongated state. For example, when the tires of the other vehicle VX are elongated as described above, the change in luminance in the bird's-eye view image in the elongated direction tends to be small because one region, the tire, is elongated. When characters or the like drawn on the road surface have been erroneously detected as an edge line, an area of high luminance, which is the character portion, and an area of low luminance, which is the road surface portion, are included as being mixed together in the bird's-eye view image. In this case, there is a tendency in the bird's-eye view image for there to be a great change in luminance in the elongated direction. Therefore, determining the change in luminance in the bird's-eye view image along the edge line as in the present example makes it possible to recognize edge lines detected by erroneous determination and to increase the precision of detecting three-dimensional objects.

Furthermore, in the present example, when the change in luminance of the edge line detected by the edge line detection unit 36 is greater than the predetermined threshold, it is assessed that the edge line has been detected by erroneous determination. When the captured image acquired by the camera 10 is converted to a bird's-eye view image, three-dimensional objects included in the bird's-eye view image tend to appear in the bird's-eye view image in an elongated state. For example, when the tires of the other vehicle VX are elongated as described above, the change in luminance in the bird's-eye view image in the elongated direction tends to be small because one region, the tire, is elongated. When characters or the like drawn on the road surface have been erroneously detected as an edge line, an area of high luminance, which is the character portion, and an area of low luminance, which is the road surface portion, are included as being mixed together in the bird's-eye view image. In this case, there is a tendency in the bird's-eye view image for there to be a great change in luminance in the elongated direction. Therefore, determining the change in luminance in the bird's-eye view image along the edge line as in the present example makes it possible to recognize edge lines detected by erroneous determination and to increase the precision of detecting three-dimensional objects. The three-dimensional object detection units 33, 37 can also send detection results to an external vehicle controller in order to send notifications to the occupants or control the vehicle.

Ultimate Assessment of Three-Dimensional Object

Returning to FIG. 3, the three-dimensional object detection device 1 of the present example comprises the two three-dimensional object detection units 33 (or three-dimensional object detection units 37) described above, a three-dimensional object assessment unit 34, a natural object assessment unit 38, and a control unit 39. The three-dimensional object assessment unit 34 ultimately assesses whether or not a detected three-dimensional object is another vehicle VX present in the detection areas A1, A2, based on the detection results of the three-dimensional object detection unit 33 (or the three-dimensional object detection unit 37). The three-dimensional object detection unit 33 (or the three-dimensional object detection unit 37) performs three-dimensional object detection that reflects the assessment results of the natural object assessment unit 38. The natural object assessment unit 38 assesses whether or not the three-dimensional object detected by the three-dimensional object detection unit 33 (or the three-dimensional object detection unit 37) is a natural object including plants or snow present along the path traveled by the vehicle V.

The natural object assessment unit 38 of the present embodiment detects shrubberies such as trees planted in the separator of the road or the road shoulder, trees growing naturally in grasslands or woods on the side of the road, snow piles or snow walls containing snow mixed with mud on the separator of the road or the road shoulder, and other natural objects (stationary objects) that are stationary on the side of the road. Because trees sway in the wind, their image positions fluctuate irregularly regardless of them being stationary objects. Manmade structures (guard rails) and the like are likewise stationary objects but remain stationary in the wind, and the images of natural objects and the images of manmade structures therefore exhibit different behaviors in the same environment. In circumstances such as when snow has piled up and been removed from the road, a wall of snow forms on the shoulder of the road, but an irregular pattern of patches forms in the wall of snow because mud and tree sediments get mixed in the snow when the snow is removed. Manmade structures (guard rails) and the like are likewise stationary objects but either have no pattern or a fixed pattern, and the images of natural objects and the images of manmade structures therefore exhibit different behaviors in the same environment when observed over time from a moving vehicle V. When captured images of plants or snow walls are analyzed, the images tend to exhibit irregular characteristics in comparison with those of manmade structures. Therefore, the inventors propose a method of extracting characteristics corresponding to irregular movement from a captured image, and detecting natural objects such as plants or snow among the stationary objects based on the extracted characteristics. Natural objects such as plants or snow in the present specification are stationary objects that do not move on their own.

Figure 20:
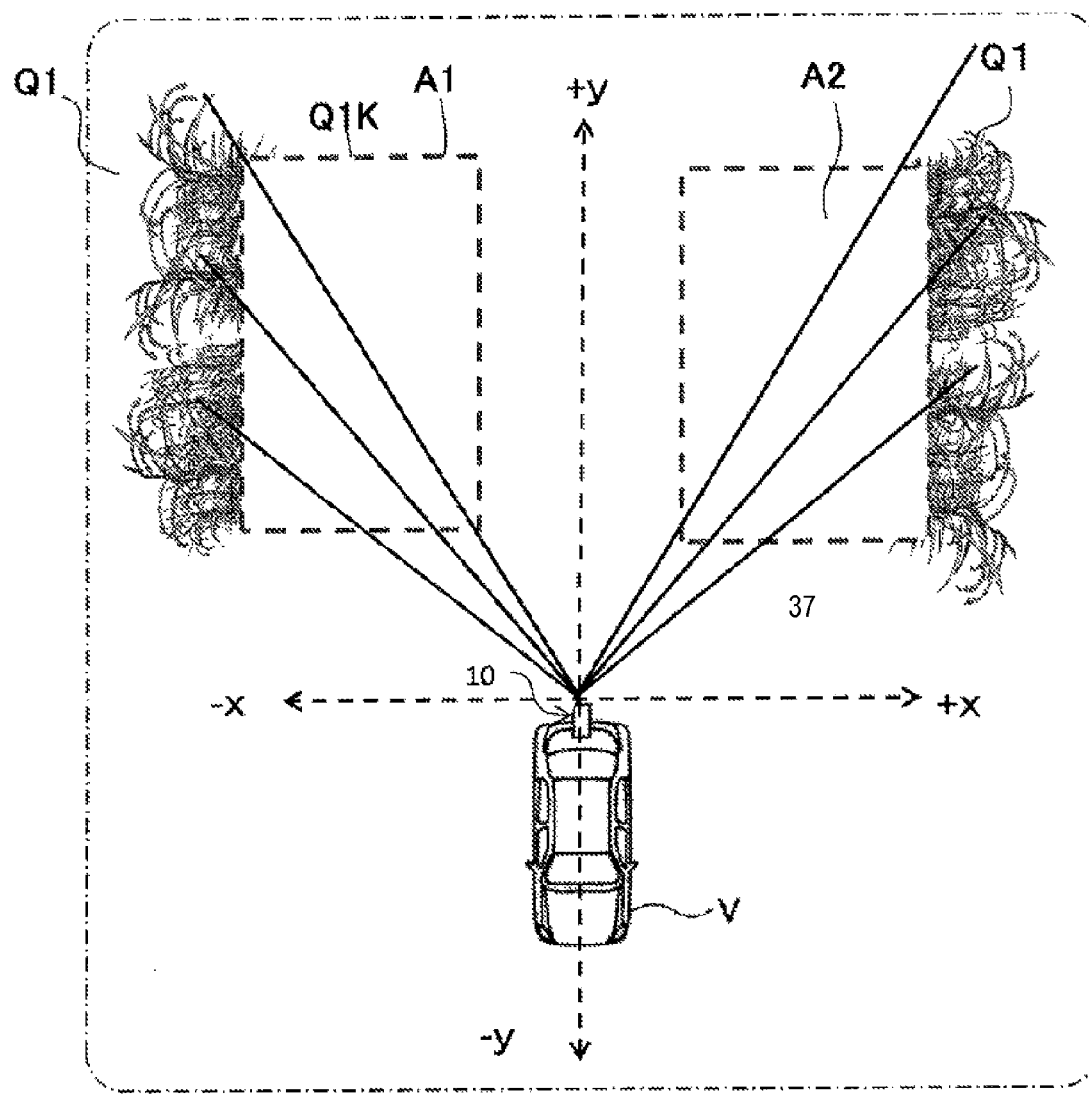
FIG. 20 illustrates detection areas in which plants appear.

Natural objects Q1 such as plants growing along the shoulder of the traveled road do not move on their own but overall have an indeterminate form and do not keep the same shape over time as shown in FIG. 20, and their irregularity is therefore high (regularity is low) because variation is seen in the characteristics extracted from the captured images thereof. A wall of snow formed on the shoulder often has a patchy pattern, and when such a wall is uninterruptedly observed from a moving vehicle V, the image information thereof tends to exhibit the same characteristics as the image information of plants.

Incidentally, guard rails and other structures (stationary artificial objects) provided at constant intervals on the shoulder of the traveled road have fixed shapes, and such structures are entirely immovable and keep the same shape over time. Therefore, irregularity is lower (regularity is higher) than images of natural objects including plants and snow because the characteristics extracted from the captured images have no variation.

Furthermore, there is a common basic structure among other vehicles VX that are the objectives ultimately being detected by the three-dimensional object detection device 1 of the present embodiment, and these structures keep the same shape over time. Therefore, irregularity is lower (regularity is higher) than images of natural objects including plants and snow because the characteristics extracted from the captured images have no variation.

Thus, focusing on the irregularity of pixels constituting an image, natural stationary objects such as plants and snow can be distinguished from manmade stationary objects such as guard rails and moving objects such as other vehicles VX.

Because the purpose of the three-dimensional object detection device 1 of the present embodiment is to detect other vehicles VX, there is no need to individually distinguish the structures of natural objects Q1 including plants and snow or guard rails, and these structures need only be distinguished as "stationary objects other than another vehicle VX."

However, to detect with high precision "another vehicle VX" that affects the travel of the vehicle V, image processing and object detection processing corresponding to the characteristics of the image of the detection objective must be designed depending on whether objects other than the other vehicle VX are moving objects or stationary objects, whether they are three-dimensional objects or flat objects, and also depending on whether the objects are natural objects including plants and snow. It is also possible to perform a process of predicting the image area that reflects a guard rail and implementing a feedback process in the image processing because the shapes of guard rails can be predicted, for example; and because there is thought to be an upper limit on the height of a plant Q1, it is also possible to perform a process of using this upper limit to predict the image area that reflects the plant Q1, and implementing feedback in the image processing. Thus, it is important to accurately distinguish the attributes (properties) of objects other than the detection objective (non-detection-objectives) in order to improve the precision of detecting the detection objectives, the other vehicles VX.

In the three-dimensional object detection device 1 of the present embodiment, the various physical properties of objects, such as the physical properties of other vehicles VX, the physical properties of natural objects Q1 including plants and snow, and the physical properties of guard rails, are analyzed based on the irregularity extracted from the image information; natural objects Q1 including plants and snow are accurately distinguished from the various images of objects included in the captured image; and as a result, the detection objectives, other vehicles VX, are detected with high precision.

The natural object assessment unit 38 performs a process for assessing images of natural objects including plants and snow based on differential waveform information, or a process for assessing images of natural objects including plants and snow based on edge information.

Based on the differential waveform information created by the three-dimensional object detection unit 33, the natural object assessment unit 38 calculates an irregularity evaluation value for evaluating the irregularity of the differential waveform information. The method for calculating the irregularity evaluation value based on the differential waveform information is not particularly limited; the value can be assessed based on the extent of variation in the characteristics extracted from the differential waveform information. For example, when the variation of a peak value of a predetermined value extracted from the differential waveform information is equal to or greater than a predetermined value, the irregularity can be assessed to be high.

Specifically, the natural object assessment unit 38 calculates an irregularity evaluation value for evaluating the irregularity of the differential waveform information based on a first pixel number of first pixels showing a first predetermined differential in a differential image including a detected three-dimensional object, and a second pixel number of second pixels that have been extracted along the falling direction of the three-dimensional object when the bird's-eye view image is viewpoint-converted, and that show a second predetermined differential greater than the first predetermined differential in the differential image. When the calculated irregularity evaluation value is equal to or greater than a predetermined irregularity evaluation threshold that has been set in advance, the three-dimensional object detected by the three-dimensional object detection unit 33 is assessed to be a natural objects including plants or snow present along the lane traveled by the vehicle V. The second predetermined differential used to extract the second pixels is equivalent to the "predetermined differential" used when three-dimensional objects are detected, and is a relatively high threshold set upon indication that the edge of an object can be extracted. The first predetermined differential used to extract the first pixels is a relatively low threshold set upon indication that the edge of any image (including real images and virtual images) appearing in the differential image can be extracted.

Similarly, based on edge information created by the three-dimensional object detection unit 37, the natural object assessment unit 38 calculates an irregularity evaluation value for evaluating the irregularity of edge information. For example, when the sum total of edge lines extracted from the edge information or the variation in the peak value of the amount of edge lines is equal to or greater than a predetermined value, the irregularity can be assessed to be high.

Specifically, the natural object assessment unit 38 calculates an irregularity evaluation value for evaluating the irregularity of the edge information based on a first pixel number of first pixels in which the luminance difference between adjacent image areas is equal to or greater than a first predetermined threshold in a differential image including a detected three-dimensional object, and a second pixel number of second pixels that have been extracted along the falling direction of the three-dimensional object when the bird's-eye view image is viewpoint-converted, and in which the luminance difference between adjacent image areas in the bird's-eye view image is equal to or greater than a second predetermined threshold greater than the first predetermined threshold. When the calculated irregularity evaluation value is equal to or greater than a predetermined irregularity evaluation threshold that has been set in advance, the three-dimensional object detected by the three-dimensional object detection unit 37 is assessed to be a natural object including plants or snow present along the lane traveled by the vehicle. The second predetermined threshold used to extract the second pixels is equivalent to the "predetermined threshold" used when three-dimensional objects are detected, and is a relatively high threshold set upon indication that the edge of an object can be extracted. The first predetermined threshold used to extract the first pixels is a relatively low threshold set upon indication that the edge of any image (including real images and virtual images) appearing in the bird's-eye view image can be extracted.

When differential waveform information can be used, from among the pixels that are extracted along the falling direction of the three-dimensional object when the bird's-eye view image is viewpoint-converted and that show a second predetermined differential in the differential image, the natural object assessment unit 38 of the present embodiment designates as second pixels those which constitute pixel groups in which pixels are aligned in at least a predetermined density or at least a predetermined amount, and finds the number of these second pixels as the second pixel number. When edge information can be used, from among the pixels which are extracted along the falling direction of the three-dimensional object when the bird's-eye view image is viewpoint-converted and for which the luminance difference between adjacent image areas in the bird's-eye view image is equal to or greater than the second predetermined threshold, the natural object assessment unit 38 designates as second pixels those which constitute pixel groups in which pixels are aligned in at least a predetermined density or at least a predetermined amount, and finds the number of these second pixels as the second pixel number.

In the present embodiment, second pixels observed in at least a predetermined density along the falling direction of the three-dimensional object when the bird's-eye view image is viewpoint-converted are assessed as a characteristic of an image of an artificial three-dimensional object. Therefore, among first pixels corresponding to all images including objects, second pixels corresponding to manmade three-dimensional objects and pixels (third pixels) corresponding to not manmade but natural three-dimensional objects can be distinguished with high precision.

Pixels other than second pixels are classified as pixels that do not correspond to an artificial three-dimensional object and that are detected irregularly, and an assessment of whether or not the detected three-dimensional object is a natural object is made based on these irregularities.

The natural object assessment unit 38 calculates an irregularity evaluation value from the first pixel number and the second pixel number. When the natural object assessment unit 38 calculates the percentage of the second pixel number relative to the first pixel number as an "irregularity evaluation value" and the percentage of the second pixel number relative to the first pixel number is a equal to or less than a predetermined percentage, the natural object assessment unit 38 may assess that there is a high number of pixels that are not regular second pixels and that are scattered irregularly and the "irregularity evaluation value" is equal to or greater than the predetermined irregularity evaluation threshold. When the natural object assessment unit 38 calculates the second pixel number relative to the first pixel number as an "irregularity evaluation value" and the second pixel number relative to the first pixel number is equal to or greater than a predetermined percentage, the natural object assessment unit 38 may assess that there is a low number of pixels that are not regular second pixels and that are scattered irregularly and the "irregularity evaluation value" is equal to or greater than the predetermined irregularity evaluation threshold. When the calculated irregularity evaluation value is equal to or greater than the predetermined irregularity evaluation threshold set in advance, the natural object assessment unit 38 assesses that the three-dimensional object detected by the three-dimensional object detection unit 33 is an image of a natural objects including plants and snow present along the road traveled by the vehicle V.

Thus, according to the method of detecting natural objects including plants and snow based on an irregularity assessment according to the present embodiment, irregular edge points P1 are detected, which are aligned irregularly and which do not meet pre-established conditions of an artificial three-dimensional object, and whether or not there are plants and snow is assessed based on the number L of irregular edge points P1. When there is an artificial object such as a vehicle in the detection areas A1, A2, the edge points P tend to readily align in a regular manner along the falling direction precisely because the object is manmade. In the case of plants and snow, the edge points are scattered irregularly because the object is not manmade. Consequently, it is possible to distinguish between the former and the latter from the number L of irregular edge points P1. Therefore, the precision of assessing plants and snow can be improved.

The specific assessment method of the natural object assessment unit 38 will be described. The "first pixels" described above are pixels for which the pixel value or luminance difference in the entire detection objective area is a predetermined value or greater, and are slate points that could be the edge of any object (including a flat object, a three-dimensional object, a moving object, and a stationary object). The "second pixels" are pixels among the "first pixels" that are extracted along the falling direction of the three-dimensional object when the image is viewpoint-converted to a bird's-eye view image, and are slate points that could be the edge of a three-dimensional object. The "third pixels," which are the remnant of "first pixels" excluding the "second pixels," are pixels that are not present along the falling direction, and are pixels that are not aligned in a regular manner, i.e. pixels present in an irregular manner.

The natural object assessment unit 38 calculates a third pixel number by subtracting the second pixel number from the first pixel number, and calculates an irregularity evaluation value based on the second pixel number and the third pixel number. In this case, the natural object assessment unit 38 assesses that the irregularity evaluation value is equal to or greater than a predetermined irregularity evaluation threshold when the second pixel number is less than a first predetermined value and the third pixel number is equal to or greater than a second predetermined value. Though not particularly limited, the first predetermined value for evaluating the second pixel number can be lower than the second predetermined value for evaluating the third pixel number. As shall be apparent, the first predetermined value and the second predetermined value may be the same value. In this process, because the natural object assessment unit 38 evaluates the irregularity to be high when the number of second pixels aligned regularly is relatively low and the number of third pixels located irregularly is relatively high, the natural object assessment unit 38 can quantitatively assess the irregularity of the captured image and can detect the presence of natural objects including plants and snow with high precision.

The natural object assessment unit 38 compares the second pixel number and the third pixel number, which is the result of subtracting the second pixel number from the first pixel number, and when the result of subtracting the second pixel number from the third pixel number is equal to or greater than a third predetermined value, the natural object assessment unit 38 assesses that the irregularity evaluation value is equal to or greater than the predetermined irregularity evaluation threshold. In this process, because the natural object assessment unit 38 evaluates the irregularity to be high when the number of irregular third pixels is relatively higher than the number of regular second pixels, the natural object assessment unit 38 can quantitatively assess the irregularity of the captured image and can detect the presence of natural objects including plants and snow with high precision.

The natural object assessment unit 38 calculates the abundance rate of the third pixel number relative to the first pixel number or the second pixel number, and when either the abundance rate of the third pixel number relative to the first pixel number or the abundance rate of the third pixel number relative to the second pixel number is equal to or greater than a predetermined rate, the natural object assessment unit 38 assesses that the irregularity evaluation value is equal to or greater than the predetermined irregularity evaluation threshold. In this process, because the natural object assessment unit 38 evaluates the irregularity to be high when the irregular third pixels are present in a higher rate than the regular second pixels or the overall number of first pixels, the natural object assessment unit 38 can quantitatively assess the irregularity of the captured image and can detect the presence of natural objects including plants and snow with high precision.

When the irregularity evaluation value is equal to or greater than the predetermined irregularity evaluation threshold, the three-dimensional object detected by the three-dimensional object detection unit 33 can be assessed to be plants or snow Q1 along the road traveled by the vehicle V, and when the irregularity evaluation value is less than the predetermined irregularity evaluation threshold, the three-dimensional object detected by the three-dimensional object detection unit 33 can be assessed to be an artificial stationary object such as a guard rail along the road traveled by the vehicle V. This irregularity evaluation threshold can be set experimentally, based on the irregularity of the natural objects Q1 including plants and snow.

The three-dimensional object assessment unit 34 is described next. The three-dimensional object assessment unit 34 of the present embodiment ultimately assesses whether or not three-dimensional objects detected in the three-dimensional object detection units 33, 37 are other vehicles VX present in the detection areas A1, A2. Specifically, when the three-dimensional object detection results of the three-dimensional object detection units 33, 37 continue for a predetermined time duration T, the three-dimensional object assessment unit 34 assesses the three-dimensional object to be another vehicle VX present in the detection areas A1, A2. Though not particularly limited, the three-dimensional object assessment unit 34 may ultimately assess whether or not the three-dimensional object is another vehicle VX present in the detection areas A1, A2 when parameters such as the travel speed, and the number of peaks and peak value of the differential waveform extracted from the differential waveform information are within a predetermined value range; and the three-dimensional object assessment unit 34 may also ultimately assess whether or not the three-dimensional object is another vehicle VX present in the detection areas A1, A2 when parameters such as the continuity of the edge extracted from the edge information, the normalized value of the sum total, and the amount of edge lines are within a predetermined value range and continue to be so for at least a predetermined time duration.

When a three-dimensional object detected by the three-dimensional object detection unit 33 or 37 is detected continually for at least a predetermined duration of time, the three-dimensional object assessment unit 34 of the present embodiment assesses that the three-dimensional object is another vehicle VX present in the right detection area or the left detection area.

Incidentally, when the three-dimensional object assessment unit 34 has assessed that the detected three-dimensional object is another vehicle VX present in the detection area A1 or A2, a process of issuing a notification or the like to the occupant is executed. The three-dimensional object assessment unit 34 can suppress the assessment of the detected three-dimensional object as another vehicle VX in accordance with a control command of the control unit 39.

The natural object assessment unit 38 is described below as a main constituent of the process in the irregularity evaluation method, but the natural object assessment unit 38 can cause either the positional alignment unit 32 or the three-dimensional object detection unit 33, or either the luminance difference controller 35, the edge line detection unit 36, or the three-dimensional object detection unit 37 to perform part of the process; acquire the process results; and ultimately assess the irregularity.

From the bird's-eye view image data of the detection areas A1, A2 viewpoint-converted by the viewpoint conversion unit 31, the natural object assessment unit 38 detects irregular edge points that are aligned irregularly and that do not meet the pre-established condition of an artificial three-dimensional object. The pre-established condition of an artificial three-dimensional object is that the edge points be aligned in a substantially straight line and in at least a predetermined density in the bird's-eye view image data of the detection areas A1, A2.

In the irregularity assessment process, the natural object assessment unit 38 can cause the edge line detection unit 36 and the three-dimensional object detection unit 37 to process the edge information and can utilize the processing results. In the irregularity assessment process, the natural object assessment unit 38 can also cause the positional alignment unit 32 and the three-dimensional object detection unit 33, which create differential waveform information based on pixel values, to process the edge information as described below, and can utilize the processing results. In the present embodiment, three-dimensional objects are detected based on differential waveform information or edge information, but because the differential waveform information and the edge information are originally created based on either the pixel values of pixels constituting a captured image or the luminance differences as shared information, the irregularity assessment can be applied to either method. Irregularity may be assessed based on edge information while three-dimensional objects are detected based on differential waveform information, or irregularity may be assessed based on differential waveform information while three-dimensional objects are detected based on edge information.

Figure 21:
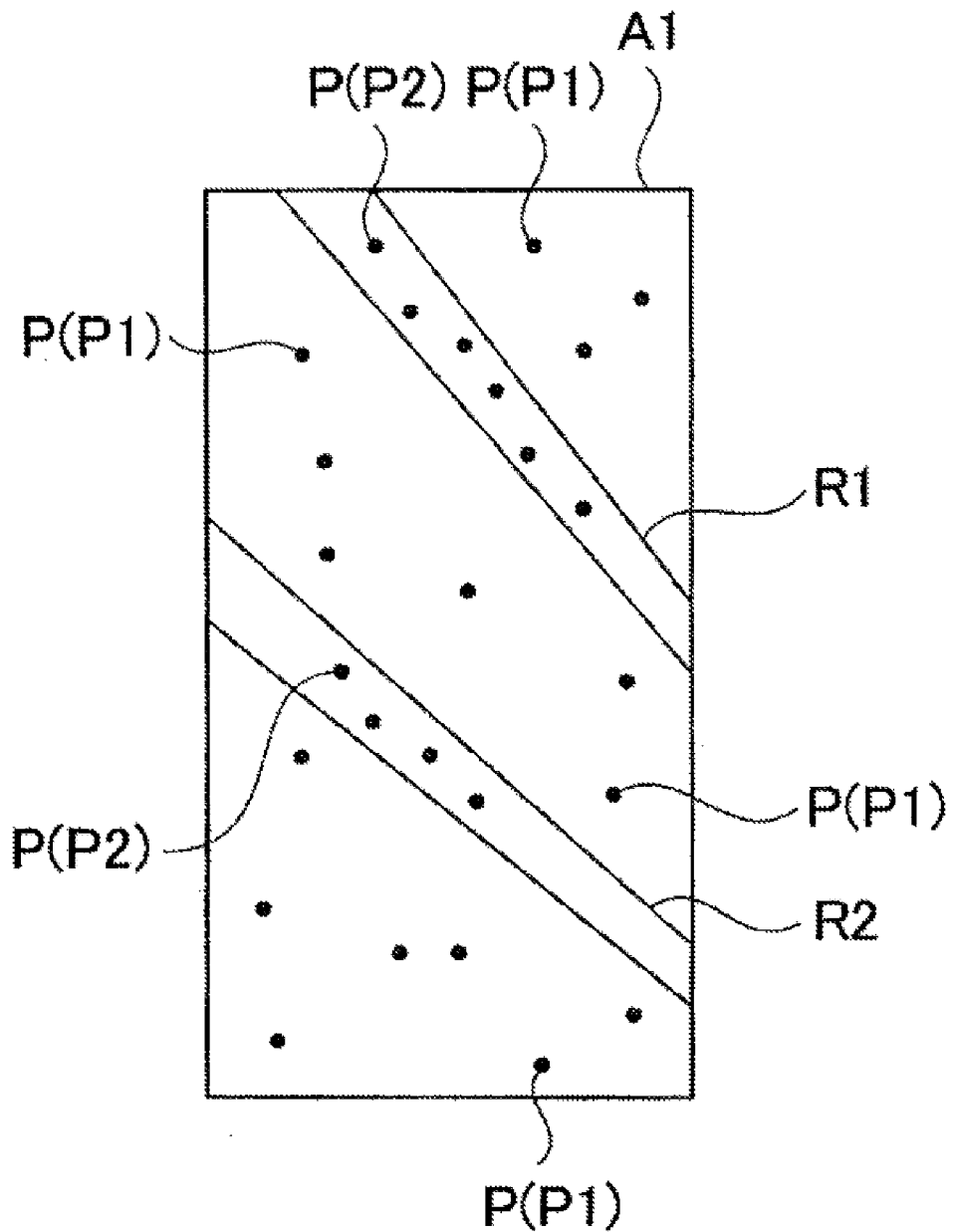
FIG. 21 is a diagram showing edge points in bird's-eye view image data of a detection area.

FIG. 21 is a diagram showing edge points P in the bird's-eye view image data of the detection area A1 (likewise below, including pixels). A plurality of edge points P are present in the bird's-eye view image data of the detection area A1 as shown in FIG. 21. Of these edge points, the edge points P positioned in areas R1, R2 are aligned in a substantially straight line and in at least a predetermined density, meeting the pre-established condition of an artificial three-dimensional object. However, edge points P positioned outside of the areas R1, R2 are not aligned in a substantially straight line and in at least a predetermined density, and do not meet the pre-established condition of an artificial three-dimensional object. The natural object assessment unit 38 detects the edge points P which, among the above-described plurality of edge points P, are positioned outside of the areas R1 R2 as irregular edge points P1. This direction of edge point alignment in at least a predetermined density, which is the condition of an artificial three-dimensional object, runs along the direction in which the three-dimensional object falls when the bird's-eye view image is viewpoint-converted.

The natural object assessment unit 38 detects edge points P from the bird's-eye view image data of the detection areas A1, A2. This edge point detection process detects edge points P by applying a Laplacian filter to the bird's-eye view image data and performing a binarization process, for example.

The natural object assessment unit 38 detects regular edge points P2 which, among the detected edge points P, are those which are aligned regularly and which meet the pre-established condition of an artificial three-dimensional object. The natural object assessment unit 38 detects regular edge points P2 on the condition that the edge points P are aligned in at least a predetermined density in the radiation direction from the camera 10 in the bird's-eye view image data of the detection areas A1, A2. To give an example, the natural object assessment unit 38 defines a straight line extending in the radiation direction from the camera 10, and from this straight line determines an area fitting within predetermined pixels (10 pixels, for example). The natural object assessment unit 38 assesses that the edge points P in this area are aligned in a substantially straight line, and assesses whether or not the edge points P in this area are aligned in at least a predetermined density by assessing whether or not they are positioned within a predetermined distance (predetermined pixels) of each other.

When edge points P and regular edge points P2 are detected, the natural object assessment unit 38 detects a number resulting from subtracting the number of regular edge points P2 from the number of detected edge points P as the number of irregular edge points P1. The natural object assessment unit 38 assesses whether or not there are plants, mud, and/or snow containing patches of soil in the detection areas A1, A2. The natural object assessment unit 38 refers to the number of detected irregular edge points P1 for this assessment.

Figure 22:
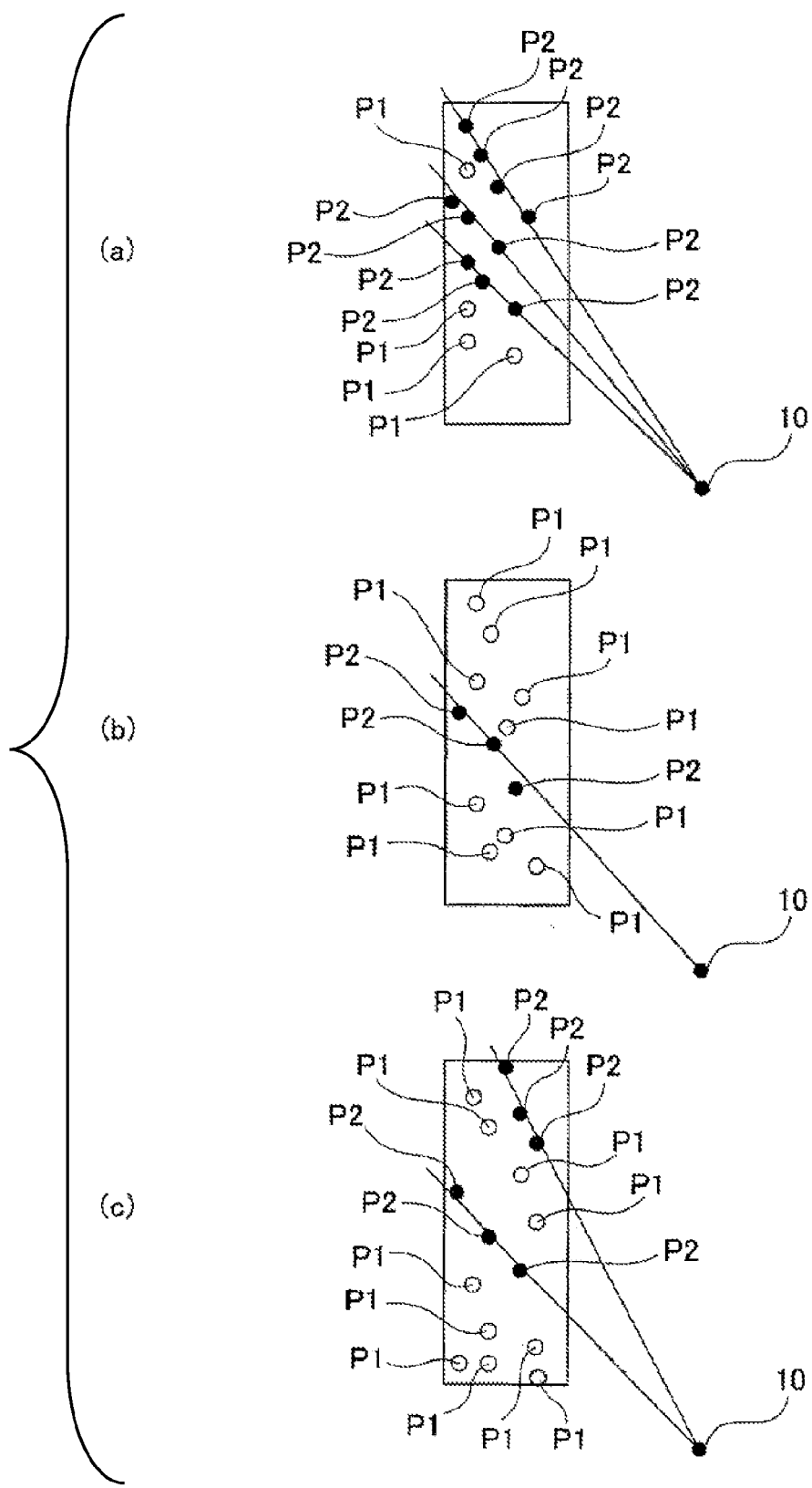
FIG. 22 is a diagram showing edge points in bird's-eye view image data, wherein (a) shows edge points of a vehicle (a tire portion), (b) shows edge points of plants, and (c) shows edge points of snow.

FIG. 22 is a diagram showing edge points P in bird's-eye view image data of the detection area A1, wherein (a) shows edge points P of a vehicle (a tire portion), (b) shows edge points P of plants, and (c) shows edge points P of snow. First, a vehicle (tire) is an artificial object. Therefore, the edge points P tend to easily align in a regular manner. Consequently, the vehicle will tend to have a small number of irregular edge points P1 and a large number of regular edge points P2, as shown in FIG. 22(a). Because plants and snow are not artificial objects, there will be a small number of edge points P aligned in a substantially straight line and a predetermined density (i.e. regular edge points P2), and a large number of irregular edge points P1, as shown in FIGS. 22(b) and 22(c). The natural object assessment unit 38 can assess plants and snow by comparing the number of irregular edge points P1 and a predetermined threshold. The value of irregular edge points P1 is one form of the irregularity evaluation value, and the predetermined threshold for comparison is one form of the irregularity evaluation threshold. The predetermined threshold includes at least a threshold as an irregularity evaluation threshold set from the standpoint of distinguishing the above-described natural objects Q1 including plants and snow.

The natural object assessment unit 38 detects plants and snow based on the ratio of the number of irregular edge points P1 to either the number of edge points P or the number of regular edge points P2. There are cases in which the number of edge points P increases or decreases as affected by the light environment when the image is captured. Therefore, the natural object assessment unit 38 can assess plants and snow with little effect from the light environment, more accurately by comparing the above-described ratio and the predetermined threshold, than by simply comparing the number of irregular edge points P1 and the predetermined threshold. The ratio of the number of irregular edge points P1 to either the number of edge points P or the number of regular edge points P2 herein is one form of the irregularity evaluation value, and the predetermined threshold pertaining to the ratio for comparison is one form of the irregularity evaluation threshold. The predetermined threshold includes at least a threshold as an irregularity evaluation threshold set from the standpoint of distinguishing the above-described natural objects Q1 including plants and snow.

Figure 23:
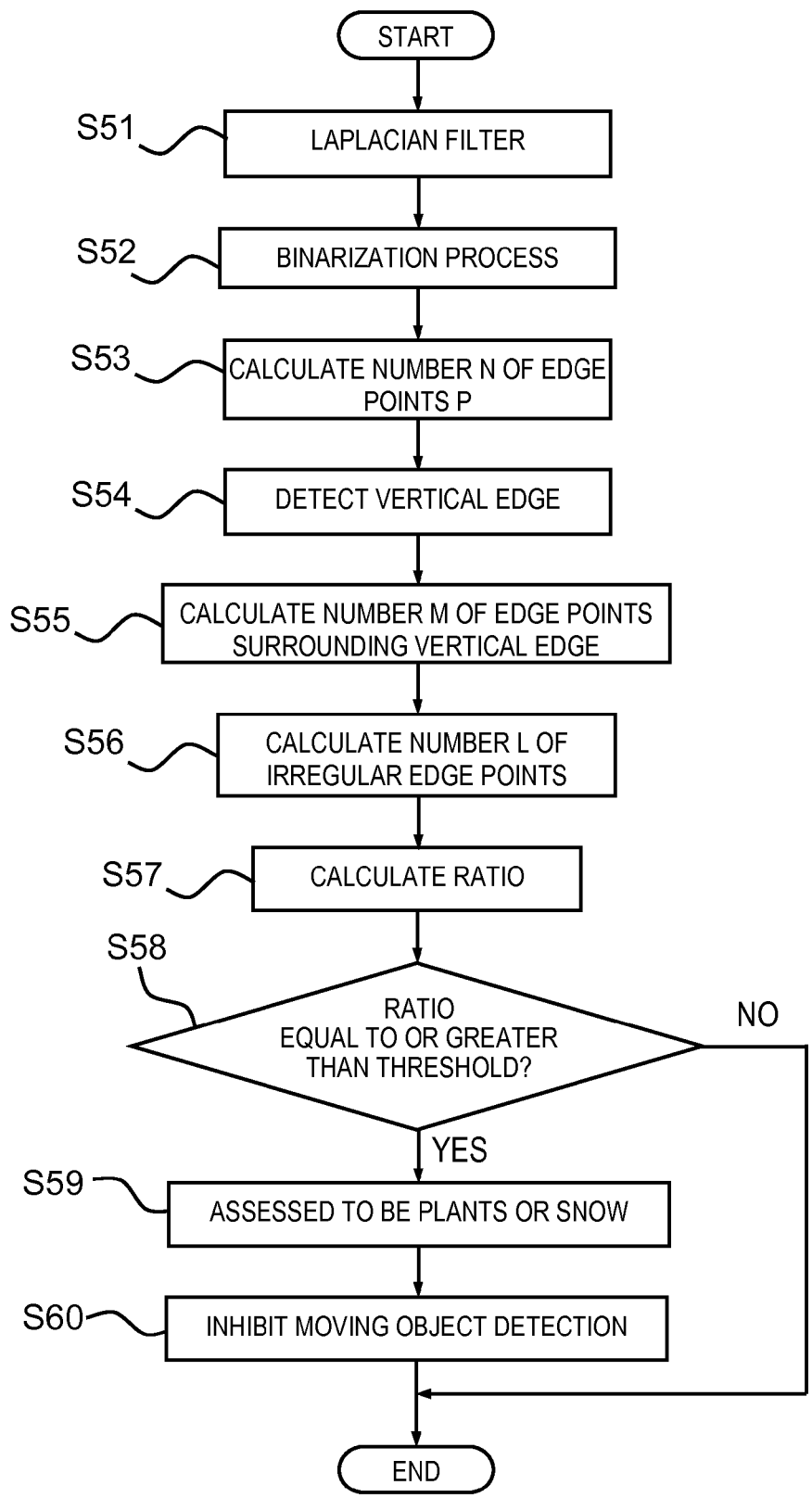
FIG. 23 is a first flowchart showing the irregularity evaluation process.

Next is a description of the ink ejection mechanism according to the present embodiment, and specifically of the method for detecting highly irregular natural objects including plants and snow. FIG. 23 is a flowchart showing the method for detecting natural objects such as snow and plants according to the present embodiment. First, as shown in FIG. 23, the natural object assessment unit 38 applies a Laplacian filter to the bird's-eye view image data obtained by the viewpoint conversion of the viewpoint conversion unit 31 (S51). The pixel value of the pixels equivalent to the edge points P is thereby greater, and the pixel value for other pixels is smaller.

The natural object assessment unit 38 then performs a binarization process on the image subjected to the Laplacian filter (S52), and clarifies the edge points P. The natural object assessment unit 38 then counts the number N of edge points P (S53). In the process of steps S54 and S55, the natural object assessment unit 38 detects regular edge points P2 in the radiation direction from the camera 10, with the condition of an artificial three-dimensional object being that edge points P are aligned in at least a predetermined density, and counts the number M of regular edge points P2. Specifically, the natural object assessment unit 38 first detects a vertical edge (S54), and counts the number M of edge points P surrounding the vertical edge (within ten pixels from the vertical edge, for example) (S55).

The natural object assessment unit 38 then calculates the number L of irregular edge points P1 (S56) by subtracting the number M of regular edge points P2 calculated in step S55 from the number N of edge points P counted and calculated in step S53. The natural object assessment unit 38 calculates the ratio (S57). At this time, the natural object assessment unit 38 calculates the ratio of the number L of irregular edge points P1 to either the number N of edge points P or the number M of regular edge points P2, from the formula L/N or L/M. If this ratio includes L/N or L/M, other numbers may be added and subtracted, or multiplied and divided.

Next, the natural object assessment unit 38 assesses whether or not the ratio calculated in step S57 is equal to or greater than a predetermined threshold (S58). When the ratio is assessed to be equal to or greater than the predetermined threshold (S58: YES), there is a high likelihood of there being plants or snow in the detection areas A1, A2 because the number of irregular edge points P1 is high. Consequently, the natural object assessment unit 38 assesses that there are plants or snow in the detection areas A1, A2 (S59). The control unit 39 transmits a control command to the three-dimensional object detection unit 37 and the three-dimensional object assessment unit 34, to the effect of suppressing the detection or assessment of three-dimensional objects (S60). The three-dimensional object detection units 33, 37 and the three-dimensional object assessment unit 34 recognize that there is an image originating from plants or snow in the detection areas A1, A2, and the erroneous detection of plants or snow as another vehicle VX can be prevented.

When the natural object assessment unit 38 assess that the ratio is not equal to or greater than the predetermined threshold (S58: No), the natural object assessment unit 38 assesses that there are no images of plants or snow in the detection areas A1, A2.

The edge points P are detected from the image data in the detection areas A1, A2, regular edge points P2 aligned regularly to meet the pre-established condition of an artificial three-dimensional object are detected, and the latter is subtracted from the former. Therefore, irregular edge points P1 aligned irregularly can be detected by perceiving the overall edge points P and subtracting the regular edge points P2.

Whether or not plants and/or snow are present in the detection areas A1, A2 is assessed based on the ratio between the number L of irregular edge points P1 and either the number N of edge points P or the number M of regular edge points P2. Therefore, the number L of irregular edge points P1 and either the number N of edge points P or the number M of regular edge points P2 can similarly be detected as being more or less than they actually are, even in cases such as when more or less edge points P are detected due to a difference in the light environment. Consequently, the ratio itself is not readily affected by the light environment. Therefore, plants and snow can be detected with little effect from changes in the light environment.

Regular edge points P2 are extracted on the condition that edge points are aligned in a substantially straight line and in at least a predetermined density when the image data of the detection areas A1, A2 has been converted to a bird's-eye view. Therefore, regular edge points P2 are readily detected with objects having many linear components such as artificial objects, and regular edge points P2 are not readily detected with plants or snow. Consequently, plants and snow can be detected more accurately.

Regular edge points P2 are extracted on the condition that edge points P are aligned in at least a predetermined density in the radiation direction from the camera 10 when the image data of the detection areas A1, A2 has been converted to a bird's-eye view. Therefore, components extending vertically within real space are detected as regular edge points P2, vertical edge points P of a vehicle as the three-dimensional object can be perceived, and differences between vehicles and plants or snow can be clarified.

Next, another processing example relating to irregularity assessment is described. This process is executed by the natural object assessment unit 38 shown in FIG. 3. The natural object assessment unit 38 of the present example comprises a linear component detection function. The linear component detection function detects linear components from the bird's-eye image data in the detection areas A1, A2.

The natural object assessment unit 38 detects edge points P in areas excluding areas in proximity (e.g. areas within ten pixels) to the linear components detected by the linear component detection function. These edge points P are detected as the irregular edge points P1 shown in FIG. 21.

Figure 24:
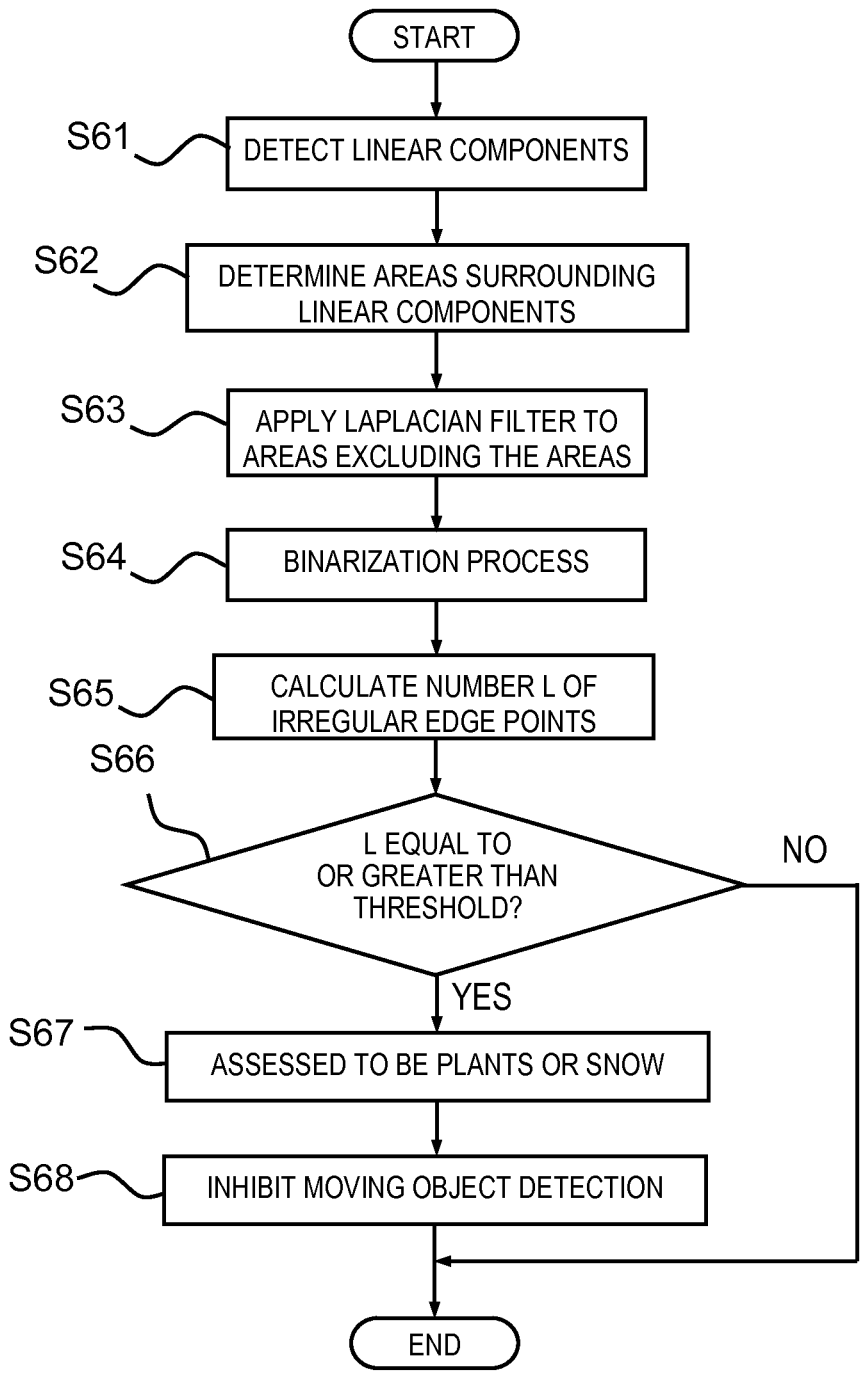
FIG. 24 is a second flowchart showing the irregularity evaluation process.

FIG. 24 is a flowchart showing the control procedure of the present process. Upon acquiring the bird's-eye view image data obtained by the viewpoint conversion of the viewpoint conversion unit 31, the natural object assessment unit 38 subjects this data to Hough conversion and detects linear components (S61).

The natural object assessment unit 38 then determines the surrounding areas including the detected linear components (e.g. areas having linear components within ten pixels) (S62). The natural object assessment unit 38 then applies a Laplacian filter (S63) to the areas excluding the areas determined in step S62. The pixel value of the pixels equivalent to the edge points P (specifically the irregular edge points P1) thereby increases, and the pixel value for the other pixels decreases.

The natural object assessment unit 38 then performs a binarization process (S64) on the image subjected to the Laplacian filter. The natural object assessment unit 38 thereby extracts the irregular edge points P1 and counts and calculates the number L of irregular edge points P1 (S65).

The natural object assessment unit 38 then assesses whether or not the number L calculated in step S65 is equal to or greater than a predetermined threshold (S66). When the number L is assessed to be equal to or greater than the predetermined threshold (S66: YES), there is a high likelihood of there being plants or snow in the detection areas A1, A2 because the number of irregular edge points P1 is high. Consequently, the natural object assessment unit 38 assesses that there are plants or snow in the detection areas A1, A2 (S67).

The hereinafter-described control unit 39 transmits a signal to the three-dimensional object detection units 33, 37 or the three-dimensional object assessment unit 34, to the effect of halting this process (S68). The three-dimensional object detection units 33, 37 or the three-dimensional object assessment unit 34 thereby recognize that there are plants or snow in the detection areas A1, A2, and it is possible to prevent the erroneous recognition of images of plants or snow as images of other vehicles VX which are three-dimensional objects and moving objects. The process shown in FIG. 24 then ends.

When the number L is not equal to or greater than the predetermined threshold (S66: NO), the natural object assessment unit 38 assesses that there are no plants or snow in the detection areas A1, A2, and the process shown in FIG. 24 ends.

According to this natural object detection method, natural objects such as plants and snow can be detected with high precision, similar to the processing method described previously.

According to this natural object detection method, linear components are detected from the image data in the detection areas A1, A2, and edge points P are detected in areas excluding the areas in proximity to the linear components. Consequently, linear components are first removed and the edge points P are then detected in this removed state, and irregular edge points P1 aligned irregularly can therefore be detected.

The following alterations can be made in the stationary object assessment process of the present embodiment. For example, in the present example, the speed of the vehicle V is assessed based on a signal from the vehicle speed sensor 20, but is not limited as such; the vehicle speed may be estimated from a plurality of images of different times. In this case, the vehicle speed sensor is unnecessary, and the configuration can be simplified.

When detecting irregular edge points, the natural object assessment unit 38 in the present example detects the irregular edge points P I upon converting the image data obtained by imaging to a bird's-eye image, but is not limited to doing so, and the image data obtained by imaging does not need to be converted to a bird's-eye image.

The natural object assessment unit 38 in the present example compares the number L of irregular edge points P1 and a predetermined threshold to assess whether or not there are plants or snow in the detection areas A1, A2, but is not limited to doing so, and may detect the number N of overall edge points P, find the ratio, and compare the ratio with a predetermined threshold. The natural object assessment unit 38 may also detect the number M of regular edge points P2 and similarly compare the ratio with a predetermined threshold.

The camera 10 in the present embodiment images the areas to the rear and sides of the of the vehicle V as the detection areas A1, A2, but is not limited to doing so, and may use the areas to the sides as the detection areas A1, A2 or the areas to the front and sides as the detection areas A1, A2.

The irregularity of the edges described above can be perceived not only as characteristics of the edge information of the present invention, but also as characteristics of differential image information. In other words, when differential image information is created, the number of pixels representing a predetermined differential in the differential image are counted and a frequency distribution is created along the direction in which the three-dimensional object falls when the bird's-eye view image is viewpoint-converted, in the differential image of the positionally aligned bird's-eye view image. However, the pixels representing a predetermined differential (or a second predetermined differential) in the differential image can be treated as an edge in the present irregularity processing, and the process described above can be applied to assess irregularity based on the frequency distribution of these pixels.

The control unit 39 is described next. When natural objects such as plants and snow are included in the captured image in the previous process and the natural object assessment unit 38 assesses that an image Q1 of the natural objects including plants and snow is reflected in the detection areas A1, A2, the control unit 39 of the present embodiment can create a control command to be carried out in the next process in at least one of the following components: the three-dimensional object detection units 33, 37, the three-dimensional object assessment unit 34, the natural object assessment unit 38, or the control unit 39 itself.

The control command of the present embodiment is a command for controlling the actions of the components so as to suppress the assessment of the detected three-dimensional object as another vehicle VX. This is because when images of natural objects including plants and snow is reflected in the detection areas A1, A2, the possibility is high that the detected three-dimensional object is an image of natural objects including plants and snow, and this object is therefore prevented from being erroneously assessed as another vehicle VX. Because the computer 30 of the present embodiment is a computer, control commands pertaining to the three-dimensional object detection process, the three-dimensional object assessment process, and the natural object assessment process may be incorporated in advance into the programs of these processes, and may be delivered when the programs are executed. The control commands of the present embodiment may be commands for reducing sensitivity when three-dimensional objects are detected based on differential waveform information, or commands for reducing sensitivity when three-dimensional objects are detected based on edge information. When the assessment of a three-dimensional object as another vehicle VX is being suppressed, the control command may be command for a result to halt the process of assessing the detected three-dimensional object as another vehicle, or to assess that the detected three-dimensional object is not another vehicle.

When the natural object assessment unit 38 has assessed that the possibility is high that the detected three-dimensional object is an image of a natural object including plants and snow, the control unit 39 of the present embodiment delivers to the three-dimensional object detection units 33, 37 or the three-dimensional object assessment unit 34 a control command for suppressing the detection of a three-dimensional object and the assessment of the detected three-dimensional object as another vehicle VX. It thereby becomes difficult for the three-dimensional object detection units 33, 37 to detect the three-dimensional object. It also becomes difficult for the three-dimensional object assessment unit 34 to assess that the detected three-dimensional object is another vehicle VX present in the detection area A1.

When the natural object assessment unit 38 has assessed that the possibility is high that the detected three-dimensional object is an image of a natural object including plants and snow, the control unit 39 may also create a control command stating to halt the three-dimensional object detection process and output the command to the three-dimensional object detection units 33, 37, or it may create a control command stating to halt the three-dimensional object assessment process or a control command stating to assess that the detected three-dimensional object is not another vehicle, and output the command to the three-dimensional object assessment unit 34. The same operational effects as those described above can thereby be achieved.

The following is a description of the specific control commands outputted by the control unit 39. In the previous process, when it has been assessed by the natural object assessment unit 38 that there is a high likelihood that the detected three-dimensional object is a natural object (stationary object) including plants and snow, the control unit 39 assesses that there is a high likelihood that an image of a natural object is reflected in the detection areas A1, A2 and a processing error will occur based on this image information. When a three-dimensional object is detected in this state in the same method as usual, there are cases in which a three-dimensional object, detected based on an image of a natural object Q1 including plants and snow reflected in the detection areas A1, A2, will be erroneously assessed to be another vehicle VX. Therefore, in the next process, the control unit 39 of the present embodiment will raise the threshold pertaining to the differential of the pixel value when creating differential waveform information, in order to suppress the three-dimensional object detected based on the image of the natural object Q1 including plants and snow from being erroneously assessed as another vehicle VX. Thus, when a natural object Q1 including plants and snow is reflected in the detection areas A1, A2, because the detection of the three-dimensional object or the assessment as another vehicle VX is suppressed by raising the assessment threshold, it is possible to prevent erroneous detection originating from an image of a natural object Q1 including plants and snow.

First is a description of a control command in a case in which a three-dimensional object is detected based on differential waveform information. As previously described, the three-dimensional object detection unit 33 detects three-dimensional objects based on differential waveform information and a first threshold $\alpha$. When the natural object assessment unit 38 has assessed that the possibility is high that the detected three-dimensional object is an image of a natural object including plants and snow, the control unit 39 of the present embodiment creates a control command for raising the first threshold $\alpha$ so as to impede detection of the three-dimensional object, and outputs the command to the three-dimensional object detection unit 33. In step S7 of FIG. 11, the first threshold $\alpha$ is a first threshold $\alpha$ for assessing the peaks of the differential waveform DWt (see FIG. 5). The control unit 39 can also output to the three-dimensional object detection unit 33 a control command for raising or lowering a threshold p pertaining to a differential of a pixel value in differential waveform information.

When the natural object assessment unit 38 has assessed that the possibility is high that the detected three-dimensional object is an image of a natural object including plants and snow, the control unit 39 of the present embodiment can output to the three-dimensional object detection unit 33 a control command for outputting a lower value obtained by counting and creating a frequency distribution for the pixel value expressing the predetermined differential in the differential image of the bird's-eye view image. The value obtained by counting and creating a frequency distribution for the pixel value expressing the predetermined differential in the differential image of the bird's-eye view image is a value of the vertical axis of the differential waveform DWt created in step S5 of FIG. 11. When there is assessed to be a high possibility that the three-dimensional object detected in the previous process is an image of a natural object including plants and snow, the control unit 39 assesses that the possibility is high that another vehicle VX will be erroneously detected based on the natural object Q1 including plants and snow reflected in the detection areas A1, A2. Therefore, the values obtained from creating a frequency distribution of the differential waveform DWt are lowered and outputted so as to impede detection of three-dimensional objects or other vehicles VX in the detection areas A1, A2 in the next process. Thus, when there is assessed to be a high possibility that the detected three-dimensional object is an image of a natural object including plants and snow, the sensitivity of detecting other vehicles VX traveling adjacent to the lane traveled by the vehicle V is adjusted by lowering the output value, and it is therefore possible to prevent erroneous detection of another vehicle VX originating from a natural object Q1 including plants and snow reflected in the detection areas A1, A2.

Next is a description of a control command in a case of detecting a three-dimensional object based on edge information. Similar to the previously described process based on differential waveform information, when there is assessed to be a high possibility that the three-dimensional object detected in the previous process is an image of a natural object including plants and snow, the control unit 39 assesses that there is a high likelihood that another vehicle VX will be erroneously detected based on a natural object Q1 including plants and snow reflected in the detection areas A1, A2. Therefore, when there is assessed to be a high possibility that the detected three-dimensional object is an image of a natural object including plants and snow, the control unit 39 outputs to the three-dimensional object detection unit 37 a control command for raising the predetermined threshold pertaining to luminance used in the detection of edge information. The predetermined threshold pertaining to luminance used in the detection of edge information is either a threshold 8 for assessing the normalized value of the sum total of the continuity c of the attributes of the focus points Pa in step S29 of FIG. 17, or a second threshold $\beta$ for evaluating the amount of edge lines in step S34 of FIG. 18. In other words, when there is assessed to be a high possibility that the detected three-dimensional object is an image of a natural object including plants and snow, the control unit 39 of the present embodiment creates a control command for increasing either the threshold $\theta$ used in the detection of edge lines or the second threshold $\beta$ for evaluating the amount of edge lines so as to impede detection of the three-dimensional object, and outputs this control command to the three-dimensional object detection unit 37. Thus, when there is assessed to be a high possibility that the detected three-dimensional object is an image of a natural object including plants and snow, detection of the three-dimensional object or assessment as another vehicle VX is suppressed by raising the assessment threshold, and it is therefore possible to prevent erroneous detection originating from a natural object Q1 including plants and snow reflected in the detection areas A1, A2.

When the natural object assessment unit 38 has assessed there to be a high likelihood that the detected three-dimensional object is an image of a natural object including plants and snow, the control unit 39 of the present embodiment outputs to the three-dimensional object detection unit 37 a control command for outputting a lower or higher amount of detected edge information. The amount of detected edge information is either the normalized value of the sum total of the continuity c of the attributes of the focus points Pa in step S29 of FIG. 17, or the amount of edge lines in step S34 of FIG. 18. When there is assessed to be a high likelihood that the three-dimensional object detected in the previous process is an image of a natural object including plants and snow, the control unit 39 assesses that there is a high likelihood that another vehicle VX will be erroneously detected based on a natural object Q1 including plants and snow reflected in the detection areas A1, A2. Therefore, either the normalized value of the sum total of the continuity c of the attributes of the focus points Pa, or the amount of edge lines is lowered and outputted so as to suppress the detection of the three-dimensional object and the assessment of the three-dimensional object as another vehicle VX in the next process.

Specifically, when there is a high likelihood that the detected three-dimensional object is an image of a natural object including plants and snow, the value resulting from creating a frequency distribution of the differential waveform DWt is lowered and outputted. Thus, when there is a high likelihood that the detected three-dimensional object is an image of a natural object including plants and snow, a control can be implemented so as to suppress detection of the three-dimensional object or assessment as another vehicle VX by lowering the output value, and it is therefore possible to prevent erroneous detection originating from a natural object Q1 including plants and snow reflected in the detection areas A1, A2.

Figure 25:
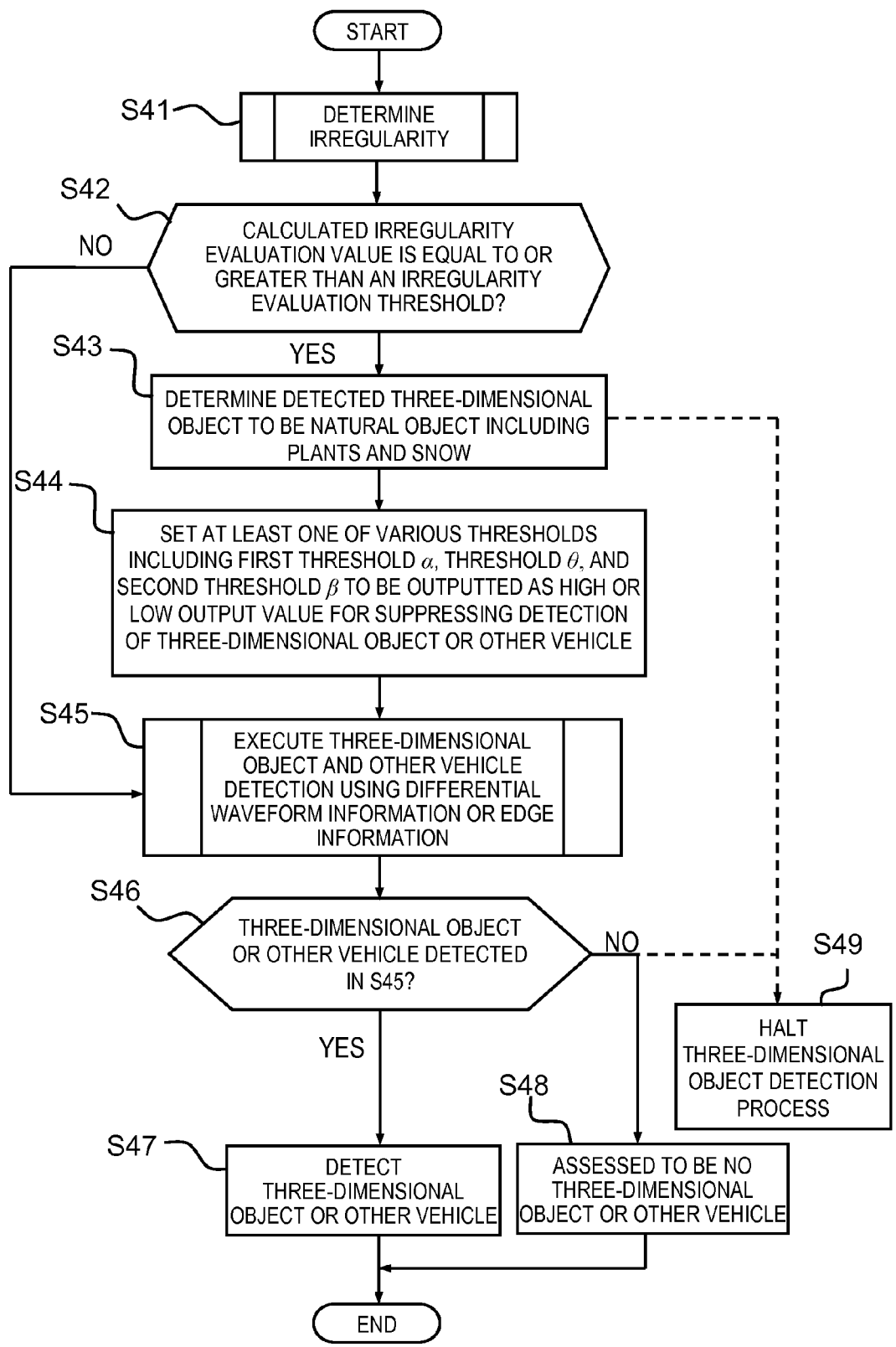
FIG. 25 is another example of a flowchart showing a control procedure including the process of assessing natural objects.

The following is a description, based on FIG. 25, of the action of the three-dimensional object detection device 1 of the present embodiment, and particularly the actions of the control unit 39, and of the three-dimensional object assessment unit 34 and the three-dimensional object detection units 33, 37 which have acquired control commands. The process shown in FIG. 25 is the subsequent three-dimensional object detection process performed using the result of the previous process, after the previous three-dimensional object detection process.

First, in step S41 shown in FIG. 25, the natural object assessment unit 38 assesses irregularity on the bases of differential waveform information or edge information. The irregularity evaluation value can be assessed based on the extent of variation in the characteristics extracted from the differential waveform information or the edge information. For example, irregularity can be assessed to be high when the number of peaks extracted from the differential waveform information or edge information is less than a predetermined value, the variation between peaks is equal to or greater than a predetermined value, and either the area differential of the peak portions of the differential waveform information proportional to the speed of the vehicle V (the ratio of the area differential to the peaks) or the differential of the amount of edges in the peak portions of the edge information (the ratio of the edge differential to the amount of edges in the peaks) is large.

In step S42, the natural object assessment unit 38 assesses whether or not the calculated irregularity evaluation value is equal to or greater than an irregularity evaluation threshold. When the calculated irregularity evaluation value is less than the irregularity evaluation threshold, the process proceeds to step S45. When the calculated irregularity evaluation value is equal to or greater than the irregularity evaluation threshold, the process proceeds to step S43 and the detected three-dimensional object is assessed to be an image Q1 of a natural object including plants and snow.

Next, in step S44, when the three-dimensional object detected in the previous process is assessed by the natural object assessment unit 38 to be an image Q1 of a natural object including plants and snow, the control unit 39 assesses that there is a high likelihood that another vehicle VX will be erroneously detected based on the image Q1 of a natural object including plants and snow reflected in the detection areas A1, A2, and performs control for either setting high thresholds used in the three-dimensional object detection process and the three-dimensional object assessment process or outputting a low output value to be compared with the threshold, so as to suppress detection of the three-dimensional object or assessment of the three-dimensional object as another vehicle VX in the next process.

To suppress detection of the three-dimensional object by the three-dimensional object detection units 33, 37 or assessment of the three-dimensional object as another vehicle by the three-dimensional object assessment unit 34, the control unit 39 either alters the thresholds used in these processes to be higher than the initial values, standard values, and other set values (so as to impede detection), or alters the output values for comparison with these thresholds to be lower (so as to impede detection). When the control unit 39 performs a facilitatory process, the facilitatory process is a suppressive process and a control of assessment.

The content of the specific process is as follows.

When the three-dimensional object detection unit 33, which detects three-dimensional objects using differential waveform information, detects a three-dimensional object when the differential waveform information is equal to or greater than the predetermined first threshold α, and when the three-dimensional object detected in the previous process is assessed to be an image Q1 of a natural object including plants and snow, the control unit 39 creates a control command for raising the first threshold α so as to impede detection of the three-dimensional object, and outputs this control command to the three-dimensional object detection unit 33.

Similarly, when the three-dimensional object detection unit 33 detects a three-dimensional object when the differential waveform information is equal to or greater than the predetermined first threshold α, and when the three-dimensional object detected in the previous process is assessed to be an image Q1 of a natural object including plants and snow, the control unit 39 creates a control command for outputting a lower value resulting from counting and creating a frequency distribution of the pixel number representing the predetermined differential in the differential image of the bird's-eye view image, and outputs this control command to the three-dimensional object detection unit 33.

When the three-dimensional object detection unit 33, which detects three-dimensional objects using differential waveform information, extracts the pixel number representing a pixel value equal to or greater than a threshold p as the pixel number representing the predetermined differential, and when the three-dimensional object detected in the previous process is assessed to be an image Q1 of a natural object including plants and snow, the control unit 39 creates a control command for raising the threshold p so as to impede detection of the three-dimensional object, and outputs this control command to the three-dimensional object detection unit 33.

Similarly, when the three-dimensional object detection unit 33 extracts the pixel number representing a pixel value equal to or greater than a threshold p as the pixel number representing the predetermined differential, and when the three-dimensional object detected in the previous process is assessed to be an image Q1 of a natural object including plants and snow, the control unit 39 creates a control command for outputting a lower pixel number extracted in the differential image along the direction in which the three-dimensional object falls when the bird's-eye view image is viewpoint-converted, and outputs this control command to the three-dimensional object detection unit 33. For example, the control unit 39 partially masks the detection areas A1, A2 or adjusts the thresholds or output values used in detection or assessment, in order to suppress either a detection result by the three-dimensional object detection unit 33 (or the three-dimensional object detection unit 37) that a three-dimensional object is present, or an assessment result by the three-dimensional object assessment unit 34 that the three-dimensional object is ultimately another vehicle VX.

When the three-dimensional object detection unit 37, which detects three-dimensional objects using edge information, extracts edge lines based on pixels representing a luminance difference equal to or greater than a predetermined threshold t, and when the three-dimensional object detected in the previous process is assessed to be an image Q1 of a natural object including plants and snow, the control unit 39 creates a control command for raising the predetermined threshold t so as to impede detection of the three-dimensional object, and outputs this control command to the three-dimensional object detection unit 37.

Similarly, when the three-dimensional object detection unit 37, which detects a three-dimensional object using edge information, extracts edge lines based on pixels representing a luminance difference equal to or greater than the predetermined threshold t, and when the three-dimensional object detected in the previous process is assessed to be an image Q1 of a natural object including plants and snow, the control unit 39 creates a control command for outputting a lower pixel luminance difference value, and outputs this control command to the three-dimensional object detection unit 37.

When the three-dimensional object detection unit 37, which detects three-dimensional objects using edge information, detects a three-dimensional object based on an edge line having a length of at least the threshold θ included in the edge information, and when the three-dimensional object detected in the previous process is assessed to be an image Q1 of a natural object including plants and snow, the control unit 39 creates a control command for raising the threshold θ so as to impede detection of the three-dimensional object, and outputs this control command to the three-dimensional object detection unit 37.

Similarly, when the three-dimensional object detection unit 37, which detects three-dimensional objects using edge information, detects a three-dimensional object based on an edge line having a length of at least the threshold θ included in the edge information, and when the three-dimensional object detected in the previous process is assessed to be an image Q1 of a natural object including plants and snow, the control unit 39 creates a control command for outputting a lower value of the length of the detected edge line in the edge information, and outputs this control command to the three-dimensional object detection unit 37.

When the three-dimensional object detection unit 37, which detects three-dimensional objects using edge information, detects a three-dimensional object based on an assessment of whether or not the number of edge lines of at least a predetermined length, e.g. edge lines having a length of the threshold θ or greater included in the edge information is equal to or greater than the second threshold β, and when the three-dimensional object detected in the previous process is assessed to be an image Q1 of a natural object including plants and snow, the control unit 39 creates a control command for raising the second threshold β so as to impede detection of the three-dimensional object, and outputs this control command to the three-dimensional object detection unit 37.

When the three-dimensional object detection unit 37, which detects three-dimensional objects using edge information, detects a three-dimensional object based on an assessment of whether or not the number of edge lines of at least a predetermined length, e.g. edge lines having a length of the threshold θ or greater included in the edge information is equal to or greater than the second threshold β, and when the three-dimensional object detected in the previous process is assessed to be an image Q1 of a natural object including plants and snow, the control unit 39 creates a control command for outputting a lower number of detected edge lines of at least the predetermined length, and outputs this control command to the three-dimensional object detection unit 37.

When the three-dimensional object assessment unit 34 assesses that the travel speed of a detected three-dimensional object is equal to or greater than a predetermined speed set in advance and the three-dimensional object is another vehicle, and when the three-dimensional object detected in the previous process is assessed to be an image Q1 of a natural object including plants and snow, the control unit 39 creates a control command for raising the predetermined speed that is the lower limit when assessing the three-dimensional object to be another vehicle so as to impede detection of the three-dimensional object, and outputs this control command to the three-dimensional object assessment unit 34.

Similarly, when the three-dimensional object assessment unit 34 assesses that the travel speed of a detected three-dimensional object is equal to or greater than a predetermined speed set in advance and the three-dimensional object is another vehicle, and when the three-dimensional object detected in the previous process is assessed to be an image Q1 of a natural object including plants and snow, the control unit 39 creates a control command for outputting a lower travel speed of the detection objective to be compared with the predetermined speed that is the lower limit when assessing the three-dimensional object to be another vehicle, and outputs this control command to the three-dimensional object assessment unit 34.

When the three-dimensional object assessment unit 34 assesses that the travel speed of a detected three-dimensional object is less than the predetermined speed set in advance and the three-dimensional object is another vehicle, and when the three-dimensional object detected in the previous process is assessed to be an image Q1 of a natural object including plants and snow, the control unit 39 creates a control command for lowering the predetermined speed that is the upper limit when assessing the three-dimensional object to be another vehicle, and outputs this control command to the three-dimensional object assessment unit 34.

Similarly, when the three-dimensional object assessment unit 34 assesses that the travel speed of a detected three-dimensional object is less than the predetermined speed set in advance and the three-dimensional object is another vehicle, and when the three-dimensional object detected in the previous process is assessed to be an image Q1 of a natural object including plants and snow, the control unit 39 creates a control command for raising the travel speed of the three-dimensional object to be compared with the predetermined speed that is the upper limit when assessing the three-dimensional object to be another vehicle, and outputs this control command to the three-dimensional object assessment unit 34.

The "travel speed" herein includes the absolute speed of the three-dimensional object, and the relative speed of the three-dimensional object in relation to the vehicle. The absolute speed of the three-dimensional object may be calculated from the relative speed of the three-dimensional object, or the relative speed of the three-dimensional object may be calculated from the absolute speed of the three-dimensional object.

Incidentally, the first threshold α is for assessing the peaks of the differential waveform DWt in step S7 of FIG. 11. The threshold p is a threshold for extracting pixels having a predetermined pixel value. The predetermined threshold t is a threshold for extracting pixels or edge components having a predetermined luminance difference. The threshold θ is a threshold for assessing the normalized value of the sum total of the continuity c of the attributes of the focus points Pa (the length of the edge) in step S29 of FIG. 17, and the second threshold β is a threshold for evaluating the amount (number) of edge lines in step S34 of FIG. 18. Thus, the detection sensitivity is adjusted so as to impede detection of another vehicle VX traveling adjacent to the lane traveled by the vehicle V by raising the assessment thresholds, and it is therefore possible to prevent a natural object from being erroneously detected as another vehicle VX.

The control unit 39 of the present embodiment outputs to the three-dimensional object detection unit 33 a control command for outputting a lower value resulting from counting and creating a frequency distribution of the pixel value expressing the predetermined differential in the differential image of the bird's-eye view image. The value resulting from counting and creating a frequency distribution of the pixel value expressing the predetermined differential in the differential image of the bird's-eye view image is a value on the vertical axis of the differential waveform DWt created in step S5 of FIG. 11.

The control unit 39 of the present embodiment outputs to the three-dimensional object detection unit 37 a control command for outputting lower values of the detected edge information. The detected edge information includes the length of edge lines, which is the normalized value of the sum total of the continuity c of the attributes of the focus points Pa in step S29 of FIG. 17, and the amount of edge lines in step S34 of FIG. 18. When the three-dimensional object is assessed to be a natural object, the control unit 39 lowers either the amount of edge lines or the normalized value of the sum total of the continuity c of the attributes of the focus points Pa so as to impede detection of the three-dimensional object in the next process, so that the natural object will not be detected as a three-dimensional object. Thus, the detection sensitivity can be adjusted by lowering the output values so as to impede detection of another vehicle VX traveling adjacent to the lane traveled by the vehicle V, and it is therefore possible to prevent the natural object from being erroneously detected as another vehicle VX traveling in an adjacent traffic lane.

The control unit 39 delivers to the three-dimensional object detection units 33, 37 control commands stating to raise at least one of the following: the threshold p pertaining to the differential of the pixel value when differential waveform information is created, the first threshold α used in assessing a three-dimensional object from differential waveform information, the threshold θ when edge information is created, and the second threshold β used in assessing a three-dimensional object from edge information; so that detection of a three-dimensional object is suppressed. The control unit 39 may also create control commands for lowering the output values evaluated by the thresholds instead of raising the thresholds, and may output these control commands to the three-dimensional object detection units 33, 37.

When lowering the output values, the control unit 39 outputs to the three-dimensional object detection unit 33 a control command for outputting a lower value resulting from counting and creating a frequency distribution of the pixel value expressing the predetermined differential in the differential image of the bird's-eye view image. The value resulting from counting and creating a frequency distribution of the pixel value expressing the predetermined differential in the differential image of the bird's-eye view image is a value of the vertical axis of the differential waveform DWt created in step S5 of FIG. 11. Similarly, the control unit 39 can output to the three-dimensional object detection unit 37 a control command for outputting a smaller amount of detected edge information. The amount of detected edge information is either the normalized value of the sum total of the continuity c of the attributes of the focus points Pa in step S29 of FIG. 17, or the amount of edge lines in step S34 of FIG. 18. When the three-dimensional object detected in the previous process is assessed to be a natural object, the control unit 39 can output to the three-dimensional object detection unit 37 a control command for lowing either the amount of edge lines or the normalized value of the sum total of the continuity c of the attributes of the focus points Pa, so as to impede detection of the three-dimensional object in the next process.

After the thresholds or the output values have been changed, the process proceeds to step S45, a three-dimensional object is detected based on the differential waveform information or the edge information, and an assessment is made of whether or not the detected three-dimensional object is another vehicle VX.

When a three-dimensional object and the three-dimensional object is another vehicle VX in step S46, an assessment result stating that there is another vehicle is outputted in step S47, and when the three-dimensional object is not another vehicle VX, an assessment result stating that there is not another vehicle is outputted in step S48. The processes in steps S45 and S46 are identical to the process of detecting another vehicle VX based on differential waveform information previously described in FIGS. 11 and 12, as well as the process of detecting another vehicle VX based on edge information described in FIGS. 17 and 18.

When there is no detection of a three-dimensional object or another vehicle VX in step S46, either the process proceeds to step S48 and it may be assessed that the detected three-dimensional object is not another vehicle VX or that there is no other vehicle VX present, or the process proceeds to step S49 and the three-dimensional object detection process may be halted.

The following is a description of an example of the method of canceling the process of suppressing three-dimensional object detection performed as described above. In the present embodiment, when a natural object Q1 including plants and snow is detected, three-dimensional object detection suppression is performed, but when the three-dimensional object assessment unit 34 assesses that the detected three-dimensional object is a moving object after the three-dimensional object detection suppression process has been performed, the three-dimensional object detection suppression process is canceled.

Figure 26:
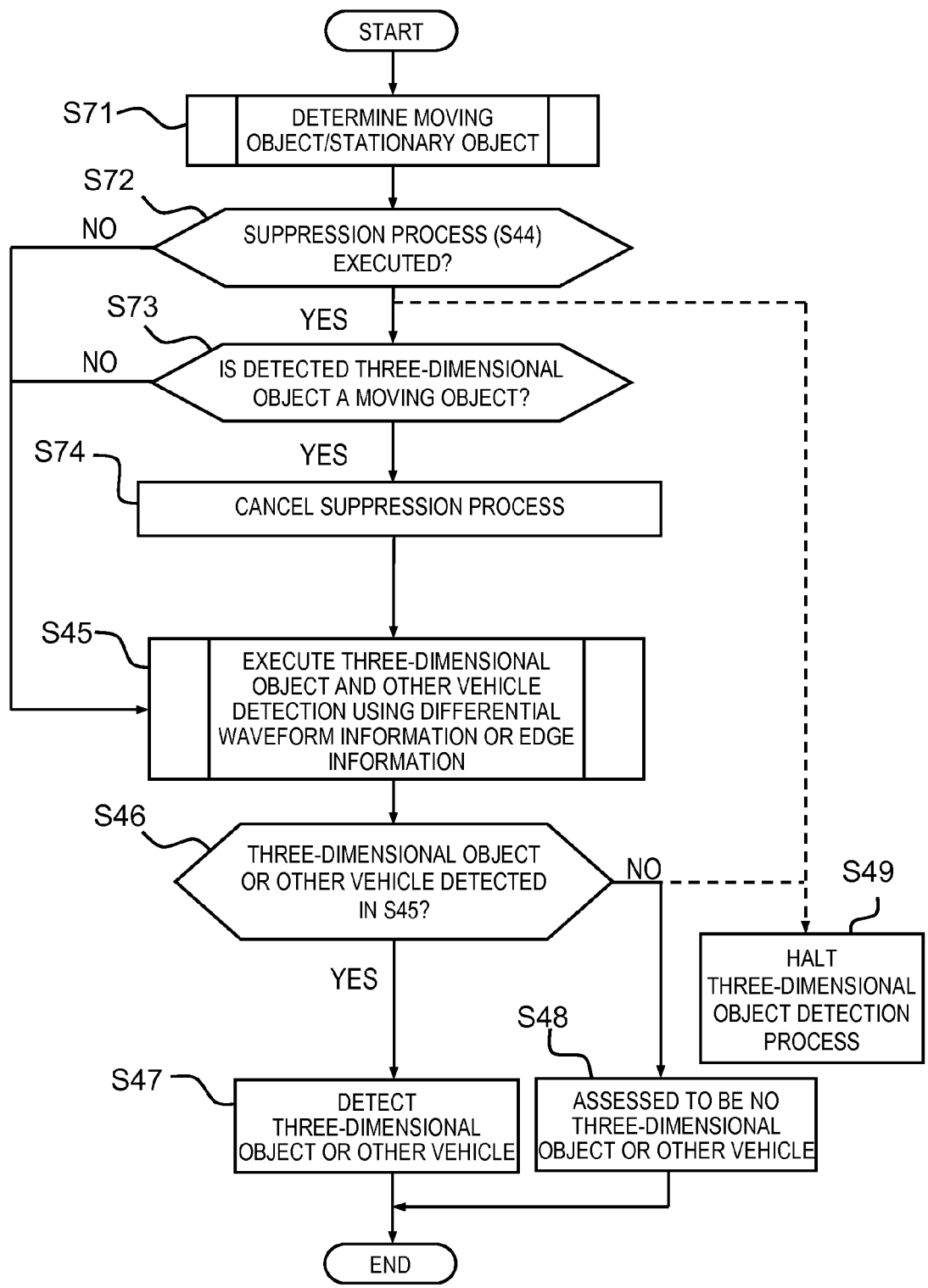
FIG. 26 is a flowchart for describing a control procedure for deactivating three-dimensional object detection suppression.

The procedure of controlling the process of canceling the three-dimensional object detection suppression is shown in FIG. 26. The process shown in FIG. 26 is performed in parallel with the three-dimensional object detection suppression process shown in FIG. 25. In step S71, as shown in FIG. 26, the three-dimensional object assessment unit 34 assesses whether the three-dimensional object detected by the three-dimensional object detection unit 33 or 37 is a moving object or a stationary object. This assessment method is described hereinafter. In step S72, when the suppression process (S44 of FIG. 25) has already be executed and when the three-dimensional object is then assessed to be a moving object in step S73, the process proceeds to step S74 and the suppression process is canceled. Specifically, the altered thresholds are returned to the original values, and the altered output values are returned to the original values. When the suppression process (S44 of FIG. 25) is not performed in step S72 and the detected three-dimensional object is a stationary object in step S73, the process proceeds to step S45 and the other vehicle detection process is performed after the already performed suppression process (S44 of FIG. 25). The process in step S45 onward is identical to the process in step S45 onward described in FIG. 25, and the description thereof is incorporated herein and not set forth again.

The method of assessing whether the three-dimensional object is a moving object or a stationary object is described below. The three-dimensional object assessment unit 34 of the three-dimensional object detection device 1 of the present embodiment assesses whether the three-dimensional object detected from the captured image is a moving object or a stationary object based on differences in the characteristics of moving object images in images captured at different times and stationary object images in images captured at different times.

Specifically, within a bird's-eye view, the three-dimensional object assessment unit 34 aligns the position of a first bird's-eye view image obtained at a first time when the three-dimensional object is detected, and the position of a second bird's-eye view image obtained at a second time after the first time, in accordance with the travel distance (travel speed) of the vehicle V. The three-dimensional object assessment unit 34 then finds a first integrated value of first differential waveform information created by counting the pixel number representing a predetermined differential and creating a frequency distribution in the differential image of the positionally aligned bird's-eye view images. In other words, the natural object assessment unit 38 creates an offset differential image taking into account the movement amount of the vehicle V. The offset amount d' corresponds to the movement amount in the bird's-eye view image data corresponding to the actual travel distance of the vehicle V shown in FIG. 4(a), and the offset amount d' is determined based on a signal from the vehicle speed sensor 20 and the time duration from immediately preceding point in time to the current time. The first integrated value is the total value of the predetermined areas or all the values plotted as the first differential waveform information.

The three-dimensional object assessment unit 34 finds a second integrated value of second differential waveform information created by counting the pixel number representing a predetermined differential and creating a frequency distribution in the differential image of the first bird's-eye view image obtained at the first time and the second bird's-eye view image obtained at the second time which is after the first time. In other words, the natural object assessment unit 38 acquires a differential image in which the images are not offset. The second integrated value is the total value of the predetermined areas or all the values plotted as the second differential waveform information.

The three-dimensional object assessment unit 34 assesses that the three-dimensional object detected by the three-dimensional object detection unit 33 is a moving object when an evaluation value, which corresponds to the number of times the first integrated value is assessed to be greater than the second integrated value, is equal to or greater than a predetermined evaluation threshold.

The inventors have focused on the points that in a differential image of offset captured images at different timings, a large amount of pixels appear that correspond to the characteristic points of a moving object, and in a differential image captured images that are not offset at different timings, a large amount of pixels appear that correspond to the characteristic points of a stationary object such as a natural object. In the present invention, the pixel value (edge amount) of a differential image of offset (positionally aligned) captured images of different timings and the pixel value (edge amount) of a differential image of not-offset (not positionally aligned) captured images of different timings are compared to assess whether the three-dimensional object is a stationary object or a moving object, according to the magnitude relation of the pixel values.

When an image Q (T0) of a three-dimensional object is detected in the detection area A1 or A2 at a past timing T0, and an image Q (T1) of a three-dimensional object is detected in the detection area A1 or A2 at a current timing T1 after the timing of T0 as shown in FIG. 27(a), the vehicle V, which is the detected subject, moves along the direction B. Therefore, the image Q (T0) of the three-dimensional object detected at the past timing T0 moves to the position of the image Q (T1) of the three-dimensional object at the top of the drawing in the detection area A1 or A2.

As shown in FIG. 27(b), the three-dimensional object assessment unit 34 is able to obtain: a distribution of pixels or edge components of the image Q (T1) of the three-dimensional object detected at the current timing T1; a distribution of pixels or edge components of an image Q (T0A) of the three-dimensional object offset (positionally aligned) by a predetermined amount, which is an image Q (T0) of the three-dimensional object detected at the past timing T0; and a distribution of pixels or edge components of an image Q (T0B) of the three-dimensional object that is not offset (not positionally aligned), which is also an image Q (T0) of the three-dimensional object detected at the past timing T0.

When the image T1 and the offset image T0A are compared as shown in FIG. 27(b), the image Q (T1) of the three-dimensional object in the image T1 and the image Q (T0A) of the three-dimensional object in the image T0A have substantially identical positions (the positions along the movement direction B of the vehicle V). When the image T1 and the not-offset image T0B are compares as shown in the same diagram, the image Q (T1) of the three-dimensional object in the image T1 and the image Q (T0B) of the three-dimensional object in the image T0B have different positions (the positions along the movement direction B of the vehicle V). In other words, when a differential image of T1 and T0A is found, the identical portions are deducted and do not remain, and the number of pixels extracted as characteristics is therefore small. When a differential image of T1 and T0B is found, the different portions remain, and the number of pixels extracted as characteristics is therefore relatively high.

Figure 27:
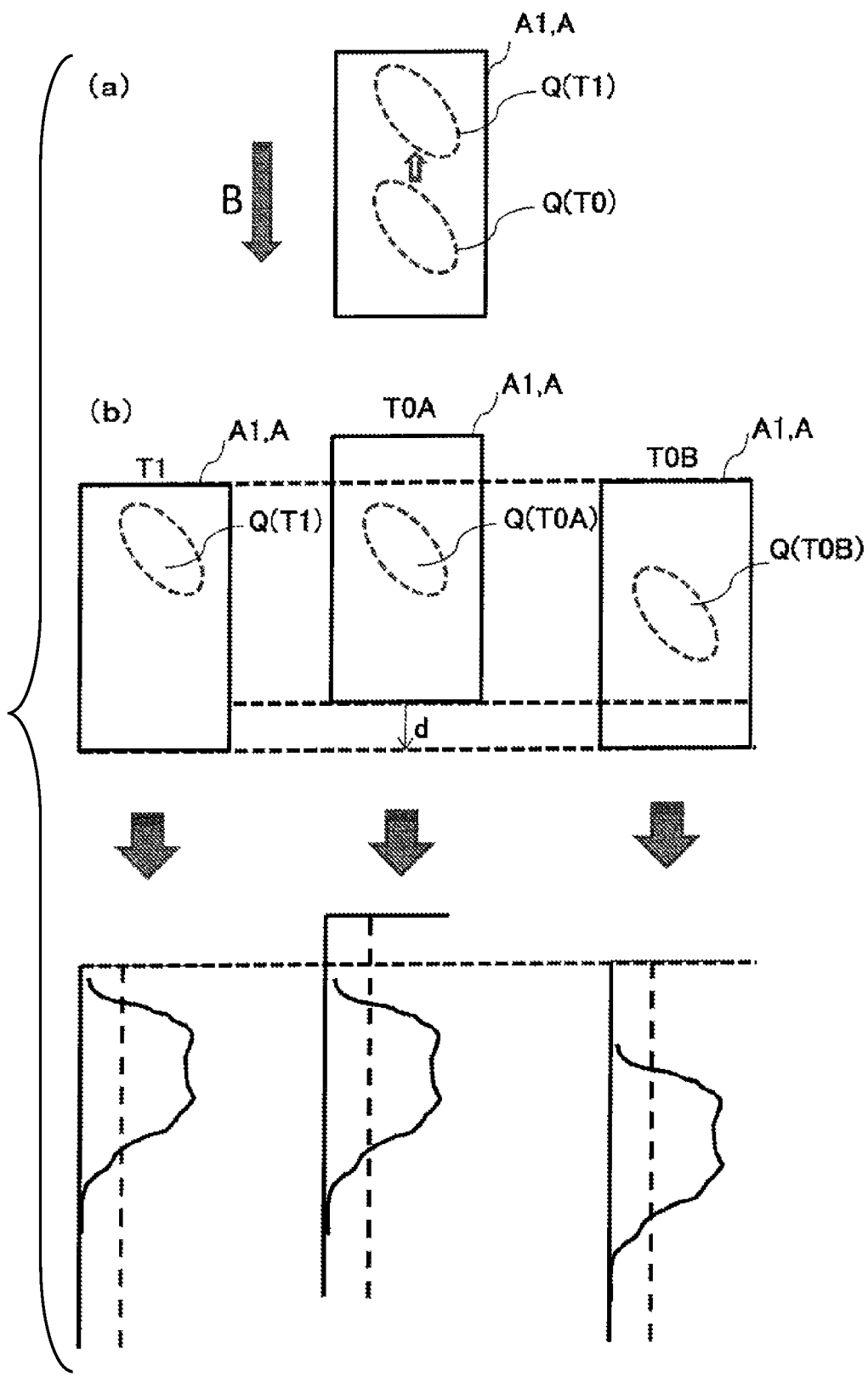
FIG. 27 is a first diagram for describing the stationary object/moving object assessment process.
Figure 28:
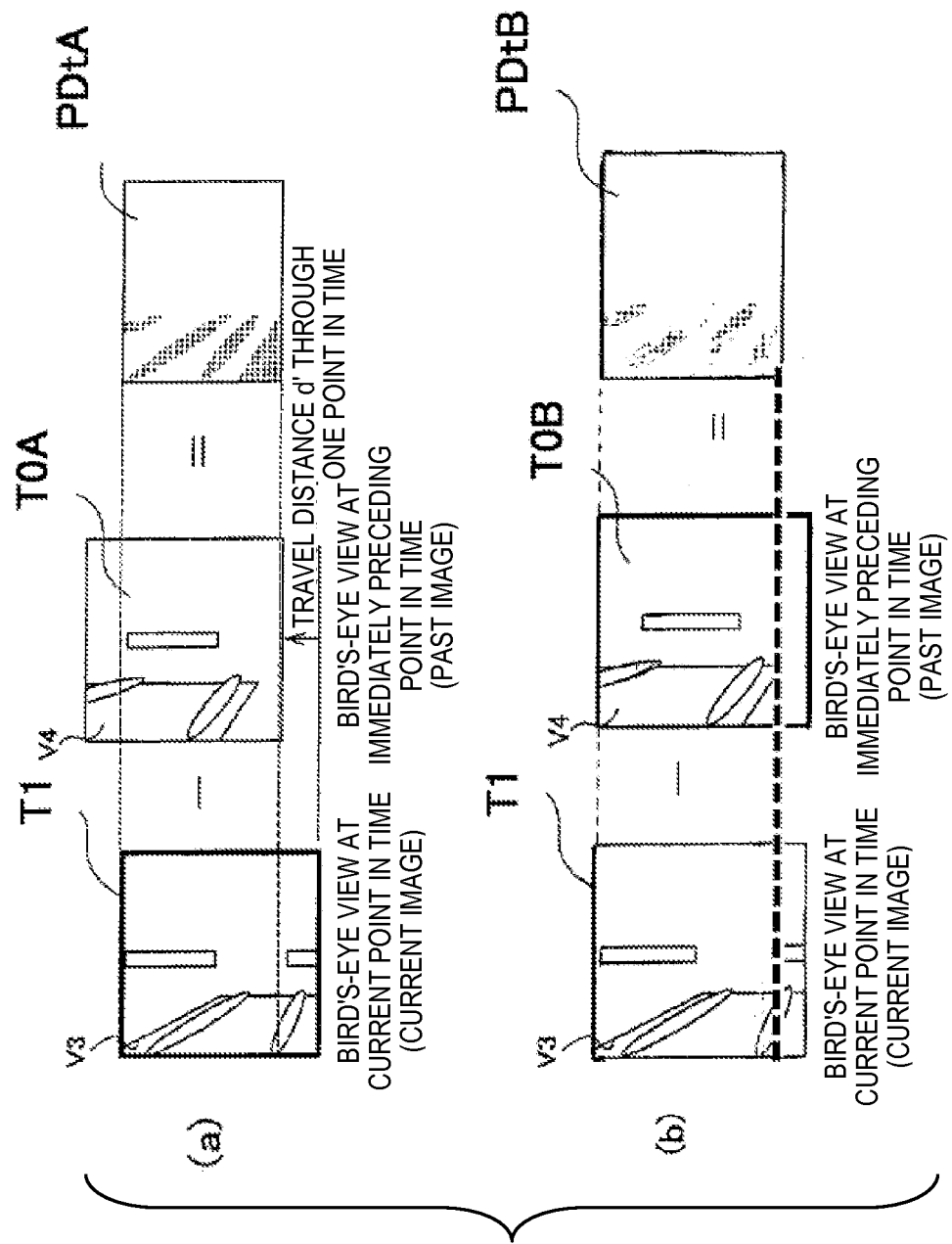
FIG. 28 is a second diagram for describing the stationary object/moving object assessment process.
Figure 29:
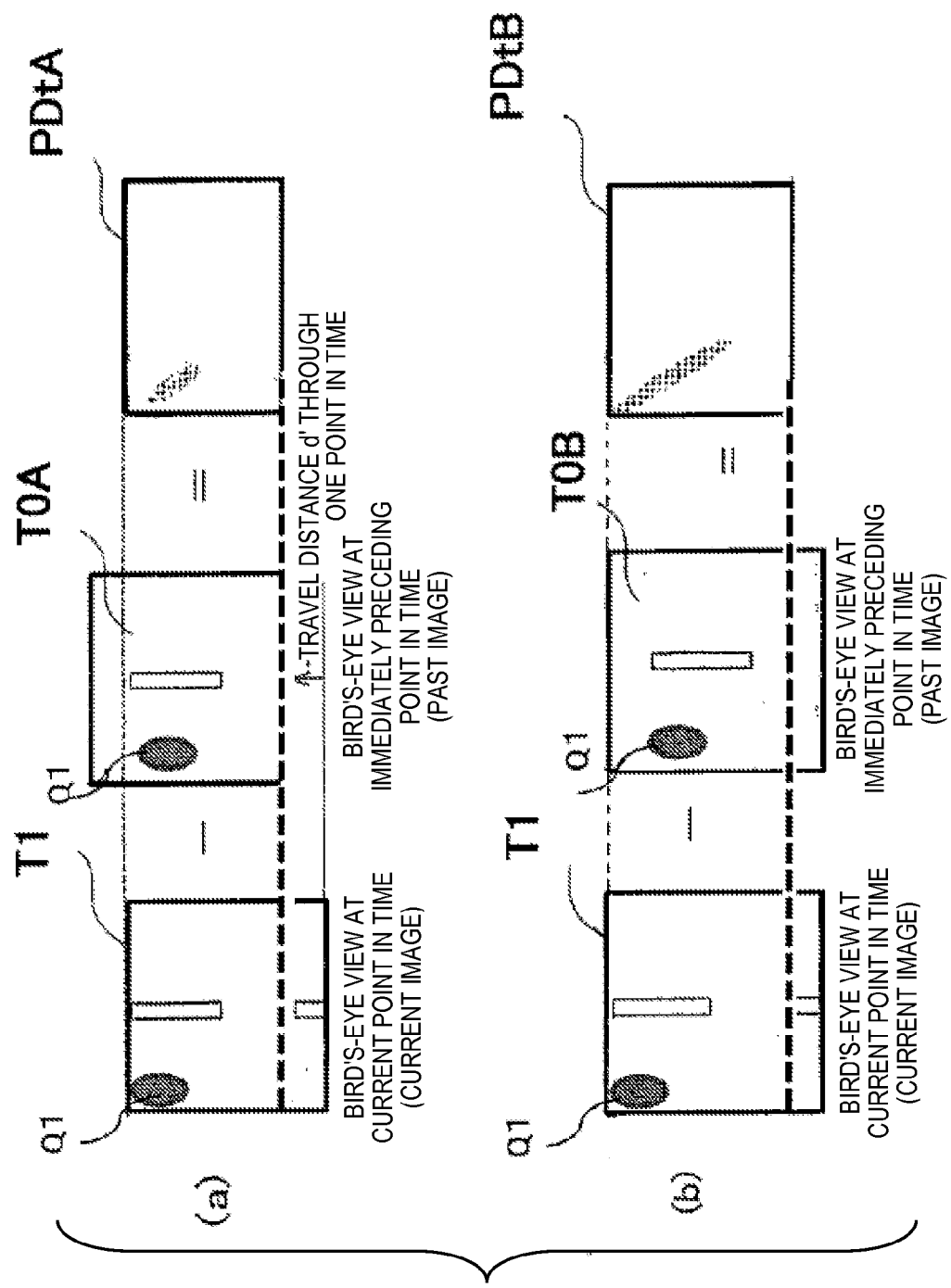
FIG. 29 is a third diagram for describing the stationary object/moving object assessment process.

Next, the points for consideration shown in FIG. 27 are described, taking into account whether the three-dimensional object is a moving object or a stationary object. A case of the three-dimensional object being a moving object is described in FIG. 28, and a case of the three-dimensional object being a stationary object is described in FIG. 29.

When the detected three-dimensional object is a moving other vehicle VX as shown in FIG. 28(a), the vehicle V and the other vehicle VX tend to maintain a predetermined positional relationship because both the vehicle V and the other vehicle VX move. In other words, when the bird's-eye image is offset (positionally aligned), the position of the other vehicle VX tends to shift as well, and many pixels (edges) that could be characteristics are detected in the differential image PDt. When the bird's-eye image is not offset as shown in FIG. 28(b), the position of the other vehicle VX tends to approach the vehicle V, and few pixels (edges) that could be characteristics are detected in the differential image PDt. The integrated value in the differential waveform information tends to be high if there are many pixels (edges) in the differential image PDt, and the integrated value in the differential waveform information tends to be low if there are few pixels (edges) in the differential image PDt.

When the detected three-dimensional object is a stationary object Q1 as shown in FIG. 29(a), the stationary object Q1 is stationary while the vehicle V is moving, and the vehicle V and the stationary object Q1 therefore tend to become farther apart. In other words, when the bird's-eye image is offset (positionally aligned), the positions of the vehicle V and the stationary object Q1 tend to approach each other, and few pixels (edges) that could be characteristics are detected in the differential image PDt. When the bird's-eye image is not offset as shown in FIG. 29(b), the position of the stationary object Q1 tends to become different from the previous bird's-eye image as the vehicle V moves, and many pixels (edges) that could be characteristics are detected in the differential image PDt. If there are many pixels (edges) in the differential image PDt, the integrated value in the luminance distribution information tends to be high, and if there are few pixels (edges) in the differential image PDt, the integrated value in the luminance distribution information tends to be low.

The methodology described above can similarly be applied in cases of using edge information. In other words, within a bird's-eye view, the three-dimensional object assessment unit 34 positionally aligns the position of a first bird's-eye view image obtained at a first time T0 when the three-dimensional object is detected, and the position of a second bird's-eye view image obtained at a second time T1 after the first time. The three-dimensional object assessment unit 34 then finds a first integrated value of first luminance distribution information created by counting the number of pixels in which the luminance difference in mutually adjacent image areas is at least a predetermined threshold and creating a frequency distribution in the differential image of the positionally aligned bird's-eye view images. In other words, an offset differential image is created, taking into account the movement amount of the vehicle V. The offset amount d' is the movement amount in the bird's-eye view image data corresponding to the actual travel distance of the vehicle V shown in FIG. 4(a), and the offset amount d' is determined based on a signal from the vehicle speed sensor 20 and the time duration from immediately preceding point in time to the current time. The first integrated value is the total value of the predetermined areas or all the values plotted as the first luminance distribution information.

The three-dimensional object assessment unit 34 finds a second integrated value of second luminance distribution information created by counting the number of pixels in which the luminance difference in mutually adjacent image areas is at least a predetermined threshold and creating a frequency distribution in the differential image of the first bird's-eye view image obtained at the first time T0 and the second bird's-eye view image obtained at the second time T1 which is after the first time T0. In other words, a differential image that is not offset is created, and the integrated value thereof (the second integrated value) is calculated. The second integrated value is the total value of the predetermined areas or all the values plotted as the second luminance distribution information.

The three-dimensional object assessment unit 34 assesses that the three-dimensional object detected by the three-dimensional object detection unit 33 is a "moving object" when an evaluation value, which corresponds to the number of times the first integrated value is assessed to be greater than the second integrated value, is equal to or greater than a predetermined evaluation threshold. The method for calculating the evaluation value is not limited, but in the present embodiment, evaluation points are counted up every time the first integrated value is assessed to be greater than the second integrated value in a process repeated in predetermined cycles, and the total value of these points is found as the "evaluation value."

Thus, based on the magnitude relationship between the pixel amount (edge amount) extracted from the differential image of an offset (positionally aligned) past bird's-eye image and a current bird's-eye image based on bird's-eye images of different times, and the pixel amount (edge amount) extracted from the differential image of a not-offset (not positionally aligned) past bird's-eye image and a current bird's-eye image, it is possible to distinguish between the characteristics of an image transition of a moving object and the characteristics of an image transition of a (natural) stationary object, and to assess with high precision whether the three-dimensional object is a moving object or a stationary object such as a natural object.

The three-dimensional object assessment unit 34 of the present embodiment adds a first counted value to calculate the evaluation value when a first integrated value of pixels (edge amount) representing a predetermined differential in a differential image with a not-offset (not positionally aligned) image is assessed to be greater than a second integrated value of pixels (edge amount) representing a predetermined differential in a differential image with an offset (positionally aligned) image. In other words, the evaluation value is increased as there are more and more assessments that the first integrated value is greater than the second integrated value. When the evaluation value is equal to or greater than the predetermined evaluation threshold, the three-dimensional object detected by the three-dimensional object detection unit 33 or 37 is assessed to be a moving object such as another vehicle VX.

In this process, when an assessment to the effect that the first integrated value is greater than the second integrated value continues, the three-dimensional object assessment unit 34 sets a higher first counted value as the number of these continuous assessments increases. Thus, when the assessment that the first integrated value is greater than the second integrated value continues, the accuracy of the assessment that the detected three-dimensional object is a moving object is assessed to be high, the first counted value is increased so that the evaluation value becomes even greater, and it is therefore possible to assess with high precision whether or not the three-dimensional object is a moving object based on successive observation results.

The three-dimensional object assessment unit 34 may add the first counted value when the first integrated value is assessed to be greater than the second integrated value, and may subtract a second counted value to calculate the evaluation value when the first integrated value is assessed to be less than the second integrated value. In this case, when the first integrated value is assessed to be greater than the second integrated value, the first integrated value is thereafter assessed to be less than the second integrated value, and after which the first integrated value is assessed to be greater than the second integrated value, the three-dimensional object assessment unit 34 may set a higher second counted value.

Thus, in the case of switching between assessments that the first integrated value is greater than the second integrated value and assessments that the second integrated value is greater than the first integrated value, there is assessed to be a high possibility that the detected three-dimensional object is a stationary object such as a natural object having irregularity, and the second counted value is increased so as to lower the evaluation value for assessing a moving object. Therefore, it is possible to assess stationary objects such as natural objects, and consequently moving objects, with high precision based on successive observation results. This assessment result can also be used as an assessment result for natural objects including plants and snow. Incidentally, there is a high tendency for the detected state of moving object characteristics to be observable in a stable manner. This is because when the assessment result that the three-dimensional object is a natural object is discretely detected and the detection result is unstable, the possibility of the detected three-dimensional object being a stationary object such as a natural object can be assessed to be high.

The three-dimensional object assessment unit 34 subtracts the second counted value to calculate the evaluation value when the first integrated value is assessed to be less than the second integrated value. In this case, the three-dimensional object assessment unit 34 sets a higher second counted value when the assessment of the first integrated value being less than the second integrated value continues for at least a predetermined number of times.

Thus, when the first integrated value is assessed to be less than the second integrated value, there is assessed to be a high possibility that the detected three-dimensional object is a stationary object, and the second counted value pertaining to subtracting is increased so as to reduce the evaluation value for assessing the moving object. It is therefore possible to assess moving objects with a high degree of precision based on successive observation results.

Figure 30:
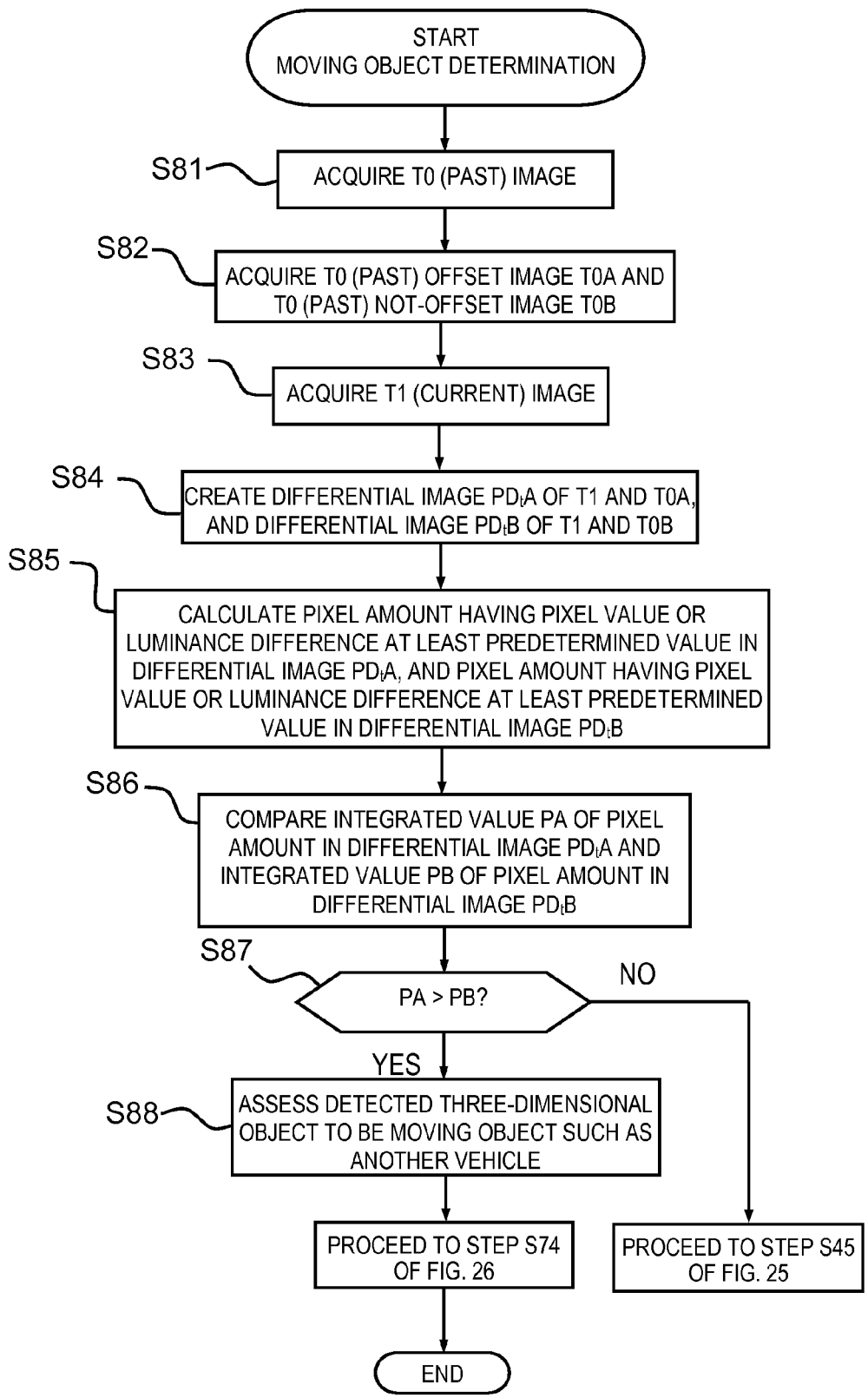
FIG. 30 is a flowchart showing the stationary object/moving object assessment process.

FIG. 30 is a flowchart showing the control procedure for the process of assessing moving objects of the present embodiment.

First, in step S81, the three-dimensional object assessment unit 34 acquires an image at a past timing T0 as shown in FIG. 30. Next, in step S82, the three-dimensional object assessment unit 34 finds an offset image T0A at the past timing T0 and a not-offset image T0B at the past timing T0. These images may be captured images or bird's-eye view images that have been viewpoint-converted.

In step S83, the three-dimensional object assessment unit 34 acquires an image T1 at the current timing T1. In the next step S84, the three-dimensional object assessment unit 34 acquires a differential image PDtA of the image T1 at the current timing T1 and the offset image T0A at the past timing T0, as well as a differential image PDtB of the image T1 at the current timing T1 and the not-offset image T0 B at the past timing T0.

In step S85, the three-dimensional object assessment unit 34 extracts pixels having at least a predetermined differential for a pixel value and pixels having at least a predetermined value for a luminance difference in the differential image PDtA, and finds the pixel distribution at each position. The three-dimensional object assessment unit 34 similarly extracts pixels having at least a predetermined differential for a pixel value and pixels having at least a predetermined value for a luminance difference in the differential image PDtB, and finds the pixel distribution at each position. In the next step S86, the three-dimensional object assessment unit 34 finds an integrated value PA of the amount of pixels in the differential image PDtA and an integrated value PB of the amount of pixels in the differential image PDtB. The overall pixel amount may be found instead of these integrated values PA, PB.

In step S87, the three-dimensional object assessment unit 34 compares the first integrated value PA and the second integrated value PB, and when the first integrated value PA is greater than the second integrated value PB; in other words, when the pixel amount or the first integrated value PA of the differential image of the offset past image T0A and the current image T1 is greater than the pixel amount of the second integrated value PB of the differential image of the not-offset past image T0B and the current image T1, the process proceeds to step S88, the detected three-dimensional object is assessed to be a moving object such as another vehicle VX, the process transitions to step S74 of FIG. 26, and the other vehicle detection suppression process is canceled. When the first integrated value PA is equal to or greater than the second integrated value PB in step S87, the process proceeds to step S45 of FIG. 25.

According to the three-dimensional object detection device 1 configured and activated as described above, according to the present embodiment of the present invention, the following affects are achieved.

(1) According to the three-dimensional object detection device 1 of the present embodiment, irregular edge points P1 that are aligned irregularly and that do not meet the pre-established condition of an artificial three-dimensional object, and an assessment is made of whether or not there are plants and snow based on the number L of irregular edge points P1. When there is a moving object such as a vehicle in the detection areas A1, A2, the edge points P tend to easily align in a regular manner along the falling direction due to the object being an artificial object. When the object is plants and snow, the edge points P are scattered irregularly because the object is not an artificial object. Consequently, a distinction between the former and latter can be made from the number L of irregular edge points P1. Therefore, the precision of assessing plants and snow can be improved.

The same actions and effects are achieved whether the process is based on differential waveform information or on edge information.

(2) According to the three-dimensional object detection device 1 of the present embodiment, when there is a relatively small number of regular second pixels and a relatively high number of irregular third pixels, irregularity is evaluated as being high, the irregularity of the captured image can therefore be quantitatively assessed, and the presence of natural objects including plants and snow can be detected with high precision.

(3) According to the three-dimensional object detection device 1 of the present embodiment, when the number of irregular third pixels is relatively higher than the number of regular second pixels, irregularity is evaluated as being high, the irregularity of the captured image can therefore be quantitatively assessed, and the presence of natural objects including plants and snow can be detected with high precision.

(4) According to the three-dimensional object detection device 1 of the present embodiment, when the number of irregular third pixels is a high ratio in relation to the number of regular second pixels or the number of overall first pixels, irregularity is evaluated as being high, the irregularity of the captured image can therefore be quantitatively assessed, and the presence of natural objects including plants and snow can be detected with high precision.

(5) According to the three-dimensional object detection device 1 of the present embodiment, because the second pixels, which are observed in at least a predetermined density along the direction in which the three-dimensional object falls when the bird's-eye view image is viewpoint-converted, are assessed as a characteristic of an image of an artificial three-dimensional object, second pixels corresponding to an artificial three-dimensional object and pixels (third pixels) corresponding to a natural not-manmade three-dimensional object can be distinguished with high precision from among all of the first pixels corresponding to the object.

(6) According to the three-dimensional object detection device 1 of the present embodiment, when the three-dimensional object detected in the previous process is assessed to be an image of a natural object (a natural stationary object) Q1 including plants and snow along the lane traveled by the vehicle V, detection sensitivity can be adjusted by raising the first threshold α so as to impede detection of another vehicle VX traveling adjacent to the lane traveled by the vehicle V, and it is therefore possible to prevent the image of a natural object (a natural stationary object) Q1 including plants and snow from being erroneously detected as another vehicle VX traveling in an adjacent traffic lane.

(7) When the three-dimensional object detected in the previous process is assessed to be an image of a natural object (a natural stationary object) including plants and snow along the lane traveled by the vehicle V, detection sensitivity can be adjusted by lowering the output value when creating differential waveform information so as to impede detection of another vehicle VX traveling adjacent to the lane traveled by the vehicle V, and it is therefore possible to prevent the image of a natural object (a natural stationary object) Q1 including plants and snow from being erroneously detected as another vehicle VX traveling in an adjacent traffic lane.

(8) When the three-dimensional object detected in the previous process is assessed to be an image of a natural object (a natural stationary object) including plants and snow along the lane traveled by the vehicle V, detection sensitivity can be adjusted by raising the assessment threshold when creating edge information so as to impede detection of another vehicle VX traveling adjacent to the lane traveled by the vehicle V, and it is therefore possible to prevent the image of a stationary object Q1 including natural objects including plants and snow from being erroneously detected as another vehicle VX traveling in an adjacent traffic lane.

(9) When the three-dimensional object detected in the previous process is assessed to be an image of a natural object (a natural stationary object) including plants and snow along the lane traveled by the vehicle V, detection sensitivity can be adjusted by lowering the output value when creating edge information so as to impede detection of another vehicle VX traveling adjacent to the lane traveled by the vehicle V, and it is therefore possible to prevent the image of a natural object (a natural stationary object) Q1 including plants and snow from being erroneously detected as another vehicle VX traveling in an adjacent traffic lane.

(10) According to the three-dimensional object detection device 1 of the present embodiment, the three-dimensional object detection process can be performed with high precision because, based on the magnitude relationship between the pixel amount (edge amount) extracted from the differential image of an offset past bird's-eye image and a current bird's-eye image based on bird's-eye images of different times, and the pixel amount (edge amount) extracted from the differential image of a not-offset past bird's-eye image and a current bird's-eye image, it is possible to distinguish between the characteristics of an image transition of a moving object and the characteristics of an image transition of a stationary object, and to cancel the three-dimensional object suppression process when the three-dimensional object is a moving object.

(11) According to the three-dimensional object detection device 1 of the present embodiment, when the assessment of the first integrated value being greater than the second integrated value continues, the possibility of the detected three-dimensional object being a moving object is assessed to be high, and the first counted value is increased so that the evaluation value for evaluating moving objects increases further; therefore, moving objects can be assessed with high precision based on successive observation results.

(12) According to the three-dimensional object detection device 1 of the present embodiment, in the case of switching between assessments that the first integrated value is greater than the second integrated value and assessments that the second integrated value is greater than the first integrated value, there is assessed to be a high possibility that the detected three-dimensional object is a stationary object (including natural objects), and the second counted value for subtraction is increased so as to lower the evaluation value for assessing moving objects. It is therefore possible to assess moving objects with high precision based on successive observation results.

(13) According to the three-dimensional object detection device 1 of the present embodiment, when the first integrated value is assessed to be less than the second integrated value, the possibility of the detected three-dimensional object being a stationary object is assessed to be high and the second counted value pertaining to subtraction is increased so as to lower the evaluation value, and it is therefore possible to assess stationary objects with high precision based on successive observation results.

(14) The three-dimensional object detection device 1 of the present embodiment produces the same actions and effects in both cases in which other vehicles VX are detected by a process based on differential waveform information, and cases in which other vehicles VX are detected by a process based on edge information.

The camera 10 is equivalent to the imaging means according to the present invention, the viewpoint conversion unit 31 is equivalent to image conversion means according to the present invention, the positional alignment unit 32 and the three-dimensional object detection unit 33 are equivalent to three-dimensional object detection means according to the present invention, the luminance difference controller 35, the edge line detection unit 36, and the three-dimensional object detection unit 37 are equivalent to three-dimensional object detection means according to the present invention, the three-dimensional object assessment unit 34 is equivalent to three-dimensional object assessment means, the natural object assessment unit 38 is equivalent to natural object assessment means, the control unit 39 is equivalent to control means, and the vehicle speed sensor 20 is equivalent to a vehicle speed sensor.

The positional alignment unit 32 in the present embodiment aligns the positionally aligns the positions of bird's-eye view images of different times in a bird's-eye view and obtains a positionally aligned bird's-eye view image, but this "positionally aligning" process can be performed with a precision corresponding to the type of detection objective or the required detection precision. The positional alignment process may be strict, involving positional aligning using the same time and same position as a standard, or the positional alignment process may be lax, only enough to perceive the coordinates of the different bird's-eye view images.

The invention claimed is:

1. A three-dimensional object detection device comprising:
   an imaging unit configured to be installed on a vehicle to capture images of a region at a rear of the vehicle;
   an image conversion unit configured to convert a viewpoint of the images obtained by the imaging unit to bird's-eye view images;
   a differential waveform information creating unit configured to create differential waveform information by positionally aligning the bird's-eye view images of different times obtained by the image conversion unit within a bird's-eye view, the differential waveform information creating unit being further configured to create a frequency distribution of a number of pixels by counting the number of pixels representing a predetermined differential in a differential image of the bird's-eye view images that were positionally aligned;

a three-dimensional object detection unit configured to detect three-dimensional objects which are included in the differential waveform information and which are present in detection areas set in left and right rear sides of the vehicle, based on the frequency distribution of the number of pixels representing the predetermined differential in the differential image along a direction in which the three-dimensional object falls when the bird's-eye view images are viewpoint-converted; and a natural object assessment unit programmed to calculate an irregularity evaluation value for evaluating an irregularity of the differential waveform information based on a first pixel number of first pixels representing a first predetermined differential in the differential image containing the detected three-dimensional object that was detected, and a second pixel number of second pixels that have been extracted along the direction in which the three-dimensional object falls when the bird's-eye view images are viewpoint-converted and that represent a second predetermined differential greater than the first predetermined differential in the differential image, and the natural object assessment unit configured to assess that the three-dimensional object detected by the three-dimensional object detection unit is a natural object including plants or snow present along a lane traveled by the vehicle when the calculated irregularity evaluation value is equal to or greater than a predetermined irregularity evaluation threshold set in advance.

2. A three-dimensional object detection device comprising:

an imaging unit configured to be installed on a vehicle to capture images of a region at a of the vehicle;

an image conversion unit configured to convert a viewpoint of the images obtained by the imaging unit to bird's-eye view images;

an edge information creating unit configured to create edge information by extracting pixels in which a luminance difference of adjacent image areas is equal to or greater than a predetermined threshold in the bird's-eye view images obtained by the image conversion unit;

a three-dimensional object detection unit configured to detect three-dimensional objects which are included in the edge information and which are present in detection areas set in left and right rear sides of the vehicle, based on the edge information including the pixels that are extracted along the direction in which the three-dimensional object falls when the bird's-eye view image is viewpoint-converted and that have a luminance difference of adjacent image areas equal to or greater than the predetermined threshold; and a natural object assessment unit programmed to calculate an irregularity evaluation value for evaluating an irregularity of the edge information based on a first pixel number of first pixels in which the luminance difference of the adjacent image areas in the bird's-eye images containing the three-dimensional object that was detected is equal to or greater than a first predetermined threshold, and a second pixel number of second pixels that have been extracted along the direction in which the three-dimensional object falls when the bird's-eye view images are viewpoint-converted and in which the luminance difference of adjacent image areas in the bird's-eye images is equal to or greater than a second predetermined threshold greater than the first predetermined threshold, and the natural object assessment unit configured to assess that the three-dimensional object detected by the three-dimensional object detection unit is a natural object including plants or snow present along a lane traveled by the vehicle when the calculated irregularity evaluation value is equal to or greater than a predetermined irregularity evaluation threshold set in advance.

3. The three-dimensional object detection device according to claim 1, wherein the natural object assessment unit is further programmed to:

calculate a third pixel number by subtracting the second pixel number from the first pixel number; and assess that the irregularity evaluation value is equal to or greater than the predetermined irregularity evaluation threshold when the second pixel number is less than a first predetermined value and the third pixel number is equal to or greater than a second predetermined value.

4. The three-dimensional object detection device according to claim 1, wherein the natural object assessment unit is further programmed to:

calculate a third pixel number by subtracting the second pixel number from the first pixel number; and assess that the irregularity evaluation value is equal to or greater than the predetermined irregularity evaluation threshold when the value of subtracting the second pixel number from the third pixel number is equal to or greater than a third predetermined value.

5. The three-dimensional object detection device according to claim 1, wherein the natural object assessment unit is further programmed to:

calculate a third pixel number by subtracting the second pixel number from the first pixel number;

calculate an abundance rate of the third pixel number relative to the first pixel number or the second pixel number; and assess that the irregularity evaluation value is equal to or greater than the predetermined irregularity evaluation threshold when the abundance rate of the third pixel number relative to either the first pixel number or the second pixel number is equal to or greater than a predetermined rate.

6. The three-dimensional object detection device according to claim 1, wherein the natural object assessment unit is further programmed to:

designate, as second pixels, pixels that are extracted along the direction in which the three-dimensional object falls when the bird's-eye view images are viewpoint-converted, and that, among pixels representing the second predetermined differential, constitute a pixel group aligned in at least a predetermined density, and find the number of these second pixels as the second pixel number.

7. The three-dimensional object detection device according to claim 2, wherein the natural object assessment unit is further programmed to:

designate, as second pixels, pixels that are extracted along the direction in which the three-dimensional object falls when the bird's-eye view image is viewpoint-converted, and that, among pixels in which the luminance difference of adjacent image areas in the bird's-eye images are equal to or greater than a second predetermined threshold, constitute a pixel group aligned in at least a predetermined density, and find the number of these second pixels as the second pixel number.

8. The three-dimensional object detection device according to claim 1, further comprising:

a three-dimensional object assessment unit programmed to assess whether or not the three-dimensional object detected by the three-dimensional object detection unit is another vehicle in the detection areas; and a control unit programmed to perform suppress an assessment that the three-dimensional object detected by the three-dimensional object detection unit is another vehicle when the natural object assessment unit has assessed that the three-dimensional object that was detected is a natural object including plants or snow present along the lane traveled by the vehicle.

9. The three-dimensional object detection device according to claim 8, wherein the three-dimensional object detection unit detects a three-dimensional object based on the differential waveform information and a first threshold α; and the control unit outputs to the three-dimensional object detection unit a control command for raising the first threshold α so as to impede detection of the three-dimensional object when the three-dimensional object that was detected is assessed by the natural object assessment unit to be a natural object including plants or snow present along the lane traveled by the vehicle.

10. The three-dimensional object detection device according to claim 8, wherein the three-dimensional object detection unit detects a three-dimensional object based on a pixel number of the differential waveform information and a first threshold α; and the control unit creates a control command for lowering a value of the number of pixels representing a predetermined differential in the differential image of the bird's-eye view images, and outputs the control command to the three-dimensional object detection unit when the three-dimensional object that was detected is assessed by the natural object assessment unit to be a natural object including plants or snow present along the lane traveled by the vehicle.

11. The three-dimensional object detection device according to claim 2, further comprising:

a three-dimensional object assessment unit programmed to assess whether or not the three-dimensional object detected by the three-dimensional object detection unit is another vehicle in the detection areas; and a control unit programmed to perform suppress an assessment that the three-dimensional object detected by the three-dimensional object detection unit is another vehicle when the natural object assessment unit has assessed that the three-dimensional object that was detected is a natural object including plants or snow present along the lane traveled by the vehicle.

12. The three-dimensional object detection device according to claim 11, wherein the three-dimensional object detection unit detects a three-dimensional object based on an amount of edge information and a second threshold β; and the control unit outputs to the three-dimensional object detection unit a control command for outputting a lower amount of detected edge information when the three-dimensional object that was detected is assessed by the natural object assessment unit to be a natural object including plants or snow present along the lane traveled by the vehicle.

13. The three-dimensional object detection device according to claim 8, wherein the three-dimensional object assessment unit positionally aligns a position of a first bird's-eye view image of the bird's-eye view images obtained at a first time at which the three-dimensional object is detected and a position of a second bird's-eye view image of the bird's-eye view images obtained at a second time after the first time within a bird's-eye view, the three-dimensional object assessment unit finds a first integrated value of first differential waveform information created by counting and creating a frequency distribution of a number of pixels representing a predetermined differential in the differential image of the positionally aligned bird's-eye view images, the three-dimensional object assessment unit finds a second integrated value of second differential waveform information created by counting and creating a frequency distribution of a number of pixels representing a predetermined differential in the differential image of the first bird's-eye view image obtained at the first time and the second bird's-eye view image obtained at the second time after the first time, and the three-dimensional object assessment unit assesses that the three-dimensional object detected by the three-dimensional object detection unit is a moving object when the evaluation value corresponding to a number of times the first integrated value is assessed to be greater than the second integrated value is equal to or greater than a predetermined evaluation threshold; and the control unit halts suppressing the assessment of the three-dimensional object that was detected as another vehicle when the three-dimensional object is assessed by the three-dimensional object assessment unit to be a moving object.

14. The three-dimensional object detection device according to claim 11, wherein the three-dimensional object assessment unit positionally aligns a position of a first bird's-eye view image of the bird's-eye view images obtained at a first time at which the three-dimensional object is detected and a position of a second bird's-eye view image of the bird's-eye view images obtained at a second time after the first time within a bird's-eye view, the three-dimensional object assessment unit finds a first integrated value of first luminance distribution information created by counting and creating a frequency distribution of a number of pixels in which the luminance difference of adjacent image areas is equal to or greater than a predetermined threshold in the differential image of the positionally aligned bird's-eye view images, the three-dimensional object assessment unit finds a second integrated value of second luminance distribution information created by counting and creating a frequency distribution of a number of pixels in which the luminance difference of adjacent image areas is equal to or greater than a predetermined threshold in the differential image of the first bird's-eye view image obtained at the first time and the second bird's-eye view image obtained at the second time after the first time, and the three-dimensional object assessment unit assesses that the three-dimensional object detected by the three-dimensional object detection unit is a moving object when the evaluation value corresponding to a number of times the first integrated value is assessed to be greater than the second integrated value is equal to or greater than a predetermined evaluation threshold.

15. The three-dimensional object detection device according to claim 13, wherein
the three-dimensional object assessment unit adds a first counted value to calculate the evaluation value when the first integrated value is assessed to be greater than the second integrated value; and
the three-dimensional object assessment unit sets a higher value for the first counted value in response to a greater number of continuous assessments when the assessment of the first integrated value being greater than the second integrated value continues.

16. The three-dimensional object detection device according to claim 13, wherein
the three-dimensional object assessment unit calculates the evaluation value by adding a first counted value when the first integrated value is assessed to be greater than the second integrated value, and subtracting a second counted value when the first integrated value is assessed to be less than the second integrated value; and
the three-dimensional object assessment unit sets a higher value for the second counted value when an assessment is made that the first integrated value is greater than the second integrated value, an assessment is then made that the first integrated value is less than the second integrated value, and an assessment is thereafter made that the first integrated value is greater than the second integrated value.

17. The three-dimensional object detection device according to claim 13, wherein
the three-dimensional object assessment unit is further programmed to:
subtracts a second counted value to calculate the evaluation value when the first integrated value is assessed to be less than the second integrated value; and
sets a higher value for the second counted value when the assessment of the first integrated value being less than the second integrated value continues for at least a predetermined number of times.

18. A three-dimensional object detection method comprising:
capturing viewpoint images of a region rearward of a vehicle with an imaging device;
converting the viewpoint images to bird's-eye view images;
creating differential waveform information by aligning the bird's-eye view images of different times within a bird's-eye view, and creating a frequency distribution of a number of pixels by counting the number of pixels representing a predetermined differential in a differential image of the bird's-eye view images that were positionally aligned;
detecting three-dimensional objects which are included in the differential waveform information and which are present in detection areas set in left and right rear sides of the vehicle, based on the frequency of the number of pixels representing the predetermined differential in the differential image along a direction in which the three-dimensional object falls when the bird's-eye view images are viewpoint-converted; and
calculating an irregularity evaluation value for evaluating an irregularity of the differential waveform information based on a first pixel number of first pixels representing a first predetermined differential in the differential image containing the three-dimensional object that was detected, and a second pixel number of second pixels that have been extracted along the direction in which the three-dimensional object falls when the bird's-eye view an viewpoint-converted and that represent a second predetermined differential greater than the first predetermined differential in the differential image, and outputting a natural object assessment result based on the irregularity evaluation value to a control unit, the natural object assessment result indicating that the three-dimensional object that was detected is assessed to be a natural object including plants or snow present along the lane traveled by the vehicle when the calculated irregularity evaluation value is equal to or greater than a predetermined irregularity evaluation threshold set in advance.

19. A three-dimensional object detection method comprising:
capturing viewpoint images of a region rearward of a vehicle with an imaging device;
converting the viewpoint images to bird's-eye view images;
creating edge information by extracting pixels in which a luminance difference of adjacent image areas is equal to or greater than a predetermined threshold in the bird's-eye view images that were obtained;
detecting three-dimensional objects which are included in the edge information and which are present in detection areas set in left and right rear sides of the vehicle, based on the edge information including the pixels that are extracted along the direction in which the three-dimensional object falls when the bird's-eye view image is viewpoint-converted and that have a luminance difference of adjacent image areas equal to or greater than the predetermined threshold; and
calculating an irregularity evaluation value for evaluating an irregularity of the edge information based on a first pixel number of first pixels in which the luminance difference of adjacent image areas in the bird's-eye image containing the three-dimensional object that was detected is equal to or greater than a first predetermined threshold, and a second pixel number of second pixels that have been extracted along the direction in which the three-dimensional object falls when the bird's-eye view images are is viewpoint-converted and in which the luminance difference of adjacent image areas in the bird's-eye image is equal to or greater than a second predetermined threshold greater than the first predetermined threshold, and outputting a natural object assessment result based on the irregularity evaluation value to a control unit, the natural object assessment result indicating that the three-dimensional object that was detected is a natural object including plants or snow present along the lane traveled by the vehicle when the calculated irregularity evaluation value is equal to or greater than a predetermined irregularity evaluation threshold set in advance.

20. The three-dimensional object detection device according to claim 2, wherein
the natural object assessment unit is further programmed to:
calculate a third pixel number by subtracting the second pixel number from the first pixel number; and
assess that the irregularity evaluation value is equal to or greater than the predetermined irregularity evaluation threshold when the second pixel number is less than a first predetermined value and the third pixel number is equal to or greater than a second predetermined value.

21. The three-dimensional object detection device according to claim 2, wherein
the natural object assessment unit is further programmed to:
calculate a third pixel number by subtracting the second pixel number from the first pixel number; and
assess that the irregularity evaluation value is equal to or greater than the predetermined irregularity evaluation threshold when the value of subtracting the second pixel number from the third pixel number is equal to or greater than a third predetermined value.

22. The three-dimensional object detection device according to claim 2, wherein
the natural object assessment unit is further programmed to:
calculate a third pixel number by subtracting the second pixel number from the first pixel number;
calculate an abundance rate of the third pixel number relative to the first pixel number or the second pixel number; and
assess that the irregularity evaluation value is equal to or greater than the predetermined irregularity evaluation threshold when the abundance rate of the third pixel number relative to either the first pixel number or the second pixel number is equal to or greater than a predetermined rate.

23. The three-dimensional object detection device according to claim 11, wherein
the three-dimensional object detection unit detects a three-dimensional object based on the edge information and a second threshold β; and
the control unit outputs to the three-dimensional object detection unit a control command for raising the second threshold β so as to impede detection of the three-dimensional object when the three-dimensional object that was detected is assessed by the natural object assessment unit to be a natural object including plants or snow present along the lane traveled by the vehicle.

24. The three-dimensional object detection device according to claim 14, wherein
the three-dimensional object assessment unit adds a first counted value to calculate the evaluation value when the first integrated value is assessed to be greater than the second integrated value; and
the three-dimensional object assessment unit sets a higher value for the first counted value in response to a greater number of continuous assessments when the assessment of the first integrated value being greater than the second integrated value continues.

25. The three-dimensional object detection device according to claim 14, wherein
the three-dimensional object assessment unit calculates the evaluation value by adding a first counted value when the first integrated value is assessed to be greater than the second integrated value, and subtracting a second counted value when the first integrated value is assessed to be less than the second integrated value; and
the three-dimensional object assessment unit sets a higher value for the second counted value when an assessment is made that the first integrated value is greater than the second integrated value, an assessment is then made that the first integrated value is less than the second integrated value, and an assessment is thereafter made that the first integrated value is greater than the second integrated value.

26. The three-dimensional object detection device according to claim 14, wherein
the three-dimensional object assessment unit is further programmed to:
subtracts a second counted value to calculate the evaluation value when the first integrated value is assessed to be less than the second integrated value; and
sets a higher value for the second counted value when the assessment of the first integrated value being less than the second integrated value continues for at least a predetermined number of times.

* * * * *